(12) United States Patent
Morrison

(10) Patent No.: US 11,867,250 B2
(45) Date of Patent: Jan. 9, 2024

(54) VIBRATION DAMPENING DEVICE, A SYSTEM INCORPORATING THE DEVICE, AND A METHOD OF USING SAME

(71) Applicant: D Morrison Consulting Inc., Markham (CA)

(72) Inventor: David Morrison, Markham (CA)

(73) Assignee: D Morrison Consulting Inc., Markham (CA)

(*) Notice: Subject to any disclaimer, the term of this patent is extended or adjusted under 35 U.S.C. 154(b) by 104 days.

(21) Appl. No.: 17/351,512

(22) Filed: Jun. 18, 2021

(65) Prior Publication Data

US 2022/0403914 A1 Dec. 22, 2022

(51) Int. Cl.
*F16F 15/08* (2006.01)
*F16F 7/08* (2006.01)

(52) U.S. Cl.
CPC .............. *F16F 15/08* (2013.01); *F16F 7/087* (2013.01)

(58) Field of Classification Search
CPC .. F16F 15/08; F16F 7/087; F16F 7/104; F16F 1/3732; H04R 1/026; H04R 1/2873
See application file for complete search history.

(56) References Cited

U.S. PATENT DOCUMENTS

| | | | |
|---|---|---|---|
| 785,671 A | 3/1905 | Raines et al. | |
| 1,273,939 A | 7/1918 | Sidel | |
| 2,322,193 A * | 6/1943 | Gustav | F16F 1/377 |
| | | | 213/40 S |
| 2,933,850 A | 4/1960 | Martin | |
| 2,956,368 A | 10/1960 | Klein | |
| 3,784,146 A | 1/1974 | Matthews | |
| 4,011,821 A | 3/1977 | Neal | |
| D247,035 S | 1/1978 | Brodmann | |
| 4,214,738 A * | 7/1980 | Casper | F16F 3/0876 |
| | | | 267/141.1 |
| 2,947,587 A | 8/1980 | Navellier | |
| 4,252,339 A * | 2/1981 | Shimizu | F16F 1/3732 |
| | | | 280/124.108 |
| 4,493,471 A | 1/1985 | McInnis | |

(Continued)

FOREIGN PATENT DOCUMENTS

| GB | 2392969 | * | 3/2004 | ............ F16F 15/067 |
|---|---|---|---|---|
| JP | 2014126000 | | 7/2014 | |

*Primary Examiner* — Xuan Lan Nguyen
(74) *Attorney, Agent, or Firm* — Sand, Sebolt & Wernow Co., LPA

(57) ABSTRACT

A vibration dampening device, a mounting assembly including a vibration dampening device, and a method of dampening vibration in a vibration-sensitive component using the same. The vibration dampening device includes a first member that rests upon or is operatively engaged with a support surface; a second member that is operatively engaged with the vibration-sensitive component; and at least one isolator assembly interposed between the first member and the second member, wherein the first member and the second member are decoupled from one another by the at least one isolator assembly. The at least one isolator assembly includes a first isolator that is at least partially embedded in the first member and a second isolator that is at least partially embedded in the second member, and an isolator insert that extends between the first isolator and second isolator. The isolator insert creates a gap between the first and second members.

17 Claims, 46 Drawing Sheets

(56) References Cited

U.S. PATENT DOCUMENTS

| | | |
|---|---|---|
| D286,149 S | 10/1986 | Tucker |
| D290,953 S | 7/1987 | Sklaar et al. |
| D290,254 S | 8/1987 | Arevalo |
| 4,687,173 A | 8/1987 | Genna |
| 4,722,154 A | 2/1988 | Virta et al. |
| 4,948,076 A | 8/1990 | Sumrell et al. |
| 5,189,104 A | 2/1993 | Haubs et al. |
| 5,201,896 A | 4/1993 | Kruszewski |
| 5,261,648 A * | 11/1993 | Kardos ............... F16F 15/08 267/153 |
| 5,306,121 A * | 4/1994 | Heflin ................ F16F 15/08 417/363 |
| 5,570,867 A | 11/1996 | Norkus |
| 5,788,206 A * | 8/1998 | Bunker ............... F16F 15/08 267/141 |
| D401,424 S | 11/1998 | Ogo et al. |
| 5,881,653 A | 3/1999 | Pfister |
| 5,915,662 A | 6/1999 | Itakura et al. |
| 6,024,338 A | 2/2000 | Koike et al. |
| 6,155,530 A | 12/2000 | Borgen |
| 6,165,630 A | 12/2000 | Borgen |
| 6,247,414 B1 | 6/2001 | Sikora et al. |
| 6,296,238 B1 | 10/2001 | Lund-Andersen |
| 6,357,717 B1 | 3/2002 | Kennard, IV |
| 6,648,296 B2 | 11/2003 | Herren et al. |
| 6,676,116 B2 * | 1/2004 | Edberg ............... F16F 15/08 267/153 |
| 6,895,870 B1 | 5/2005 | Bizlewicz |
| 6,976,434 B2 | 12/2005 | Roig et al. |
| 6,978,434 B1 | 12/2005 | Roig et al. |
| D571,779 S | 6/2008 | Matsuoka |
| D581,698 S | 12/2008 | Fix |
| 7,640,868 B2 | 1/2010 | Morrison et al. |
| 8,215,245 B2 | 7/2012 | Morrison |
| D723,308 S | 3/2015 | Franck et al. |
| D730,089 S | 5/2015 | Carbone |
| D741,840 S | 10/2015 | Morrison |
| 9,920,811 B1 * | 3/2018 | Morrison ............. F16F 15/08 |
| 2004/0084243 A1 | 5/2004 | Decanio et al. |
| 2006/0006307 A1 | 1/2006 | Mogilever |
| 2010/0059651 A1 | 3/2010 | Morrison et al. |
| 2013/0206499 A1 | 8/2013 | Maruyama et al. |
| 2018/0073592 A1 | 3/2018 | Morrison |

* cited by examiner

VIBRATION DAMPENING DEVICE, A SYSTEM INCORPORATING THE DEVICE, AND A METHOD OF USING SAME

TECHNICAL FIELD

This disclosure is directed to vibration dampening equipment. More particularly, the disclosure is directed to a device for dampening vibrations in electronic and acoustic equipment. Specifically, the disclosure is directed to a vibration dampening device including a first member, a second member, and an isolator assembly interposed between the first and second members; wherein the first member is secured to or rests upon a support surface, the second member is operatively engaged with a vibration-sensitive component, and the isolator assembly dampens vibrations to or from the vibration-sensitive component.

BACKGROUND

Background Information

Vibrations created within audio equipment including loudspeakers, amplifiers, turntables, receivers, digit to analog convertors, processors etc., or externally created and entering into such systems, tend to cause issues that negatively impact their acoustic performance by reducing clarity, accuracy and altering the stereo image in multi-channel systems. Loudspeakers need to be held in place so that losses in the reproduced sound do not occur as a result of the speaker enclosure moving in response to the motive forces created by the transducers. Vibrations from external sources can be conducted into a component, structure or system and adversely affect performance. Vibrations can be conducted through sensitive equipment from motors, transformers, transducers etc. and can be mechanically reflected back through the system again where the assembly or system comes into contact with another structure or contact point.

SUMMARY

A vibration dampening device is disclosed herein which tends to minimize the transfer of vibrations from one component or structure to another component or structure while maintaining mechanical position and stability. The vibration dampening device, a mounting assembly including the vibration dampening device, and a method of dampening vibration in a vibration-sensitive component using the same is disclosed herein.

The vibration dampening device includes a first member that rests upon or is operatively engaged with a support surface; a second member that is operatively engaged with the vibration-sensitive component; and at least one isolator assembly interposed between the first member and the second member, such that the first member and the second member are decoupled from one another by the at least one isolator assembly. The decoupling of a vibration-sensitive component in an audio system from a support surface will tend to reduce issues that negatively impact the audio equipment's acoustic performance by reducing clarity, accuracy and altering the stereo image in multi-channel systems. Sound quality is thus greatly improved by the inclusion of the present vibration dampening device in such acoustic systems.

A base component i.e., the first member of the vibration dampening device is made up of one or more sections that are connected to a supporting structure either directly with a fastener. An isolated component of the vibration dampening device, i.e., the second member, is connected directly to the vibration-sensitive component, assembly, or structure to be isolated or positioned to dampened transfer of vibration. The first member and second member are operatively engaged with one another via one or more isolator inserts. The isolator insert may be configured in any desired shape. For example, the isolator inserts may be bar-like or rod-like structures. The terms "tabs" and "rods" should not be considered as disclosing an isolator insert of any particular shape because any desired configuration of isolator insert may be utilized herein. A first end of each isolator tab is inserted into a resilient material which is, in turn, embedded into the first member. The other end of the isolator tab is inserted into a resilient material which is embedded into the second member. This configuration of multiple isolator inserts with ends received in resilient material embedded in the first and second members helps to maintains the second member in a position where, in normal operation, the second member or it's connected vibration-sensitive component will not come into contact with the first member, the structure the first member is attached to, or any other structure or assembly in the immediate environment.

In one aspect, an exemplary embodiment of the present disclosure may provide a vibration dampening device comprising a first member adapted to rest upon or be operatively engaged with a support surface; a second member adapted to be operatively engaged with a vibration-sensitive component; and at least one isolator assembly interposed between the first member and the second member, wherein the first member and second member are decoupled from one another by the at least one isolator assembly.

In one embodiment, the at least one isolator assembly may comprise a first isolator operatively engaged with the first member; a second isolator operatively engaged with the second member; and an isolator insert extending between the first isolator and the second isolator. In one embodiment, the first member may comprise a first housing defining a first recess into which the first isolator is received; and the second member may comprise a second housing defining a second recess therein and into which the second isolator is received. In one embodiment, the isolator insert may extend between the first isolator in the first recess of the first housing and the second isolator in the second recess of the second housing. In one embodiment, the first isolator may define an opening therein and a first end of the isolator insert may be received in the opening; and the second isolator may define an opening therein and a second end of the isolator insert may be received in the opening defined in the second isolator. In one embodiment, the isolator insert may be of a length measured between the first end and the second end; and the length of the isolator insert may be longer than a combined length of the opening in the first isolator and the opening in the second isolator. In one embodiment, a gap may be defined between a first surface of the first housing and a first surface of the second housing, where the first recess is defined in the first surface of the first housing and the second recess is defined in the first surface of the second housing.

In one embodiment, the second member may include a flange extending outwardly from an exterior surface thereof, and the flange may be configured to abut the vibration-sensitive component, and the flange may cause a space to be defined between the vibration-sensitive component and the exterior surface of the second member. In one embodiment the vibration dampening device may further comprise a hole defined in the second member, said hole being adapted to receive a fastener therein to secure the second member to the vibration-sensitive component. In one embodiment, the first member may comprise a first housing and a second housing that are laterally spaced apart from one another; and the second member may comprise a third housing that is interposed between the first housing and the second housing; and the at least one isolator assembly may comprises a first isolator assembly interposed between the first housing and the third housing; and a second isolator assembly interposed between the second housing and the third housing. In one embodiment, the vibration dampening device may further comprise a first gap defined between the first housing and the third housing; and a second gap defined between the second housing and the third housing; wherein each of the first gap and the second gap is formed by the provision of the first isolator assembly and second isolator assembly, respectively. In one embodiment, the first housing may be generally U-shaped and include a base and a first leg and a second leg that extend outwardly from the base in a same direction, and wherein the third housing is received in an aperture defined between the first leg and the second leg. In one embodiment, a free end of each of the first leg and the second leg may include a profiled region, and the second housing may include two opposing profiles that are complementary to the profiled region of the first leg and the second leg; and wherein the second housing snap-fittingly engages the first and second legs of the first housing.

In another aspect, an exemplary embodiment of the present disclosure may provide in combination a mounting assembly including a first region and a second region, wherein the first region is adapted to rest upon or be operatively engaged with a support surface; and wherein the second region is adapted to be operatively engaged with a vibration-sensitive component; and a vibration dampening device operatively engaged with the mounting assembly; wherein the vibration dampening device comprises a first member operatively engaged with the first region of the mounting assembly; a second member operatively engaged with the second region of the mounting assembly; and at least one isolator assembly interposed between the first member and the second member, wherein the first member and the second member are decoupled from one another by the at least one isolator assembly.

In one embodiment, the mounting assembly may include a mounting plate with a first wall section and an opposed second wall section that are configured to receive the vibration dampening device therebetween. In one embodiment a first spacer plate may located proximate the first wall section and a second spacer plate may be located proximate the second wall section and a region free of spacer plates may be defined between the first spacer plate and the second spacer plate. In one embodiment, the first member of the vibration dampening device comprises a first housing that may be positioned on the first spacer plate, and a second housing that may be positioned on the second spacer plate; and a third housing interposed between the first housing and the second housing, wherein the third housing is located over the region that is free of spacer plates. In one embodiment, a first isolator assembly may operatively engage the first housing to the third housing; and a second isolator assembly may operatively engage the second housing to the third housing. In one embodiment a faceplate is operatively engaged with the third housing and a vibration-sensitive component is operatively engaged with the faceplate and is thereby decoupled from a support surface upon which the mounting plate rests or is operatively engaged. In one embodiment, a plurality of vibration dampening devices are provided in the mounting assembly.

In one embodiment the mounting assembly may comprise an inner housing and an outer housing that are selectively engageable with one another. In one embodiment the mounting assembly may include a plurality of vibration dampening devices located in an interior chamber defined by the inner housing and the outer housing. In one embodiment the first member of each vibration dampening device is operatively engaged with the inner housing and the second member of each vibration dampening device is operatively engaged with the outer housing of the mounting assembly. In one embodiment, the mounting assembly may further comprised a base plate that may selectively secure the inner housing to a support surface. In one embodiment, the outer housing, inner housing, and base plate may each define an opening through which wiring from the vibration-sensitive component is received.

In another aspect, and exemplary embodiment of the present disclosure may provide a method of dampening vibration in a vibration-sensitive component comprising providing and vibration dampening device that includes a first member, a second member, and an isolator assembly positioned between the first member and the second member; resting the first member of the vibration dampening device on a support surface or operatively engaging the first member with the support surface; operatively engaging the second member of the vibration dampening device with the vibration-sensitive component; decoupling the vibration-sensitive component from the support surface with the vibration dampening device; and dampening vibrations to or from the vibration-sensitive component with the vibration dampening device.

In one embodiment, the decoupling of the vibration-sensitive component from the support surface may include decoupling the first member and the second member from one another. In one embodiment, the decoupling of the first member and the second member from one another may include interposing at least one isolator assembly between the first member and the second member. In one embodiment, the interposing of the at least one isolator assembly may include embedding a portion of a first isolator in the first member; embedding a portion of a second isolator in the second member; and extending an isolator insert between the first isolator and the second isolator. In one embodiment, the method may further comprise defining a gap between a first surface of the first member that includes the embedded portion of the first isolator and a first surface of the second member that includes the embedded portion of the second isolator. In one embodiment the method may further comprise providing a first housing and a second housing as the first member, wherein each of the first housing and the second housing rests upon or is secured to the support surface; providing a third housing as the second member; interposing the third housing between the first housing and the second housing; extending a first isolator assembly between the third housing and the first housing; and extending a second isolator assembly between the third housing and the second housing. In one embodiment, the method may further comprise snap-fittingly engaging the first housing and second housing to one another, and circumscribing the third housing with the snap-fitted first housing and second housing.

In one embodiment the method may further comprise operatively engaging the first member of one or more vibration dampening devices with a mounting plate, and resting the mounting plate on the support surface or fixedly engaging the mounting plate on the support surface. In one embodiment, the method may further comprising operatively engaging the second member with a faceplate; and operatively engaging the faceplate with the vibration-sensitive component. In one embodiment, the mounting plate may be provided as a wall of an inner housing and the faceplate may be provided as a wall of an outer housing; and the method may further comprising interlocking engaging the outer housing and inner housing with one another.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 30 is a front elevation view of an alternative mounting assembly which incorporates the third embodiment of vibration dampening device illustrated in FIG. 25a;

Similar numbers refer to similar parts throughout the drawings.

DETAILED DESCRIPTION

Figure 35:
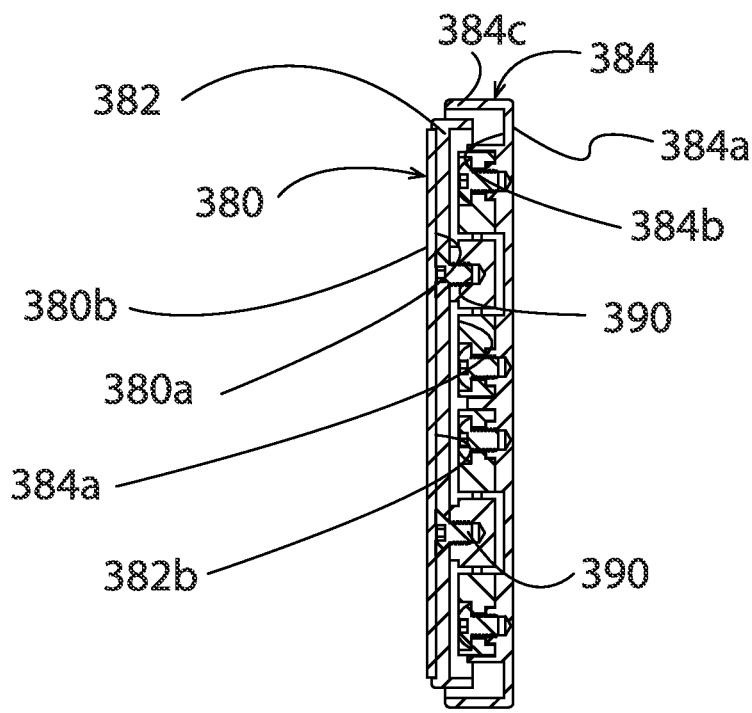
FIG. 35 is a cross-section of the alternative mounting assembly taken along line 35-35 of FIG. 33.
Figure 36:
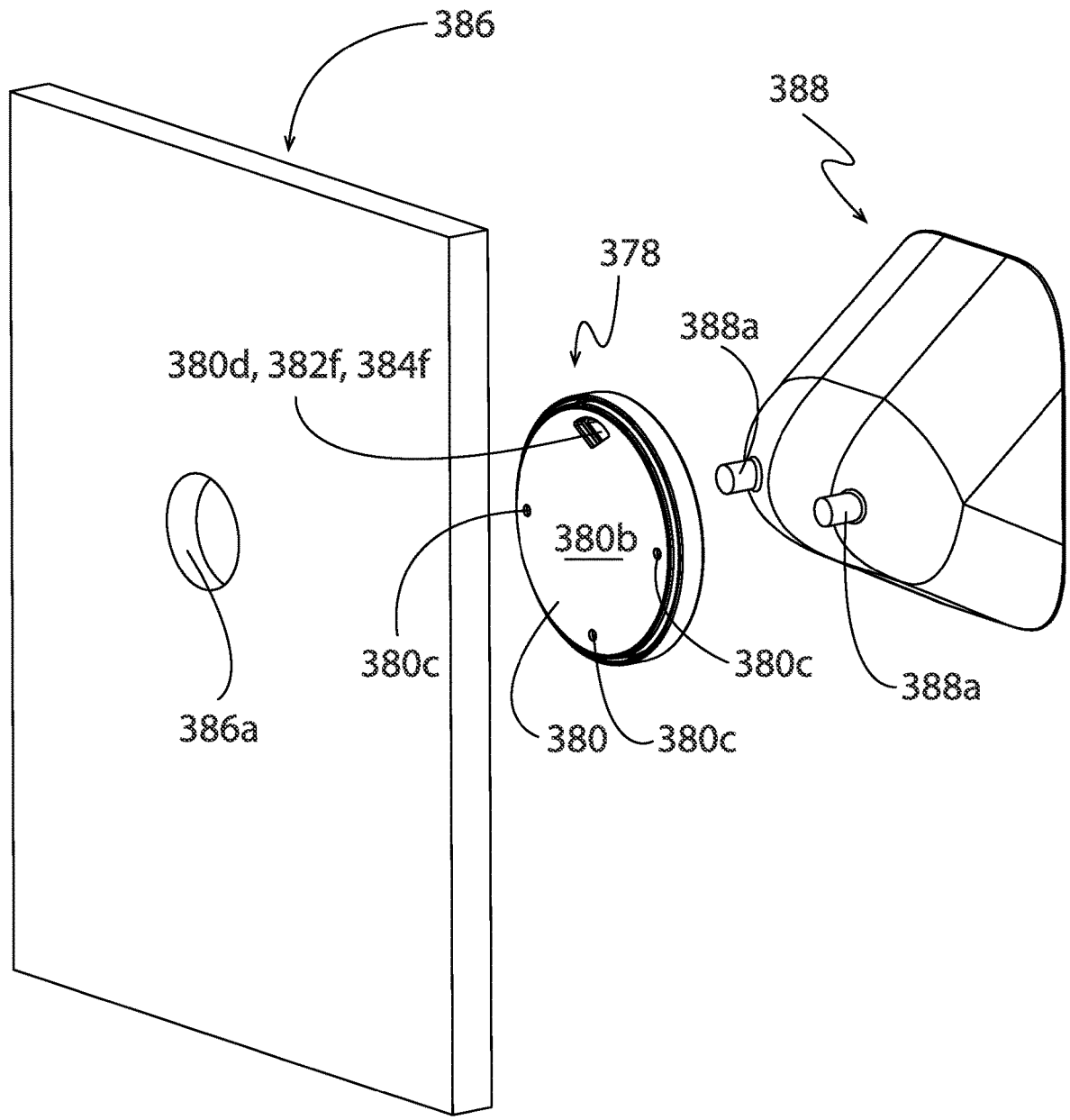
FIG. 36 is partially exploded rear perspective view of the alternative mounting assembly positioned to engage an article with a support surface.
Figure 37:
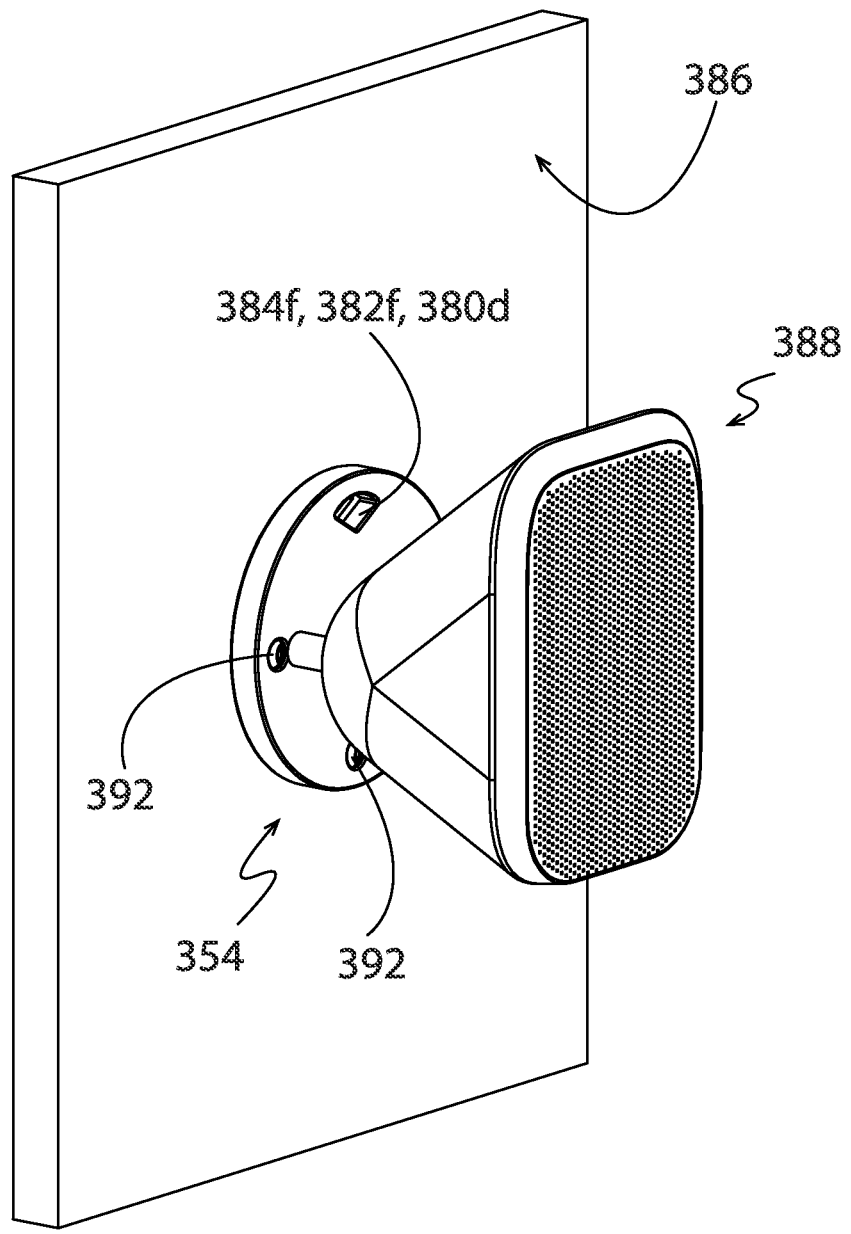
FIG. 37 is a top, front, left side perspective view of the alternative mounting assembly engaging the article to the support surface.
Figure 38:
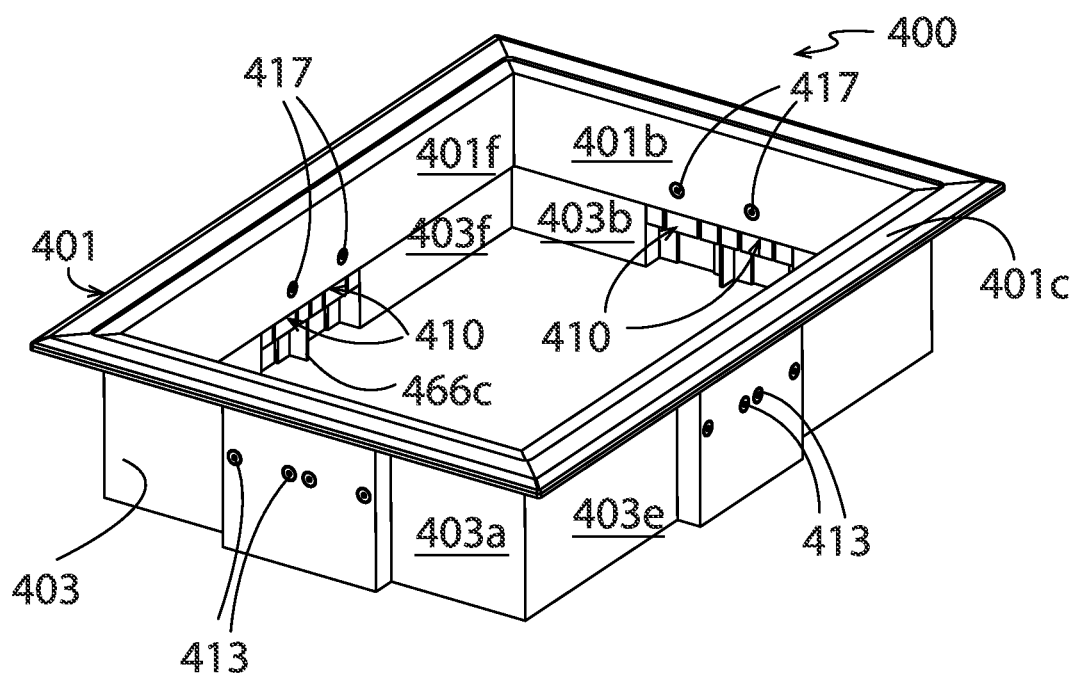
FIG. 38 is a top, front, right side perspective view of an in-wall mounting assembly for a speaker incorporating a vibration dampening device of the present disclosure.

Referring now to FIGS. 1 through 6, there is shown a first embodiment of a vibration dampening device in accordance with an aspect of the present disclosure generally indicated by the reference number 10. FIGS. 7A through 7D show exemplary applications of the vibration dampening device 10. FIGS. 8 through 17 illustrate a second embodiment of a vibration dampening device in accordance with an aspect of the present disclosure, generally indicated at 110. FIGS. 18 through 22 show exemplary applications of the vibration dampening device 110. FIGS. 23 through 28 show a third embodiment of a vibration dampening device in accordance with an aspect of the present disclosure, generally indicated at 210. FIG. 29 shows an exemplary application of the vibration damping device 210. FIGS. 30 through 35 show the third embodiment of the vibration dampening device 210 used in an alternative mounting assembly to that illustrated in FIGS. 23 through 28. FIGS. 36 and 37 show the alternative mounting assembly with included third embodiment vibration dampening device 210 used in other exemplary applications.

Vibration dampening device 10 comprises a first member, a second member, and an isolator assembly interposed between the first member and second member. The first member may be considered a base member that rests upon or is operably engaged with a support surface. The second member may be considered as an isolated member that is operably engaged with a vibration-sensitive component. The isolator assembly is interposed between the first member and second member and effectively decouples the second member from the first member, i.e., the isolator assembly effectively decouples the isolated member from the base member. The effect of the decoupling is that vibrations to or from the vibration sensitive component are attenuated by the isolator assembly instead of being transmitted to the vibration sensitive component and/or to the support surface.

The second embodiment and third embodiment vibration dampening devices 110 and 210 have base members that are comprised of two separate component parts which each selectively rest upon or are operatively engaged with a support surface. The isolated member, as in the first embodiment vibration dampening device 10, comprises a single component part that is operatively engaged with the vibration-sensitive component. An isolator assembly is interposed between each of the two separate component parts of the base member and the isolated member. In other words, the second embodiment and third embodiment vibration dampening devices 110, 210 preferably includes two isolator assemblies interposed between the parts of the first member and the second or isolated member. The isolator assemblies effectively decouple the second member from the two component parts of the first member, i.e., the isolator assembly effectively decouples the isolated member from the base member. The effect of the decoupling is that vibrations to or from the vibration sensitive component are attenuated by the isolator assemblies instead of being transmitted to the vibration sensitive component and/or to the support surface.

Figure 1:
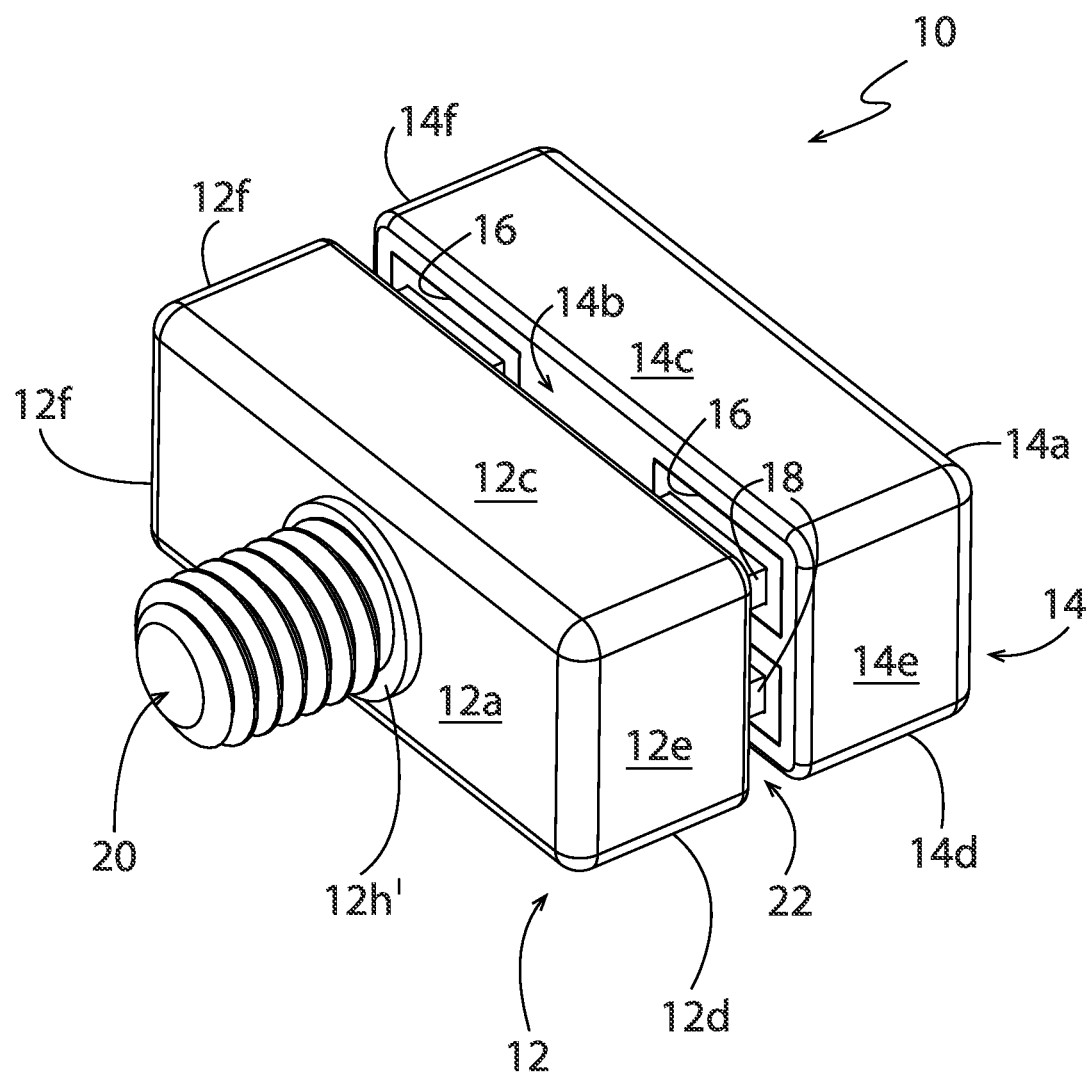
FIG. 1 is a top, front, right side perspective view of a first embodiment of a vibration dampening device in accordance with an aspect of the present disclosure.
Figure 2:
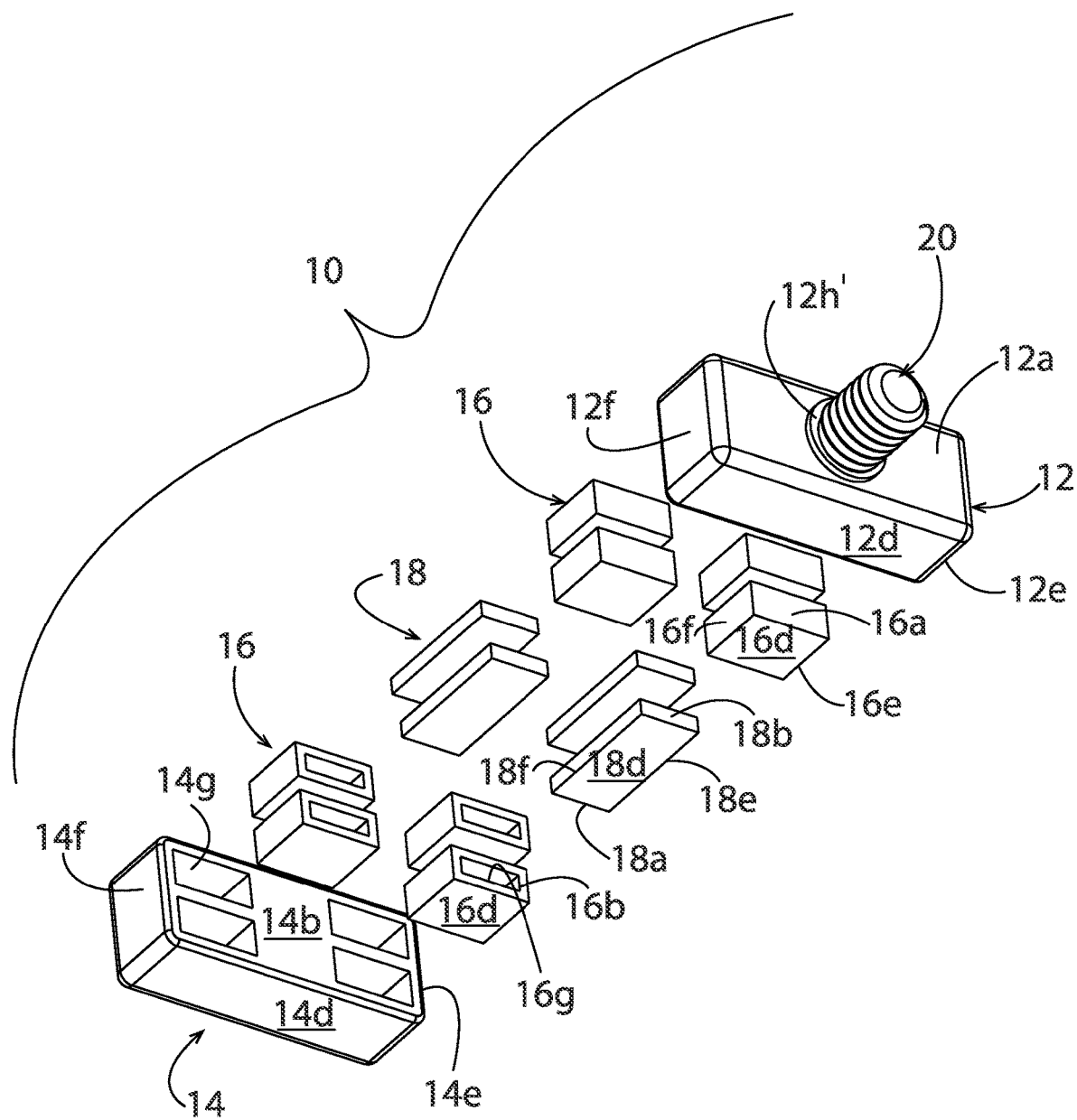
FIG. 2 is an exploded bottom, front, left side perspective view of the vibration dampening device of FIG. 1.
Figure 3:
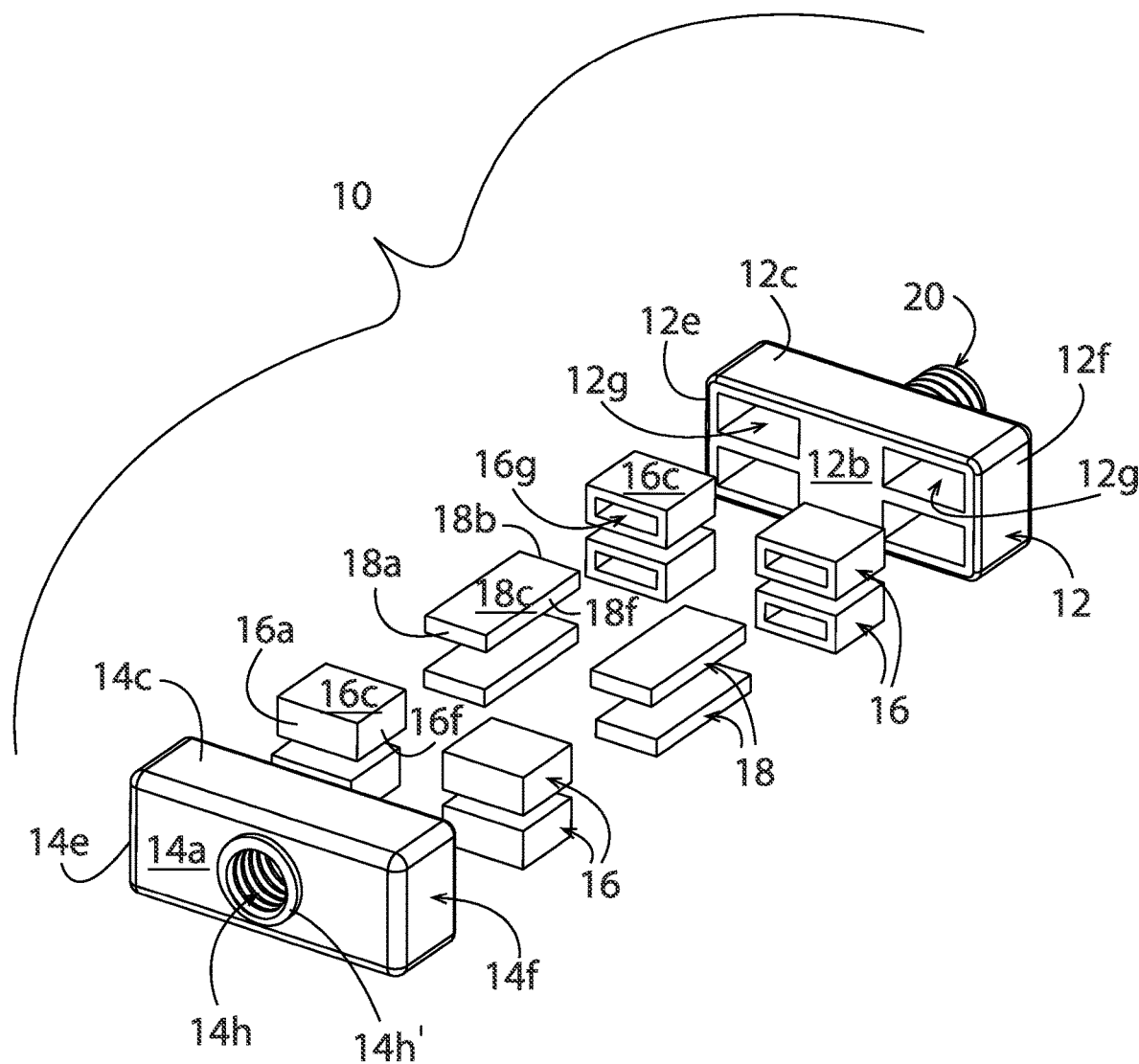
FIG. 3 is an exploded top, rear, right side perspective view of the vibration dampening device of FIG. 1.

Referring to FIGS. 1 to 6 and particularly to FIGS. 2 and 3, the various component parts of the first embodiment vibration dampening device 10 are shown. The vibration dampening device 10 comprises a first housing 12, a second housing 14, and an isolator assembly interposed between the first housing 12 and the second housing 14. The isolator assembly comprises at least two isolators 16 and at least one isolator insert 18. As illustrated in these figures, the isolator assembly includes a plurality of isolators 16 and a plurality of isolator inserts 18. In the particular configuration illustrated in FIGS. 1 through 6 either of the first housing 12 and second housing 14 may act as the first member or base member that is adapted to rest upon or be secured to a support surface. The other of the first housing 12 and second housing 14 will then act as the second member or isolated member that is operably engaged with a vibration sensitive component. This will be described in greater detail hereafter.

Referring still to FIGS. 2 and 3, first housing 12 and second housing 14 are substantially identical to one another and are arranged as mirror images of one another in vibration dampening device 10. In the isolator assembly all of the isolators 16 are substantially identical to one another and all of the isolator inserts 18 are substantially identical to one another.

First housing 12 includes an outer surface 12a, an inner surface 12b, a first end surface 12c, a second end surface 12d, a first side surface 12e, and a second side surface 12f. First housing 12 is a substantially solid component that is illustrated as being a rectangular cuboid in shape. (It will be understood, however, that the shape of first housing 12 may be a wide variety of other configurations and the illustrated shape should not unnecessarily be considered to limit the configuration of the first housing 12.)

As best seen in FIG. 3, first housing 12 defines four recesses 12g therein. Recesses 12g originate in openings defined in inner surface 12b and each recess 12g extends inwardly for a distance towards outer surface 12a, terminating a distance inwardly therefrom. First housing 12 defines four recesses 12g therein that are arranged in two rows and two columns. The recesses 12g in each row are horizontally aligned with one another. The recesses 12g in each column are vertically aligned with one another. Each recess 12g is generally a rectangular cuboid in shape and is oriented generally parallel to first end surface 12c and at right angles to inner surface 12b. Recesses 12g are separated from adjacent recesses 12g by solid sections of the material from which first housing 12 is fabricated.

While the first housing 12 is illustrated as having four recesses 12g defined therein, it will be understood that in other embodiments (not illustrated herein), only one recess 12g may be defined in first housing 12, or two recesses, three recesses, or more than four recesses may be defined therein. Additionally, the pattern (e.g., the rows and columns illustrated in FIG. 2) of the recesses 12g in first housing 12 may be different from what is illustrated in the attached figures and described herein. It will be understood that any suitable pattern of recesses 12g may be utilized in first housing 12. It will further be understood that the configuration of second housing 14, and the number and configuration of the isolators 16 and isolating inserts 18 will be complementary to the number and pattern of recesses 12g defined in first housing 12.

First housing 12 further includes a shallow depression (not shown) that is configured to receive a complementary fastener 20 (FIG. 1). The depression originates in an opening defined in outer surface 12a and extends for a relatively short distance inwardly towards inner surface 12b. An annular reinforcing flange 12h' circumscribes the opening to this shallow depression. flange 12h' not only reinforces the material of outer surface 12a surrounding the depression but also tends to act as a spacer between first housing 12 and a component with which vibration dampening device 10 will be operatively engaged, as will be discussed later herein. Fastener 20 extends outwardly for a distance beyond outer surface 12a. As illustrated in the figures, fastener 20 may include an exteriorly threaded shaft. It will be understood, however, that in other embodiments (not illustrated herein), fastener 20 may have a smooth shaft that is free of threads. In other words, fastener 20 may be more of a stud than a screw.

As indicated earlier herein, second housing 14 is substantially identical to first housing 12 except for differences that will be discussed below. Second housing includes an outer surface 14a, an inner surface 14b, a first end surface 14c, a second end surface 14d, a first side surface 14e, and a second side surface 14f. Second housing 14 is a substantially solid component that is a rectangular cuboid in shape and of similar dimensions to first housing 12.

As best seen in FIG. 2, second housing 14 defines four recesses 14g therein. Recesses 14g originate in openings defined in inner surface 14b and each recess 14g extends inwardly for a distance towards outer surface 14a, terminating a distance inwardly therefrom. Second housing 14 defines four recesses 14g therein that are arranged in two rows and two columns. The recesses 14g in each row are horizontally aligned with one another. The recesses 14g in each column are vertically aligned with one another. Each recess 14g is generally a rectangular cuboid in shape and is oriented generally parallel to first end surface 14c and at right angles to inner surface 14b. Recesses 14g are separated from adjacent recesses 14g by solid sections of the material from which second housing 14 is fabricated.

Figure 4:
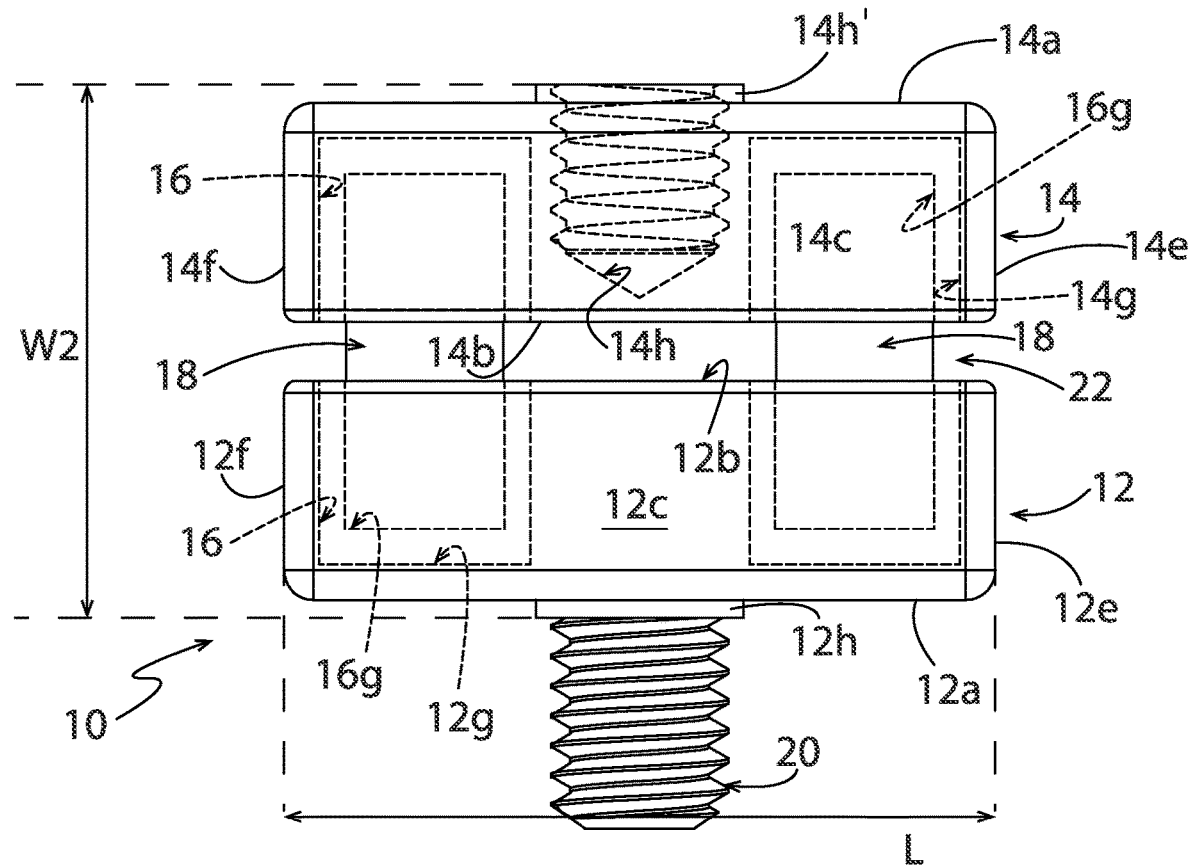
FIG. 4 is a top plan view of the vibration dampening device of FIG. 1 showing the configuration of the interior components in phantom.
Figure 5:
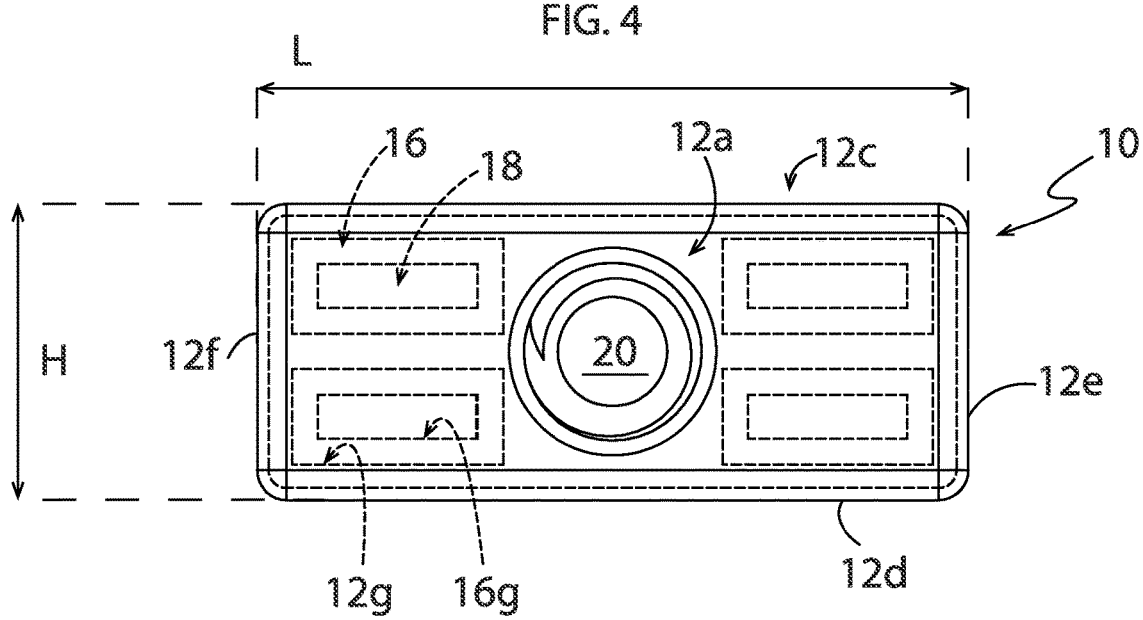
FIG. 5 is a front elevation view of the vibration dampening device of FIG. 1 showing the configuration of the interior components in phantom.
Figure 6:
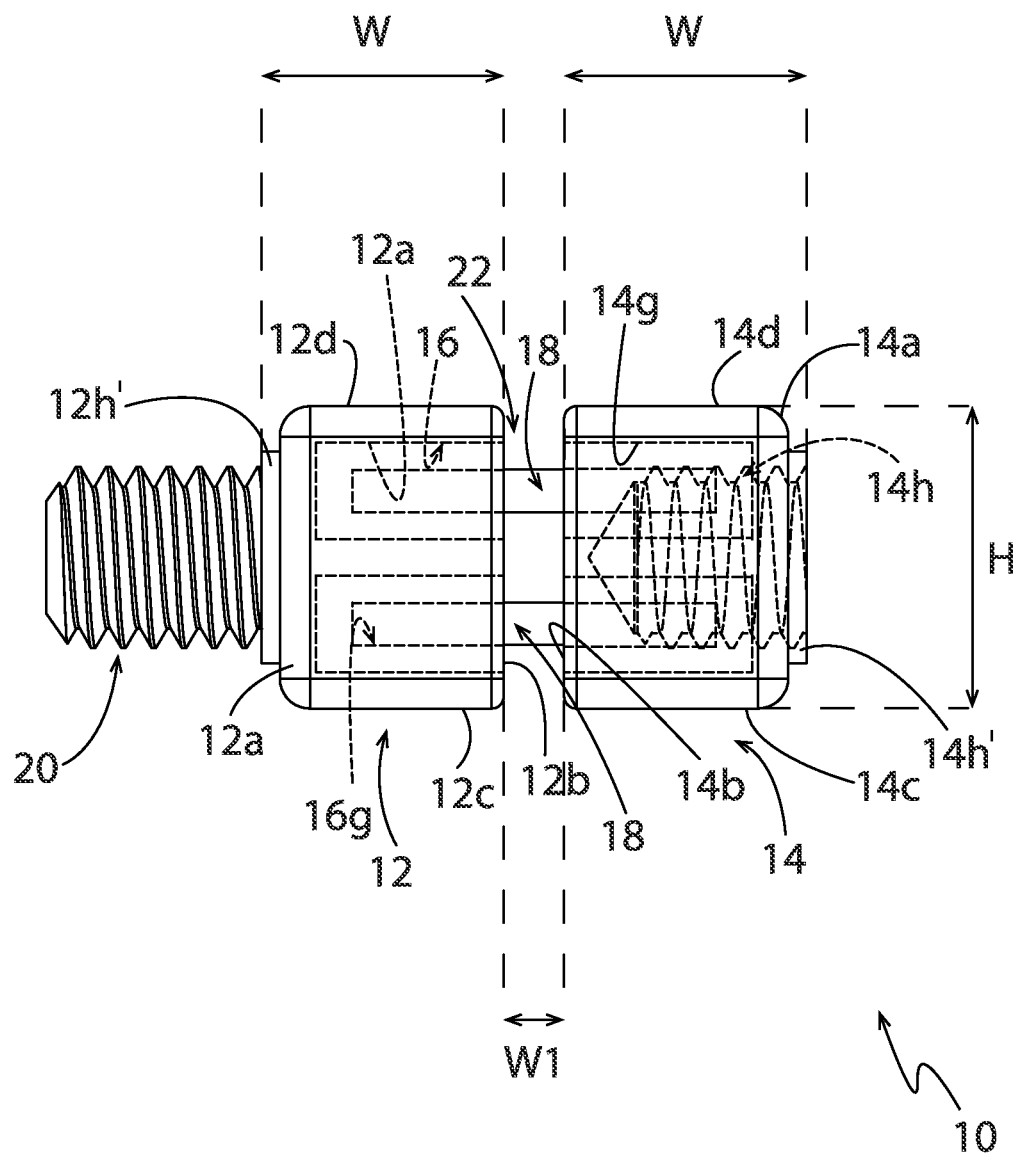
FIG. 6 is a right side elevation view of the vibration dampening device of FIG. 1 showing the configuration of the interior components in phantom.

Second housing 14 further includes a recess 14h that is configured to receive a complementary fastener therein as will be described later herein. Recess 14h originates in an opening defined in outer surface 14a and extends for a distance inwardly towards inner surface 14b. Recess 14h terminates a distance inwardly away from inner surface. Recess 14h is located between the two columns of recesses 14g and is separated therefrom by a section of solid material. An annular reinforcing flange 14h' circumscribes the opening to recess 14h. flange 14h' not only reinforces the material of outer surface 14a proximate recess 14h but also tends to act as a spacer between first housing 14 and a component with which vibration dampening device 10 is operatively engaged. FIG. 4 shows that an interior surface of first housing 14 which bounds and defines recess 14h is threaded and is configured to receive a complementary threaded shaft of a fastener to be received therein.

Vibration dampening device 10, as described earlier herein, also includes a plurality of isolators 16. Each isolator 16 is fabricated from material that is one or more of resilient, shock absorbing, and vibration dampening. Suitable materials for use in the fabrication of isolator 16 include rubber-like materials such as natural rubber and synthetic viscoelastic urethane polymers. Each isolator 16 is complementary in shape and size to one of the recesses 12g or 14g defined in first housing 12 or second housing 14, respectively. Vibration dampening device 10, as illustrated, includes eight substantially identical isolators 16. Referring to FIGS. 2 and 3, each isolator 16 is generally a rectangular cuboid in shape and includes an outer wall 16a, an inner wall 16b, a first end wall 16c, a second end wall 16d, a first side wall 16e, and a second side wall 16f. A recess 16g is defined within each isolator 16. The recess 16g originates in an opening defined in the inner wall 16b and extends for a distance into the interior of isolator 16 towards outer wall 16a. Recess 16g terminates a distance inwardly from outer wall 16a. Each recess 16g is oriented substantially parallel to the first end wall 16c of the isolator 16.

When vibration dampening device 10 is assembled each of the plurality of isolators 16 is inserted into one of the recesses 12g, 14g defined in first housing 12 or second housing 14, respectively. When the isolator 16 is inserted into the recess 12g, 14g, the outer wall 16a is inserted first into the associated recess 12g, 14g and the isolator 16 is pushed inwardly until the outer wall 16a abuts an innermost surface of first or second housing 12, 14 that is oriented parallel to outer surface 12a, 14a, respectively. When isolator 16 is correctly inserted into the associated recess 12g, 14g, the inner wall 16b of the isolator 16 will be substantially flush with the inner surface 12b, 14b of the associated first housing 12 or second housing 14. This arrangement can be seen in FIG. 1 and FIG. 4.

Isolator inserts 18 are all generally rectangular cuboids in shape and are substantially identical to one another. In some applications, one suitable material for the fabrication of isolator inserts 18 is metal. In other applications, one suitable material for the fabrication of isolator inserts 18 is plastic. Isolator inserts 18 are substantially rigid components that may be substantially solid in nature, i.e., free of any interior voids. (It will be understood that in other applications, the isolator inserts 18 may be hollow.

Referring to FIGS. 2 and 3, each isolator insert 18 has an outer surface 18a, an inner surface 18b, a first end surface 18c, a second end surface 18d, a first side surface 18e, and a second side surface 18f. Each isolator 18 is configured to be inserted into the recesses 16g of two opposed isolators 16, where a first of the two isolators 16 is received in one of the recesses 12g defined in first housing 12 and a second of the two isolators 16 is received in an aligned recess 14g defined in second housing 14. The height of each isolator insert 18 (measured between first end surface 18c and second end surface 18d is substantially complementary to a vertical height of the recesses 16g defined in the isolators 16. The width of each isolator insert 18 (measured between first side surface 18e and second side surface 18f is substantially complementary to the horizontal width of the recesses 16g defined in the isolators 16. The length of each isolator insert 18 (measured between the outer surface 18a and the inner surface 18b is greater that the depth of both recesses added together.

As can be best seen in FIG. 4, when vibration dampening device 10 is assembled for use, isolator inserts 18 are operatively engaged in two opposed aligned recesses 16g, 16g of isolators 16, 16 which are operatively engaged in the two opposed aligned recesses 12g, 14g of the first housing 12 and second housing 14. As is further evident from FIG. 4, when the isolator inserts 18 extend between the two isolators 16 engaged in the first and second housings 12, 14, the length of isolator inserts 18 is such that a central region of each isolator insert 18 is positioned between the inner surfaces 12b, 14b of the first and second housings 12, 14. The arrangement ensures that a gap 22 is defined between inner surface 12f and inner surface 14f. In other words, the first and second housings 12, 14 are kept a distance apart from one another. This will be discussed further below.

In some embodiments, first housing 12 and second housing may be fabricated from metal. In other embodiments, first housing 12 and second housing 14 may be fabricated from plastic. Any suitable material having properties that are advantageous for a particular application in which vibration dampening device 10 is useful may be utilized to fabricate first housing 12 and/or second housing 14. In some embodiments it may be advantageous to fabricate first and second housings 12, 14 from different materials.

The outer surface 12a, inner surface 12b, first end surface 12c, and second end surface 12d of first housing are all of a length "L" (FIG. 4), where the length "L" is measured between first side surface 12e and second side surface 14f. The first side surface 12e and second side surface 12f are of a width "W'" (FIG. 6) measured between an outermost surface of the annular flange 12h' on outer surface 12a and the inner surface 12b. The outermost surface of the annular flange 12h' discussed above is the surface of annular flange 12h' that is oriented generally parallel to outer surface 12a of first housing 12. Outer surface 12a, inner surface 12b, first side surface 12e, and second side surface 12f are all of a height "H" (FIG. 5) measured between first end surface 12c and second end surface 12d.

The outer surface 14a, inner surface 14b, first end surface 14c, and second end surface 14d of second housing 14 are all of substantially the same length "L" as similar parts of first housing 12. The length "L" is measured between first side surface 14e and second side surface 14f. The first side surface 14e and second side surface 14f are of the same width "W'" as similar parts of first housing 12. The width "W'" is measured between an outermost surface of the annular flange 14h' on outer surface 14a and the inner surface 14b. The outermost surface in question is the one parallel to outer surface 14a of second housing 14. Outer surface 14a, inner surface 14b, first side surface 14e, and second side surface 14f are all of the same height "H" as similar parts of first housing 12. The height "H" is measured between first end surface 14c and second end surface 14d.

In one embodiment of vibration dampening device 10 in accordance with an aspect of the present disclosure, the length "L" of first housing 12 is greater than the width "W'" thereof. The height "H" of first housing 12 may be greater than the width "W'", equal to the width "W'", or smaller than the width "W'". In one embodiment, the length "L" of first housing 12 is about 12 mm, the width "W'" of first housing 12 (FIG. 6) may be about 4 mm, and the height "H" of first housing 12 (FIG. 5) may be about 5 mm. The gap 22 defined between first housing 12 and second housing 14 (FIG. 6) may be of a width "W1" of about 1 mm. The overall width "W2" of the vibration dampening device 10 (FIG. 4) may therefore be about 9 mm. In one embodiment, the height of flange 14h' relative to outer surface 14a is about 1 mm. It will be understood that vibration dampening device 10 will be fabricated with dimensions that are suitable for the application in which device 10 is to be used. The dimensions mentioned above are exemplary only.

Figure 7A:
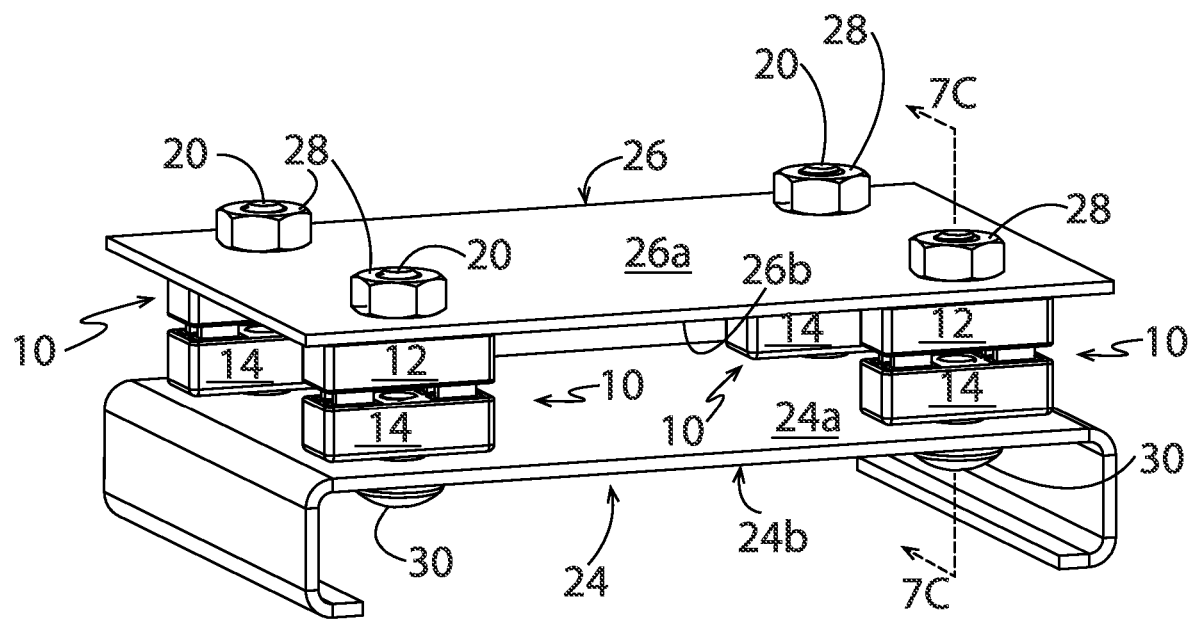
FIG. 7A is a diagrammatic top perspective view of a plurality of vibration dampening devices interposed between a chassis or frame of a piece of electronic equipment and a first Printed Circuit Board (PCB)
Figure 7B:
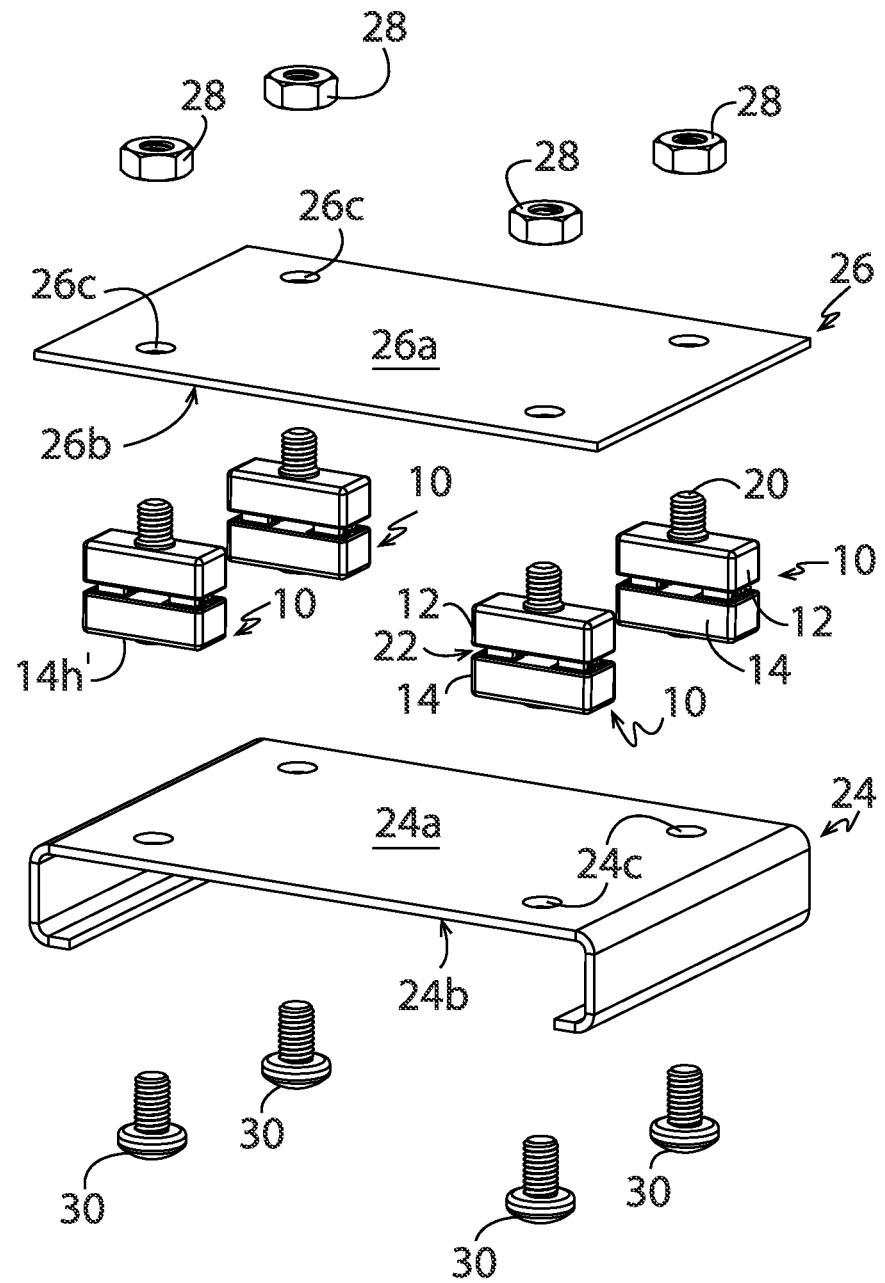
FIG. 7B is an exploded diagrammatic top perspective of the first PCB, plurality of vibration dampening devices, and chassis or frame of the piece of electric equipment shown in FIG. 7A.
Figure 7C:
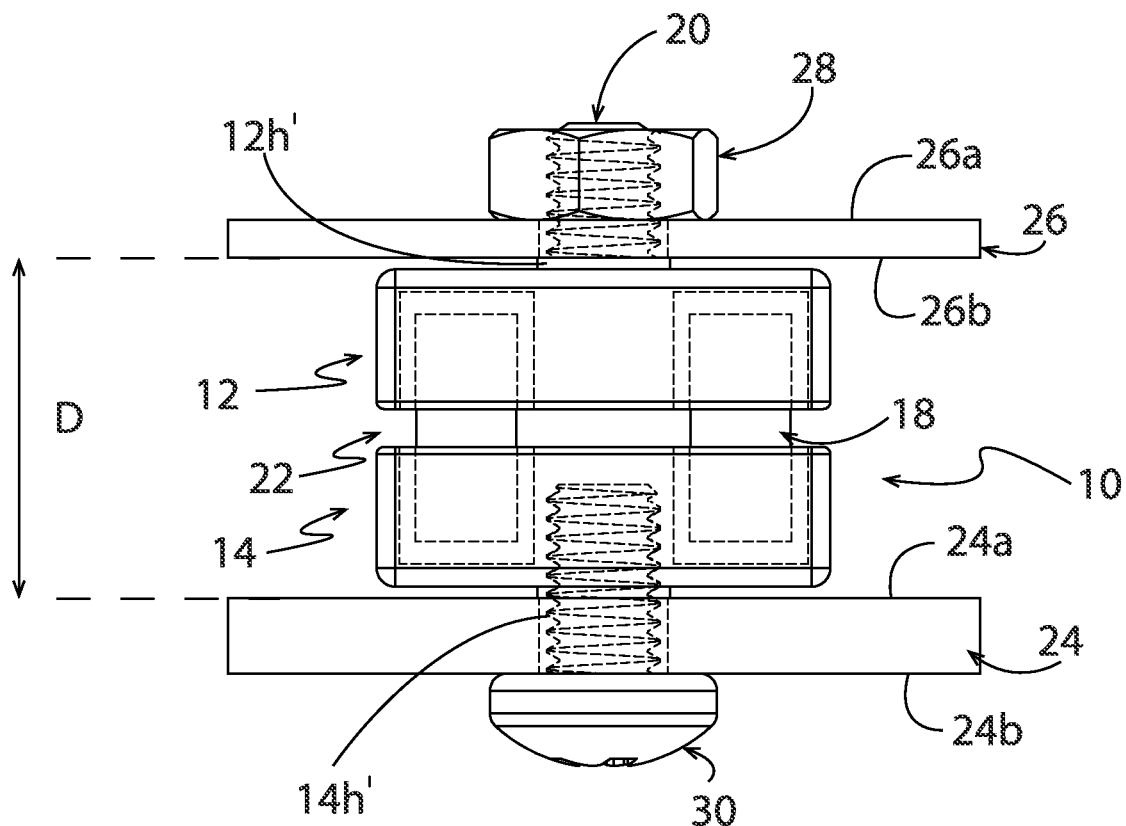
FIG. 7C is side elevation view of a single vibration dampening device interposed between the chassis or frame of the piece of electronic equipment and a first PCB taken along line 7C-7C of FIG. 7A.

Referring now to FIGS. 7A through 7C, the vibration dampening device 10 is illustrated in exemplary applications in the real world. In a first exemplary application, illustrated in FIG. 7A and 7B, the vibration dampening device 10 is utilized as a base unit that is operatively engaged between a chassis or frame of a piece of electronic equipment and a first printed Circuit Board (hereafter "first PCB"). In these figures, the chassis or frame of the piece of electronic equipment is indicated by the reference character 24 and the first PCB is indicated by the reference character 26. In this exemplary application a plurality of identical vibration dampening devices 10 are interposed (i.e., positioned) between chassis 24 and first PCB 26. PCBs are vibration sensitive components and vibration dampening devices 10 are provided to decouple this vibration sensitive component from the chassis 24.

As illustrated in FIGs.7A through 7C, chassis 24 has an inner surface 24a and an outer surface 24b. A plurality of holes 24c is defined in chassis 24 extending between inner surface 24a and outer surface 24b. First PCB 26 has an outer surface 26a and an inner surface 26b and a plurality of openings 26c are defined in first PCB 26 with each opening 26c extending between outer surface 26a and inner surface 26c. Each vibration dampening device 10 is interposed between outer surface 24a of chassis 24 and inner surface 26b of first PCB 26. Each vibration dampening device 10 is oriented such that the fastener 20 which extends outwardly from outer surface 12a of first housing 12 thereof extends through one of the openings 26c defined in first PCB 26. Additionally, the hole 14h defined in outer surface 14a of second housing 14 is aligned with one of the holes 24c defined in chassis 24. A nut 28 is threadedly engaged with a portion of each fastener 20 which extends outwardly beyond outer surface 26a of first PCB 26. Additionally, a fastener 30 is inserted through each hole 24c defined in chassis 24 and is threadedly engaged in the internally threaded hole 14h defined in second housing 14. When nut 28 and fastener 30 are tightened with respect to each vibration dampening device 10, first PCB 26 is secured to chassis 24. It should be noted that annular flange 12h' spaces the first PCB 26 a distance away from outer surface 12a of first housing 12. Similarly, the annular flange 14h' spaces the outer surface 14a of second housing 14 a distance away from outer surface 24a of chassis 24.

Vibration dampening devices 10 therefore secure first PCB 26 and chassis 24 to one another. However, because of the presence of isolators 16, isolator inserts 18 and the gap 22 defined between first and second housings 12, 14, first PCB is effectively decoupled from chassis 24 and is suspended a distance "D" (FIG. 7C) away from outer surface 24a of chassis 24. The distance "D" is substantially equal to the overall width "W2" (FIG. 7C and 4) of the vibration dampening device 10. The vibration dampening devices 10 are configured to attenuate vibrations coming to or from first PCB 26. In the configuration illustrated in FIGS. 7A to 7C, the second housing 14 acts as a base member of the vibration dampening device 10 and the first housing 12 acts as an isolated element of the vibration dampening device 10. The isolated element (i.e., first housing 12) is effectively "suspended" off the surface of the chassis 24 by the base member (i.e., second housing 14), and therefore any vibrations generated by first PCB 26 will be dampened by the isolators 16 and will not be passed to chassis 24. Similarly, any vibrations in chassis 24 will be dampened by isolators 16 and will not be passed to first PCB 26. The first PCB 26 is therefore effectively decoupled from the chassis 24 by the vibration dampening device 10.

Figure 7D:
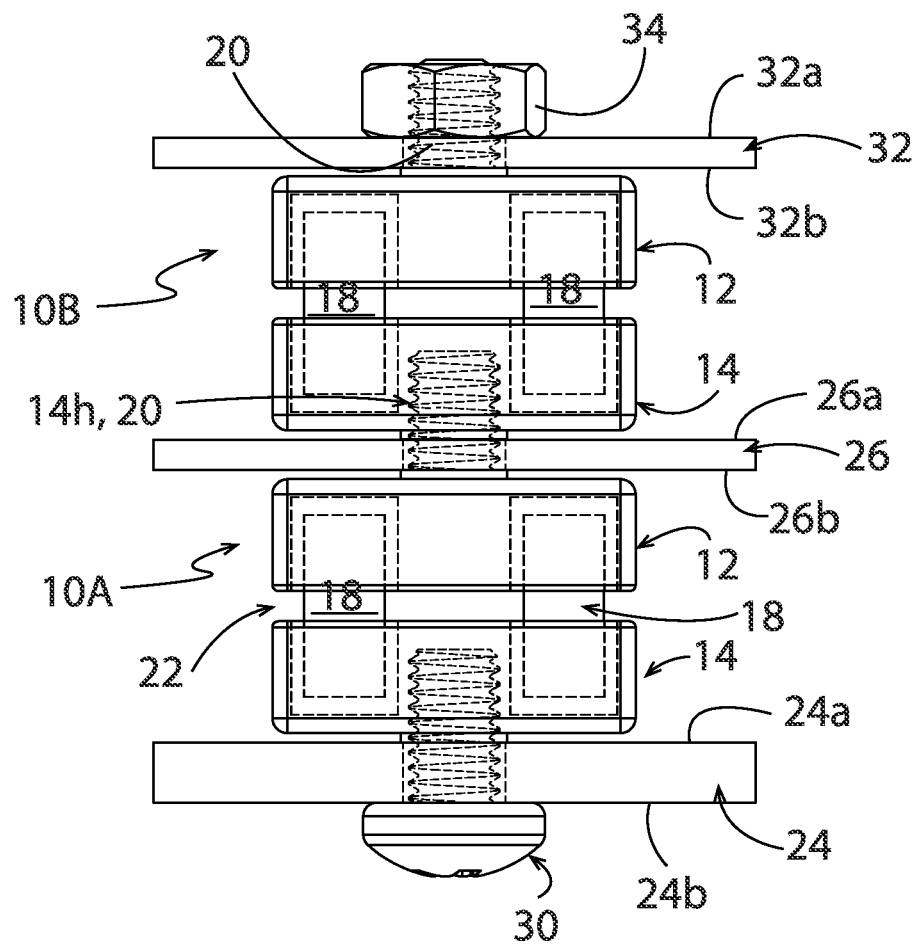
FIG. 7D is a diagrammatic side elevation view of two vibration dampening devices interposed respectively between a portion of a chassis or frame of a piece of electronic equipment and a first PCB, and between the first PCB and a second PCB.
Figure 8:
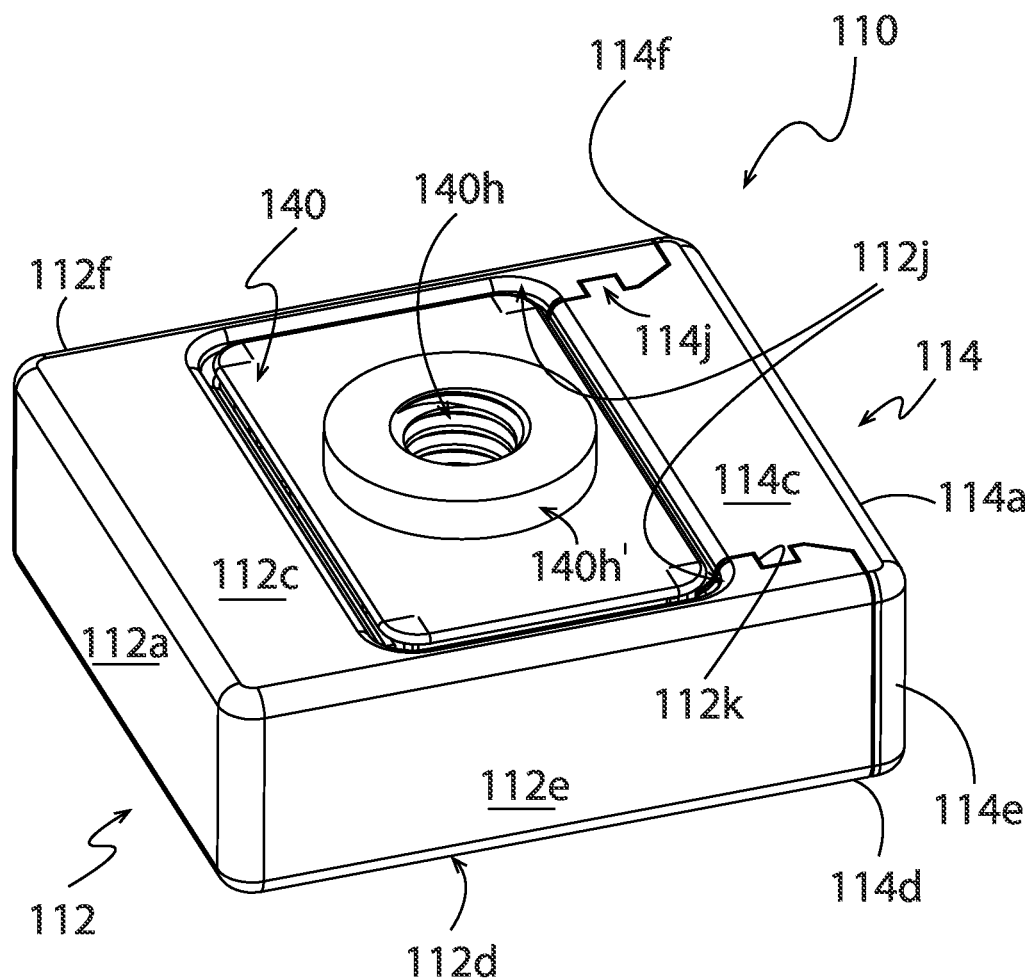
FIG. 8 is a top, front, right side perspective view of a second embodiment of a vibration dampening device in accordance with an aspect of the present disclosure.

FIG. 7D shows a plurality of vibration dampening devices 10 being utilized to decouple a plurality of components from one another in order to dampen vibrations to and from the vibration sensitive components of the system. In the illustrated exemplary system there are two vibration sensitive components, namely first PCB 26 and a second PCB 32 that are to be attached to a chassis or frame 24 of a piece of electronic equipment. Second PCB 32 has an outer surface 32a and an inner surface 32b, and a plurality of openings similar to the openings 26c defined in first PCB 26 are defined in second PCB 32. Each opening (not shown) extends between outer surface 32a and inner surface 32b of second PCB 32. First PCB 26 is engaged with chassis 24 utilizing one or more isolating assemblies 10. FIG. 7D shows only a single vibration dampening device 10A interposed between chassis 24 and first PCB 26 but it will be understood that additional vibration dampening devices 10 may be interposed between chassis 24 and first PCB 26.

It will be understood that vibration dampening device 10 tend to be sensitive to weight being applied thereto. The vibration dampening devices 10 will therefore be dimensioned in such a way as to enable the device 10 to carry the load applied thereto. However, because of this sensitivity to weight, there may be a limit as to how many PCBs can be stacked one on top of the other. In some applications (not illustrated herein) spacers may be utilized to maintain a minimum spacing between two or more vibration dampening devices 10 or between a vibration dampening device 10 and a PCB or between the components of a single vibration dampening device 10.

Vibration dampening device 10A is secured to chassis 24 as described earlier herein with respect to FIGS. 7A to 7C. The fastener 20 that extends outwardly from first housing 12 of vibration dampening device 10A is inserted through one of the openings 26c (not numbered in FIG. 7D) but instead of a nut 28 being used to lock fastener 20 in place and thereby secure first PCB 26 to chassis 24, fastener 20 is threadedly engaged in an aligned hole 14h of a second vibration dampening device 10B that is positioned adjacent the outer surface 26a of first PCB 26. The fastener 20 extends outwardly beyond outer surface 12a of a first housing 12 of second vibration dampening device 10B. This fastener 20 is received through an aligned opening (not numbered) defined in second PCB 32. A nut 34 is then threadedly engaged with the fastener 20 extending outwardly from second vibration dampening device 10B. When nut 34 is tightened then second PCB 32, first PCB 26, and chassis 24 are all operatively engaged with one another. The stacked isolation assemblies 10A, 10B will attenuate vibrations coming to or from the first PCB 26 and second PCB 32. It will be understood that additional PCBs may be engaged with the stacked components illustrated in FIG. 7D. This may be accomplished by removing nut 34, threadedly engaging yet another vibration dampening device (similar to isolating assemblies 10A, 10B) with the fastener 20 extending outwardly beyond second PCB's upper surface 32a, and then engaging yet another PCB or another chassis, or some other component, into threaded engagement with the fastener extending outwardly from the third vibration dampening device, and so on. This vertically-stacked configuration of horizontally-oriented vibration sensitive components is dampened by the provision of two or more isolating assemblies in accordance with the present disclosure. The stacked configuration illustrated in FIG. 7D includes vibration dampening devices 10 above and below at least the first PCB 26, thereby helping to maintain the first PCB's position and to attenuate vibrations passing to or from the first PCB 26 and second PCB 32.

It will be understood that while the PCBs in FIG. 7D are illustrated as being stacked vertically one above the other, in other instances the vibration sensitive components may be vertically oriented and stacked laterally spaced apart from one another across a lateral surface of the chassis 24. This laterally-stacked configuration of vertically-oriented vibration sensitive components is dampened by the provision of two or more isolating assemblies in accordance with the present disclosure.

It will be understood that while the fasteners 20, 30 disclosed herein have been illustrated as screw-type components, in other embodiments, one or both of these fasteners may, instead, be a smooth-sided stud that projects outwardly from the chassis 24, or from the first PCB 26, or from one or the other of the first and second housings 12, 14. The complementary component will then define a complementary recess for receiving the stud. For example, the stud may have smooth side surfaces instead of threaded side surfaces and will be received in a complementary smooth-sided recess. If the stud is provided on the vibration dampening device then that stud will be received in a complementary recess in the first PCB, for example. Alternatively, a stud may be provided on the chassis and that stud will be received in a complementary recess defined in the vibration dampening device.

Referring now to FIGS. 8 through 16, there is shown the second embodiment of the vibration dampening device in accordance with an aspect of the present disclosure, generally indicated at 110. Vibration dampening device 110 includes a two-component first member or base member that is configured to rest upon or be operatively engaged to a support surface. Vibration dampening device 110 includes a second member or isolated member that is configured to be operatively engaged with a vibration sensitive component. An isolator assembly is interposed between the isolated member and each of the two component parts of the base member.

Figure 9:
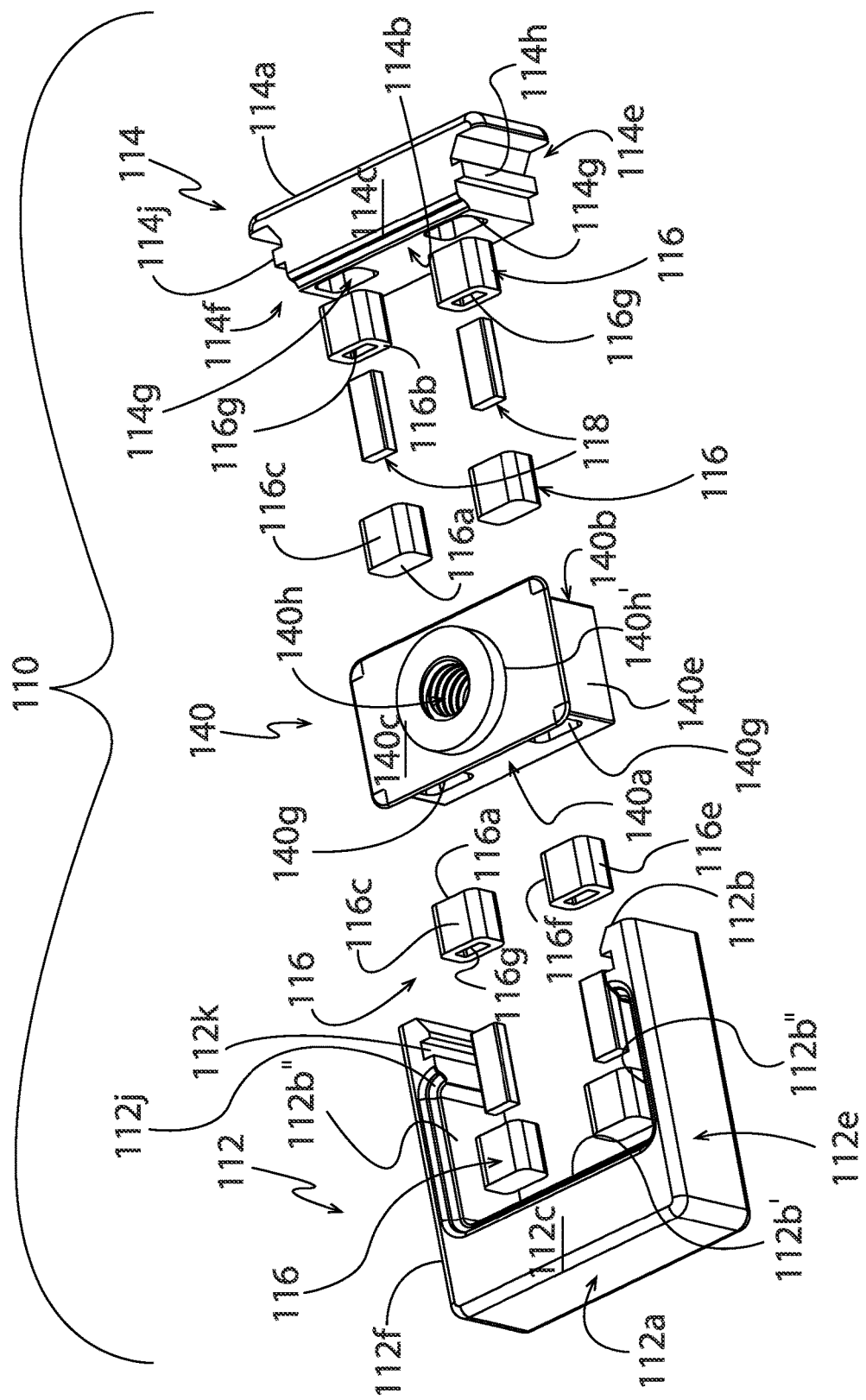
FIG. 9 is an exploded top, front, right side perspective view of the vibration dampening device of FIG. 8.
Figure 10:
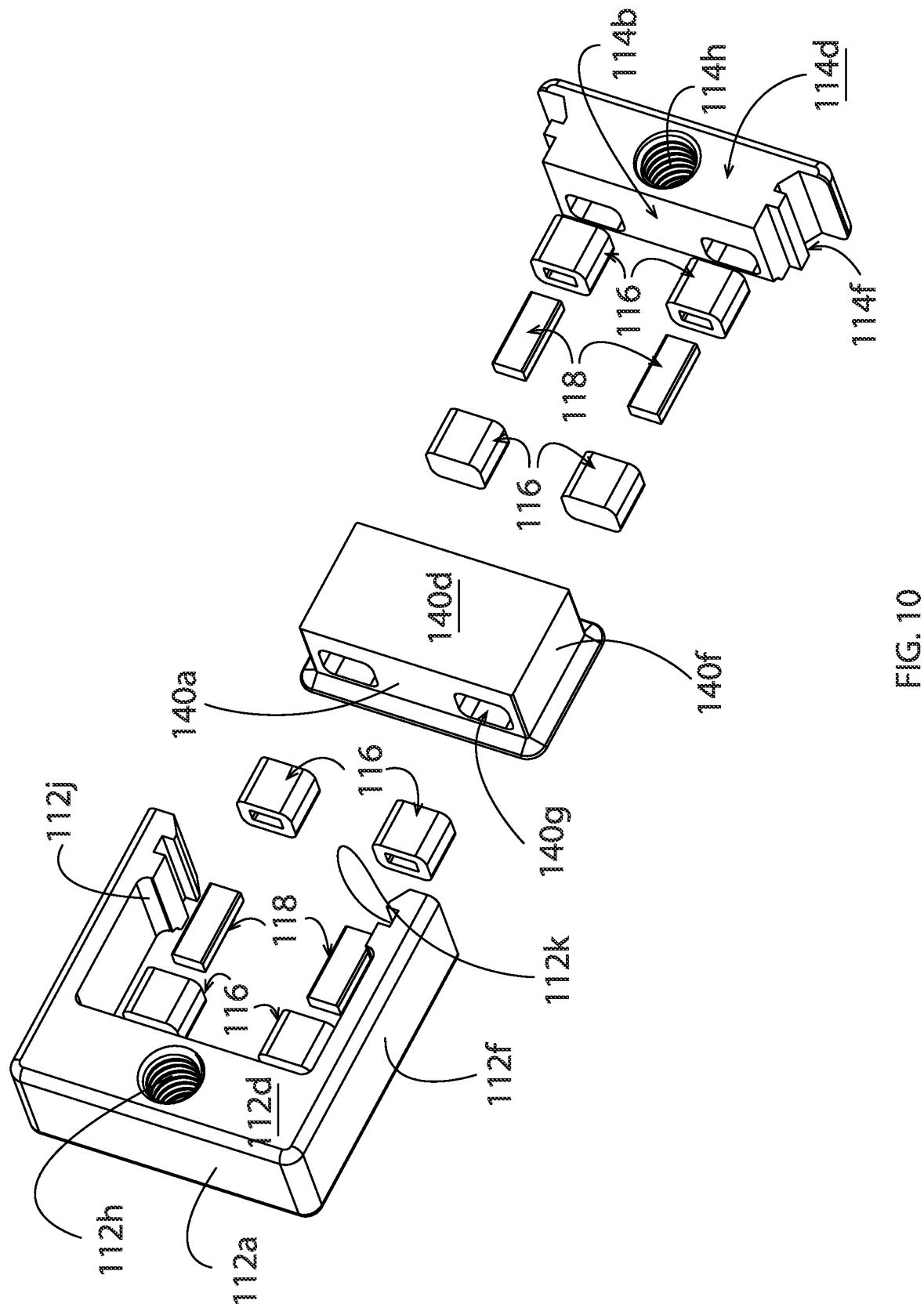
FIG. 10 is an exploded bottom, rear, left side perspective view of the vibration dampening device of FIG. 8.
Figure 11:
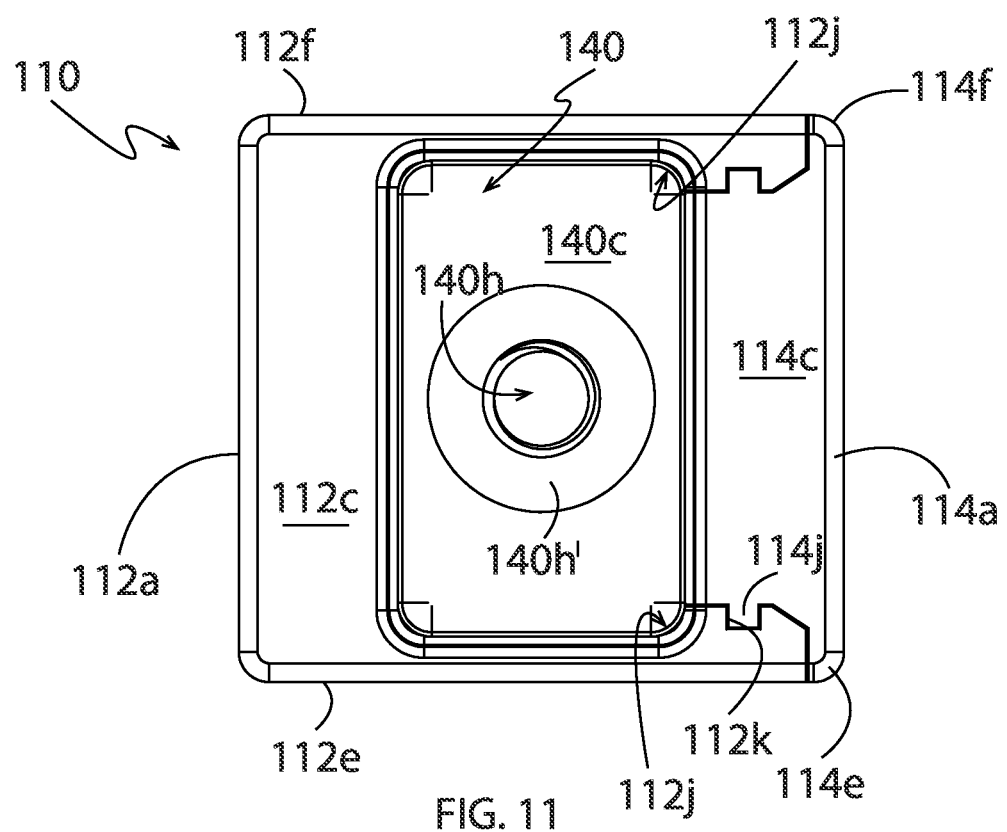
FIG. 11 is a top plan view of the vibration dampening device of FIG. 8.
Figure 12:
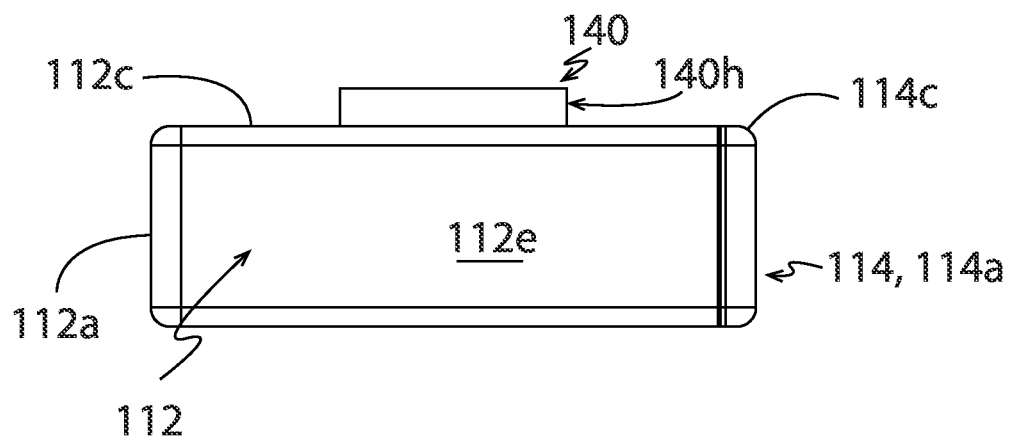
FIG. 12 is a right side elevation view of the vibration dampening device of FIG. 8.
Figure 14:
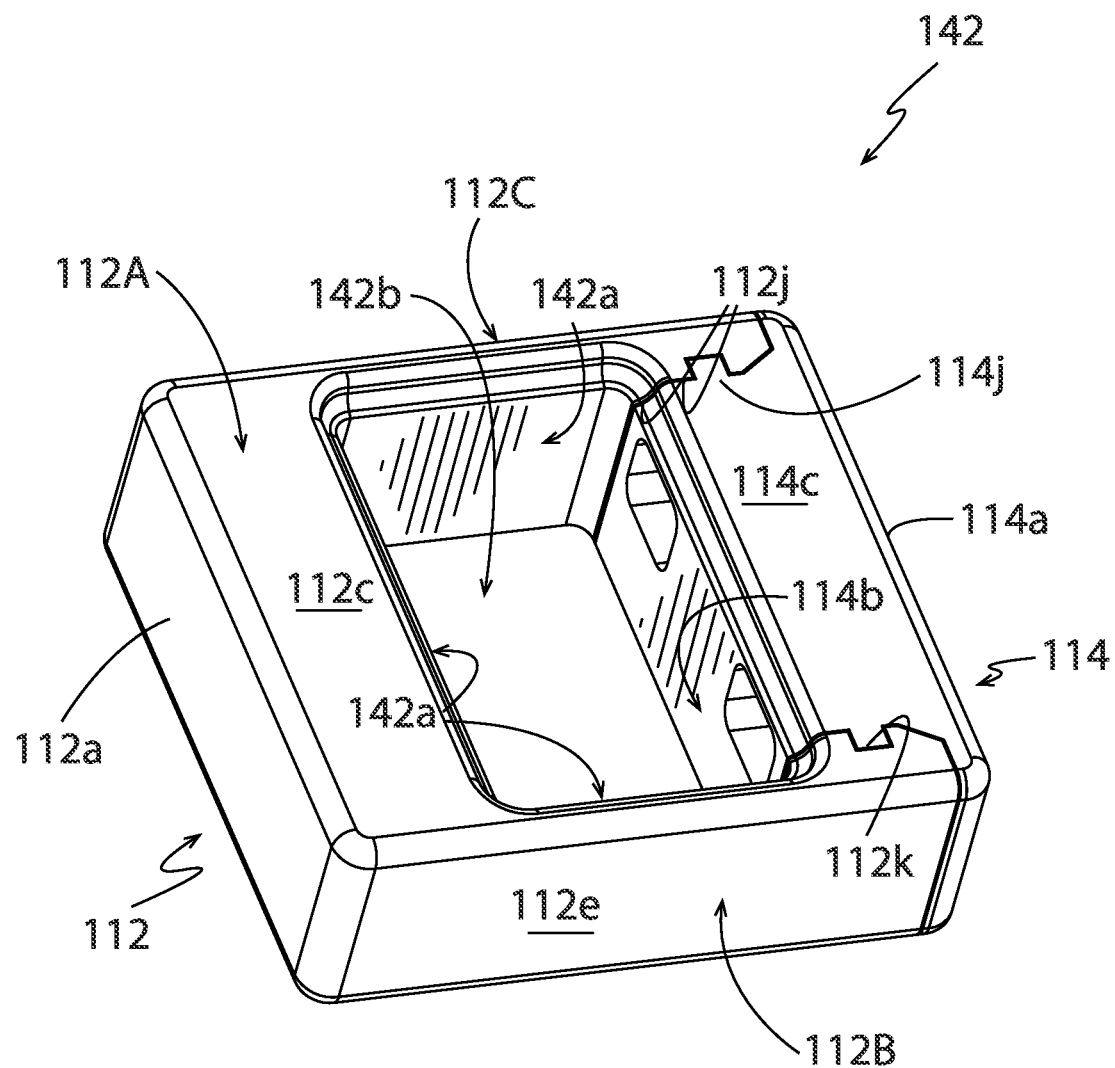
FIG. 14 is a top, front, right side perspective view of a base member of the vibration dampening device shown in isolation.

As best seen in FIGS. 9 and 10 includes a first housing 112 and a second housing 114. The first housing 112 and second housing 114, together, comprise the first member or base member of the vibration dampening device 110. The vibration dampening device 110 includes a plurality of isolator assemblies that are comprised of a plurality of isolators 116 and a plurality of isolator inserts 118. In contrast to vibration dampening device 10, vibration dampening device 110 also a third housing 140. The third housing 140 comprises the second member or isolated member that is operatively engaged with the first housing 112 by at least a first isolator assembly and is operatively engaged with the second housing 114 by at least a second isolator assembly. The first and second isolator assemblies effectively decouple the third housing 140 from the first housing 112 and the second housing 114. In this embodiment, the third housing 140 is circumscribed by first housing 112 and second housing 114. The first housing 112 and second housing 114 are configured to interlockingly engage one another to form the base member 142 (FIG. 14). All of these components and their interaction and relationships with one another will be described hereafter.

Referring to FIGS. 9 and 10, it can be seen that first housing 112 is a generally U-shaped component when viewed from above and includes a base with two generally parallel leg regions extending outwardly from opposed ends of the base in generally a same direction. The base is identified in FIG. 14 by the reference character 112A and the two leg regions are identified by the reference characters 112B and 112C. Base 112A is substantially a rectangular cuboid in shape. The first leg 112B and the second leg 112C are substantially identical to one another but are arranged as mirror images of one another. The first leg 112B and second leg 112C will be discussed further later herein.

First housing 112 has an outer surface 112a, an inner surface 112b, a first end surface 112c, a second end surface 112d, a first side surface 112e and a second side surface 112f. Because of the U-shape of first housing 112, inner surface 112b is a generally U-shaped surface. A first portion 112b' of that U-shaped inner surface 112b is generally parallel to outer surface 112a and is identified by the reference character 112b'. A second portion and a third portion of the U-shaped inner surface 112b extend along the first leg 112B and the second leg 112C, respectively, and are both identified by the reference character 112b".

A plurality of recesses 112g (FIGS. 10 and 15) is defined in first portion 112b' of inner surface 112b. Recesses 112g are substantially identical to one another in both configuration and function. In the illustrated embodiment, first housing 112 defines two recesses 112g therein. The recesses 112g are substantially identical in function to the recesses 12g of vibration dampening device 12 but may be slightly differently shaped relative to the recesses 12g. Each recess 112g originates in an opening defined in the first portion 112b' of the inner surface 112b of first housing 112, i.e., on the surface of base member 112A opposite outer surface 112a. Each recess 112g extends inwardly from the opening in the first portion 112b' of inner surface 112b for a distance towards outer surface 112a. The recess 112g terminates a distance inwardly from the opening and from outer surface 112a. The two recesses 112g of first housing 112 are arranged laterally aligned with one another and are also laterally spaced apart from one another. Each recess 112g is generally a rectangular cuboid in shape and is oriented generally parallel to first end surface 112c of first housing 112 and at right angles to outer surface 112a. Recesses 112g are separated from one another by solid sections of the material from which first housing 112 is fabricated.

Figure 13:
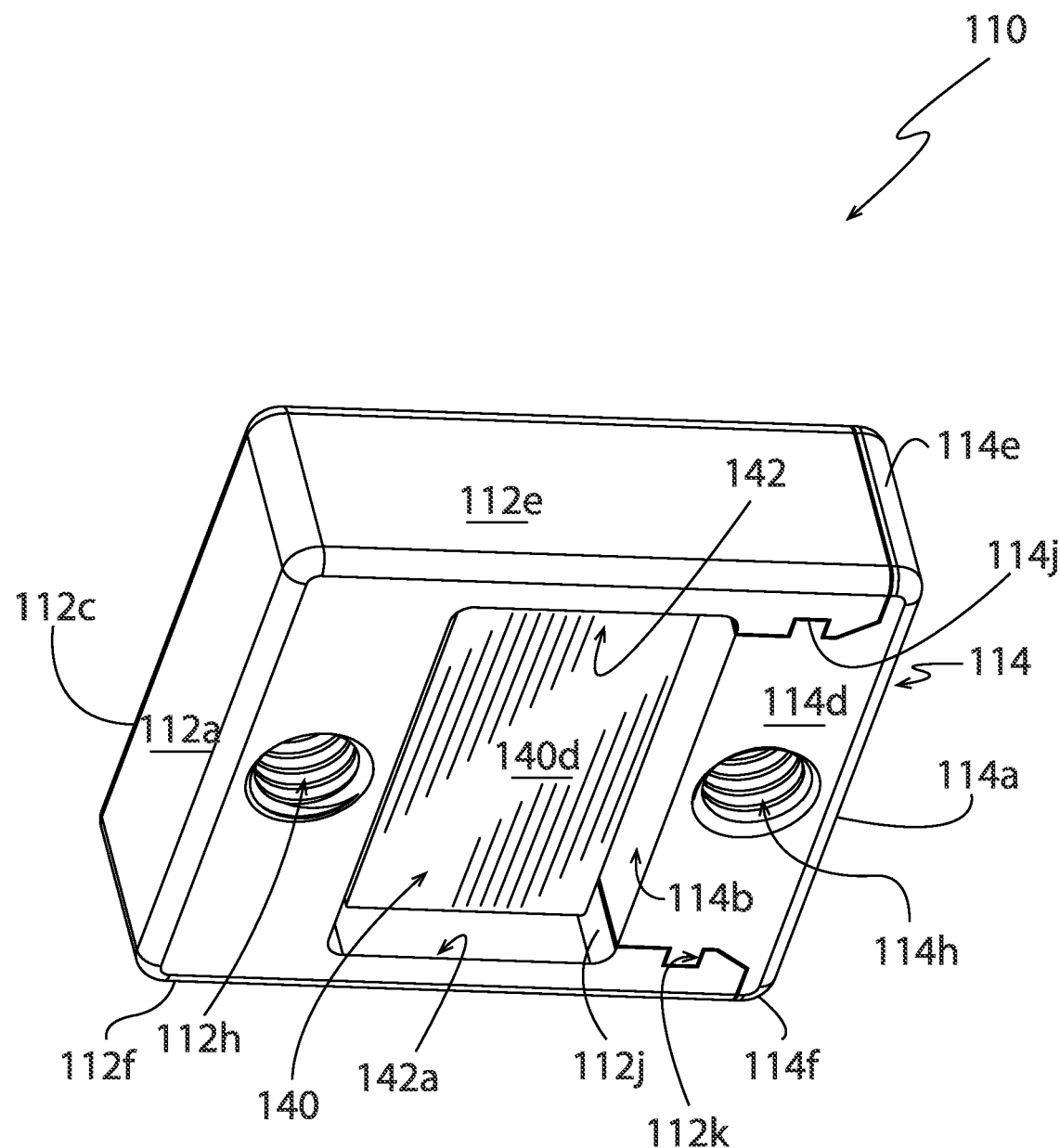
FIG. 13 is a bottom, front, right side perspective view of the vibration dampening device of FIG. 8.

As best seen in FIG. 13, a threaded hole 112h is defined in second end surface 112d of first housing 112 and is configured to receive a complementary fastener therein, as will be described later herein. Hole 112h originates in an opening defined in second end surface 112d and extends inwardly for a distance towards first end surface 112c. Hole 112h terminates a distance inwardly away from first end surface 112c. Hole 112h is located between the two recesses 112g (FIG. 15) and is separated therefrom by a section of solid material.

Referring again to FIGS. 9 and 10, an end region of each of the first leg 112B and second leg 112C remote from base 112A and on first portion 112b' is configured for interlocking engagement with a complementary region of second housing 114. In particular, the end regions of the second and third portions 112b" are shaped to form a profile that mates with a complementary profile on second housing 114. The two profiled regions of the first leg 112B and second leg 112C extend towards one another and the distance between the profiled regions is smaller than the distance between the rest of the second and third portions 112b" of the inner surface 112b. It will be understood that the specific configuration of the profiled regions illustrated in the attached figures is exemplary only. Any desired profile configuration may be provided on first leg 112B and on second leg 112C.

Still referring to FIGS. 9 and 13, the exemplary profiled region on each of the first leg 112B and second leg 112C includes a shoulder 112j (FIGS. 9, 11, and 13) which projects beyond the respective second and third portions 112b" of the inner surface 112b. The shoulder 112j extends from the first end surface 112c through to the second surface 112d of the associated leg 112B, 112C. The profiled region also defines a groove 112k (FIGS. 9 and 10) therein which is located a distance away from the shoulder 112j, moving in a direction from outer surface 112a towards a free end of the associated leg 112B, 112C. The groove 112k extends between first end surface 112c and second end surface 112d. The shoulder 112j and groove 112k on first leg 112B are opposed to the shoulder 112j and groove 112k on second leg 112C.

Referring still to FIGS. 9 and 10, second housing 114 is generally an isosceles trapezoid in shape and includes an outer surface 114a, an inner surface 114b, a first end surface 114c, a second end surface 114d, a first side surface 114e, and a second side surface 114f. As shown in FIG. 9, second housing 114 defines a plurality of recesses 114g in the inner surface 114b. Recesses 114g are substantially identical to one another in configuration and function. Second housing 114, in particular, defines two recesses 114g therein. The recesses 114g are substantially identical in function to the recesses 14g of vibration dampening device 10 but may be slightly differently shaped relative to the recesses 14g. Each recess 114g originates in an opening defined in the inner surface 114b of second housing 114 and extends inwardly for a distance towards outer surface 114b, terminating a distance inwardly therefrom. The two recesses 114g of second housing 114 are laterally aligned with one another and are also laterally spaced apart from one another. Each recess 114g is generally a rectangular cuboid in shape and is oriented generally parallel to first end surface 114c and at right angles to outer surface 114a. Recesses 114g are separated from one another by solid sections of the material from which second housing 114 is fabricated.

As best seen in FIG. 13, a threaded hole 114h is defined in second housing 114 and is configured to receive a complementary fastener therein, as will be described later herein. Hole 114h originates in an opening defined in second end surface 114d of second housing, extends for a distance inwardly towards first end surface 114c and terminates a distance inwardly away from first end surface 114c. Hole 114h is located between the two recesses 114g and is separated therefrom by a section of solid material. The purpose of holes 114h will be described later herein.

Referring particularly to FIGS. 9 and 10, the first side surface 114e and second side surface 114f of second housing 114 are each configured to include a profile that is complementary to the profiled regions of the first leg 112B and second leg 112C of first housing 12. Since the profiled regions on the first leg 112B and second leg 112C are substantially identical but arranged as mirror images of one another, the profiles on first and second side surfaces 114e, 114f are also substantially identical and arranged as mirror images of one another. The profiles of the first side surface 114e and second side surface 114f are particularly shaped, sized, and otherwise configured to interlockingly engage with the profiled regions of the first leg 112B and second leg 112c, respectively. The second housing 114 is configured to snap-fittingly engage with the first housing 112. In particular, the profiled first and second side surface 114e, 114f snap-fittingly engage the profiled regions of the first leg 112B and second leg 112C, respectively.

The exemplary profiles of the first side surface 114e and second side surface 114f each include a ridge 114j that extends between the first end surface 114c and second end surface 114d. Ridge 114j is complementary to the groove 112k defined in the profiled regions of first leg 112B and second leg 112C. When first housing 112 and second housing 114 operatively engage one another, the ridges 114j on second housing 114 are received in the grooves 112k of first housing 112. All other surfaces of the profiles on second housing 114 are complementary to particular surfaces of the profiled regions on first housing 112 so as to enable these components to interlocking engage one another. When first housing 112 and second housing 114 are snap-fittingly interlocked with one another, the first end surface 112c of first housing 112 is substantially flush with the first end surface 114c of second housing 114, i.e., the first end surfaces are arranged in the same plane with one another. Additionally, the second surface 112d of first housing 112 is substantially flush with the second end surface 114d of second housing 114, i.e., the second end surfaces are arranged in the same plane as one another. Still further, the first side surface 112e of first housing 112 is substantially flush with the first side surface 114e of second housing 114, i.e., arranged in the same plane as one another. Similarly, the second side surface 112f of first housing 112 is substantially flush with the second side surface 114f of second housing 114, i.e., arranged in the same plane as one another.

In accordance with an aspect of the present disclosure, a third housing 140 is provided as part of vibration dampening device 110. Referring to FIGS. 9 and 10, third housing 140 has a first outer surface 140a, a second outer surface 140b, a first end surface 140c, a second end surface 140d, a first side surface 140e, and a second side surface 140f. Each of the first outer surface 140a and second outer surface 140b defines a pair of laterally spaced-apart recesses 140g therein. The recesses 140g defined in first outer surface are horizontally aligned with the recesses 140g defined in second outer surface 140b, as can best be seen in FIG. 17. Recesses 140g in first outer surface 140a and recesses 140g in second outer surface 140b are laterally aligned with one another and are laterally spaced-apart from one another. The recesses 140g are configured to be alignable with one or the other of the recesses 112g of first housing 112 or with the recesses 114g of second housing 114.

As best seen in FIG. 9, a threaded hole 140h is defined in first end surface 140c of third housing 140. Hole 140h is configured to receive a complementary fastener therein, as will be described later herein. Hole 140h originates in an opening defined in first end surface 140c, extends for a distance inwardly towards second end surface 140d, and terminates a distance inwardly away from second end surface 140d. An annular flange 140h' (FIG. 8) circumscribes holes 140h and acts as a spacer for any component that is secured to third housing 140 via a fastener inserted into hole 140h. Hole 140h is located between the two sets of recesses 140g defined in first outer surface 140a and second outer surface 140b. Hole 140h is separated from each of the four recesses 140g by a section of solid material. Effectively the hole 140h is located generally in the center of first end surface 140c and extends inwardly therefrom. The purpose of hole 140h will be described later herein.

As discussed earlier herein, first and second housings 112, 114 are configured to interlock with one another. If these two components are interlocked with one another, they form a unitary base member 142 (FIG. 14). The base member 142 includes an interior wall 142a that bounds and defines a central aperture 142b (FIG. 14). The interior wall 142a is partially formed by inner surface 112b (particularly first portion 112b') of first housing 112, second and third portions 112b" of first housing 112, and inner surface 114b of second housing 114. The third housing 140 is configured to be received in this central aperture 142b of base member 142 and to be operably engaged with first housing 112 and second housing 114 via a plurality of isolators 116 and isolator inserts 118. As will be evident, particularly from FIGS. 16 and 17, the length and width of third housing 140 are such that a space 142b' circumscribes an exterior perimeter of third housing 140 when third housing 140 is received in the central aperture 142b. The space 142b' comprises that portion of the central aperture 142b that is not occupied by third housing 140. The reason for space 142b' will be discussed later herein.

As indicated above, a plurality of isolators 116 and plurality of isolator inserts 118 engage third housing 140 to base member 142. Referring again to FIGS. 9 and 10, each isolator 116 is fabricated from material that is one or more of resilient, shock absorbing, and vibration dampening. Suitable materials for use in the fabrication of isolator 116 include rubber-like materials such as natural rubber and synthetic viscoelastic urethane polymers. Each isolator 116 is complementary in shape and size to one of the recesses 112g, 114g, or 140g defined in first housing 112, second housing 114, and third housing 140, respectively. Vibration dampening device 110, as illustrated, includes eight substantially identical isolators 116. Each isolator 116 is generally a rectangular cuboid in shape and includes an outer wall 116a (FIGS. 9 and 10), an inner wall 116b, a first end wall 116c, a second end wall 116d, a first side wall 116e, and a second side wall 116f. A recess 116g is defined within each isolator 116. The recess 116g originates in an opening defined in the inner wall 116b and extends for a distance into the interior of isolator 116 towards outer wall 116a. Recess 116g terminates a distance inwardly from outer wall 116a. Each recess 116g is oriented substantially parallel to the first end wall 116c of the isolator 116.

Vibration dampening device 110 also include four isolator inserts 118 which extend between base member 140 and third housing 142. Isolator inserts 118 are all generally rectangular cuboids in shape and are substantially identical to one another. In some applications, one suitable material for the fabrication of isolator inserts 118 is metal. In other applications, one suitable material for the fabrication of isolator inserts 118 is plastic. Isolator inserts 118 are substantially rigid components that may be substantially solid in nature, i.e., free of any interior voids. (It will be understood that in other applications, the isolator inserts 118 may be hollow. Referring to FIGS. 9 and 10, each isolator insert 118 has an outer surface 118a, an inner surface 118b, a first end surface 118c, a second end surface 118d, a first side surface 118e, and a second side surface 118f. The height of each isolator insert 118 (measured between first end surface 118c and second end surface 118d is substantially complementary to a vertical height of the recesses 116g defined in the isolators 116. The width of each isolator insert 118 (measured between first side surface 118e and second side surface 118f is substantially complementary to the horizontal width of the recesses 116g defined in the isolators 116. The length of each isolator insert 118 (measured between the first outer surface 118a and the second outer surface 118b is greater that the depth of both recesses 116g added together.

Each isolator insert 118 is configured to be inserted into the recesses 116g of two opposed isolators 116 when vibration dampening device 110 is assembled. Initially, the various components of vibration dampening device 110 are in the condition illustrated in FIG. 9, i.e., the first housing 112, second housing 114, and third housing 140 are disengaged from one another. This makes it easier to install vibration dampening device 110 in tight quarters within a piece of electronic equipment, where they may not be enough room to engage a fully-preassembled vibration dampening device 110. Prior to or during assembly, each isolator 116 is inserted into one of the recesses 112g, 114g, or 140g as previously described herein. One of the first and second housings 112, 114 is secured to a chassis or frame of a piece of electronic equipment, for example, and two isolator inserts 118 are engaged in the recesses 116g of the isolators 116 engaged with the secured first or second housing 112, 114. The third housing 140 is then operatively engaged with the secured first or second housing 112, 114 by aligning the recesses 116g in the isolators 116 installed in one of the outer surfaces 140a, 140b of the third housing 140 with the free ends of the isolator inserts 118 extending outwardly from the secured housing 112 or 114. The remaining isolator inserts 118 are then engaged with the isolators 116 on the opposed outer surface 140a, 140b of third housing 140 and the other of the first and second housings 112, 114 is engaged with the third housing 140 by receiving the free ends of the isolator inserts 118 into the previously installed isolators 116 in the other of the first and second housings 112, 114. The profiled regions of the first and second housings 112, 114 are then snap-fitted to one another to lock the third housing 140 therebetween. It should be noted that when vibration dampening device 110 is assembled as just described, when third housing 140 is received in aperture 142b recesses 112g in first housing 112, recesses 140g in third housing 140, and recesses 114g in second housing 114, are all horizontally and laterally aligned with one another. As is evident from FIG. 17, when the isolator inserts 118 extend between the two isolators 116 engaged in the first and third housings 112, 140 or the third and second housings 140, 114, the length of isolators inserts 118 is such that a central region of each isolator insert 118 extends across the gap 142b' between third housing 140 and one or the other of first housing 112 and second housing 114. The overall length of the isolator inserts 118 ensures that the gap 142b' is maintained between the third housing 140 and each of the first and second housings 112, 114. In other words, the third housing 140 is kept a distance apart from the first and second housings 112, 114. When isolators 116 and isolator inserts 118 are engaged with first, second, and third housings 112, 114, 140, the first end surface 140c of third housing 140 is substantially flush with the first end surface 112c of first housing 112 and with the first end surface 114c of second housing 114. The second end surface 140d of third housing 140 is recessed relative to the second end surfaces 112d, 114d of the first and second housings 112, 114. This arrangement is shown in FIG. 13.

Figure 16:
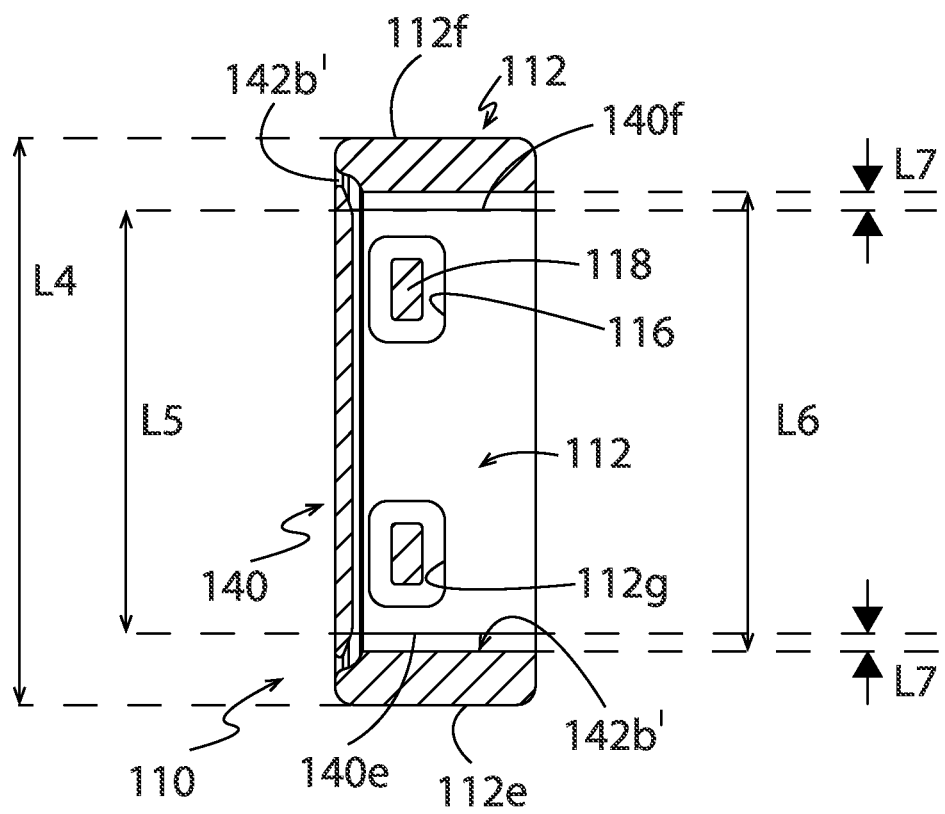
FIG. 16 is a lateral cross-section of the vibration dampening device taken along line 16-16 of FIG. 15.

FIG. 16 shows two particular features of third housing 140. Firstly, first end surface 140c is of a greater length and width than is second end surface 140d. (The length is measured between first outer surface 140a and second end surface 140b. The width is measured between first side surface 140e and second side surface 140f.) The dimensions of third housing 140 are such that a space 142b' is defined between the outer perimeter of third housing 140 and interior wall 142a of base member 142. The space 142b' is smallest circumscribing the outer perimeter of first end surface 140c of third housing 140 because of the first end surface's dimensions discussed above. The space 142b' becomes slightly larger between the interior wall 142a of base member 142 and the outer peripheral surface formed by first outer surface 140a, first side surface 140e, second outer surface 140b, and second side surface 140f of third housing 140. The gap 142b' can best be seen in FIG. 17. The space 142b' ensures that no portion of the outer perimeter of third housing 140 contacts either first housing 112 or second housing 114. The only contact between third housing 140 and first and second housings 112, 114 is through the isolator inserts 118. As described above the isolator inserts 118 originate and terminate in the vibration-dampening material of isolators 116. Consequently, vibrations originating in components operatively engaged with third housing 140 are not transmitted to first housing 112 or second housing 114. The isolators 116 attenuate any such vibrations. Furthermore, vibrations originating in components operatively engaged with one or both of first housing 112 and second housing 114 are not transmitted to third housing 140. The isolators 116 attenuate any such vibrations. Third housing 140 is thus physically and vibrationally isolated relative to base member 142.

Figure 17:
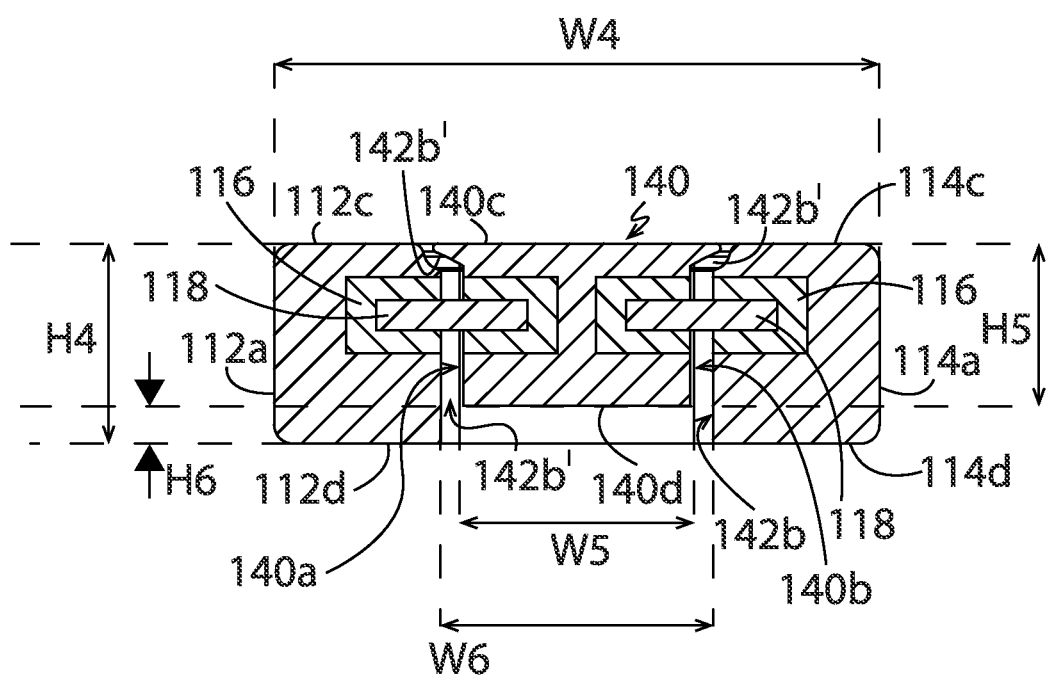
FIG. 17 is a longitudinal cross-section of the vibration dampening device taken along line 17-17 of FIG. 15.
Figure 18:
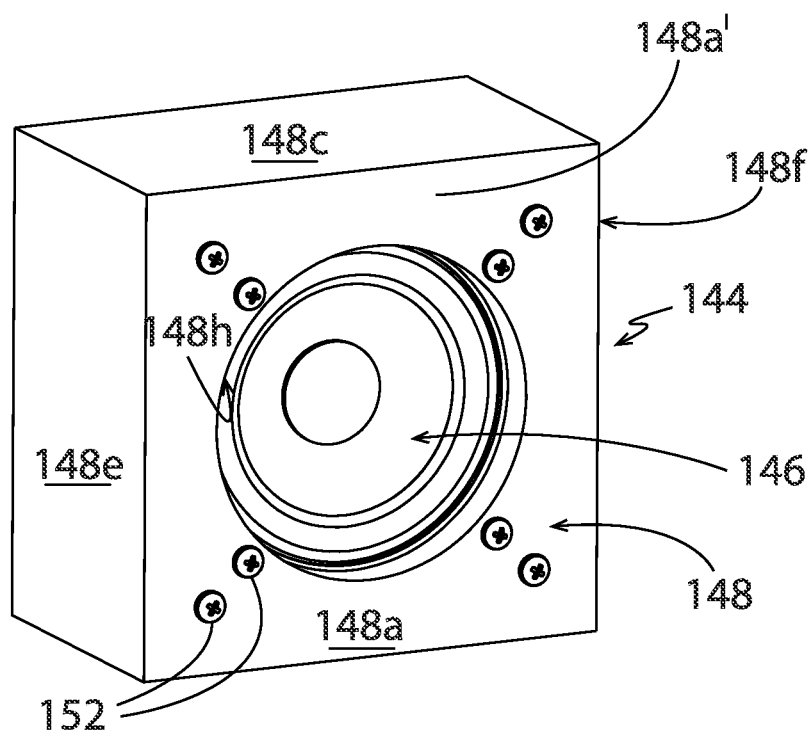
FIG. 18 is a front, top, left side perspective view of a speaker incorporating the vibration dampening device of FIG. 8 therein.

A second particular feature of third housing 140 is best seen in FIGS. 13 and 17. That feature is that the third housing 140 is of a height that is smaller than a height of first housing 112 and second housing 114. The height of third housing 140 is measured from first end surface 140c to bottom surface 140d and is compared with the height of first housing 112, for example, measured between first end surface 112c and second end surface 112d. The smaller height of third housing 140 helps to ensure that third housing 140 is unable to contact the component(s) with which either the first housing 112 or second housing 114 are engaged. The reduced height of third housing 140 helps to isolate third housing 140 from its surroundings and thereby helps to ensure vibrations are not transferred directly to the third housing 140 from the surroundings.

Figure 15:
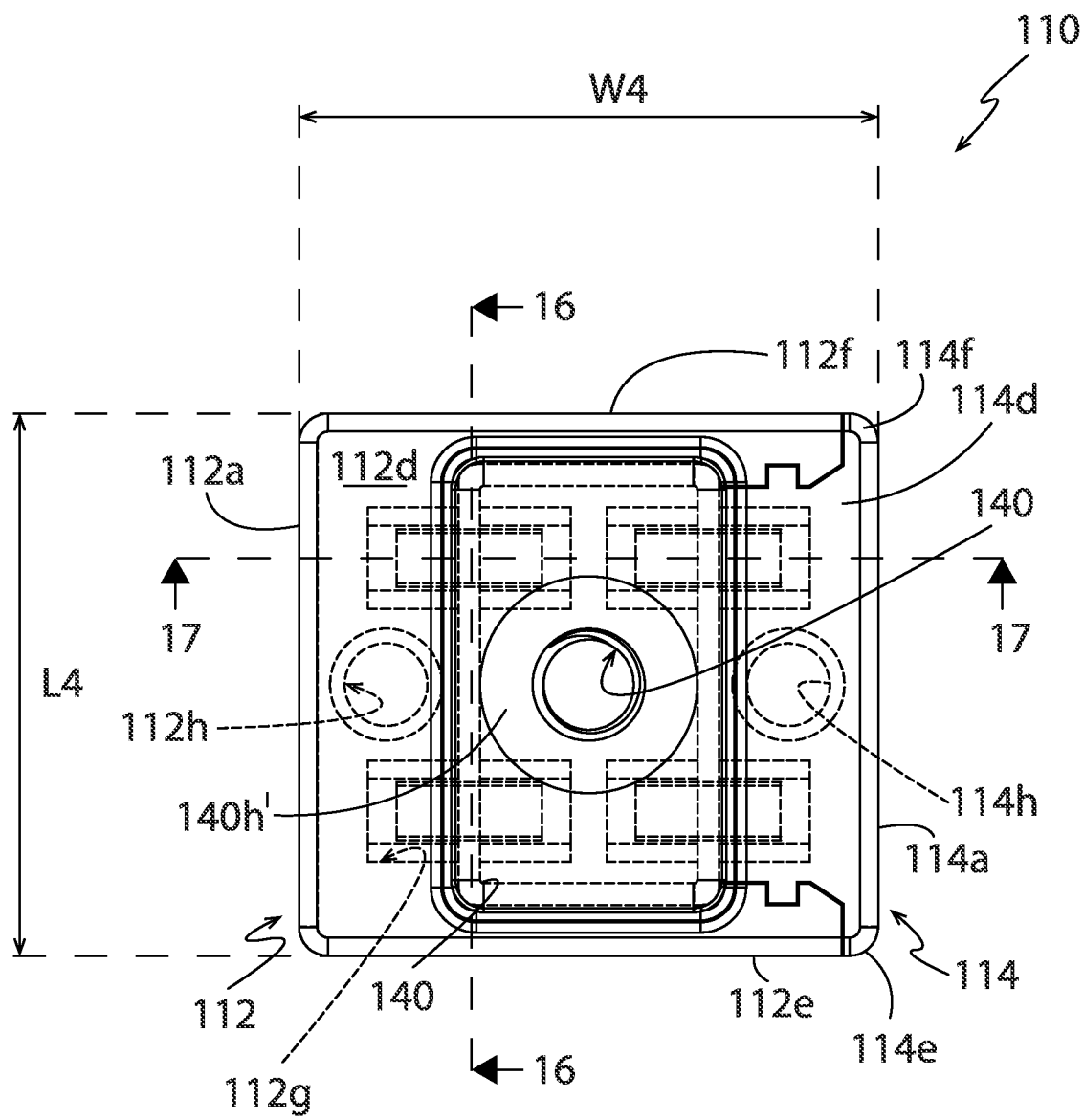
FIG. 15 is a top plan view of the vibration dampening device shown in FIG. 11 and further showing the configuration of the interior components thereof in phantom.

Referring to FIGS. 15, 16, and 17, vibration dampening device 110, when assembled is of a length "L4" that is measured from first side surface 112e to second side surface 112f of first housing 112 (or from first side surface 114e to second side surface 114f of second housing 114). Vibration dampening device 110 when assembled is of a width "W4" measured from outer surface 112a of first housing 112 to outer surface 114a of second housing 114. Vibration dampening device 110 when assembled is of a height "H4" measured from first end surface 112c to second end surface 112d of first housing 112 (or from first end surface 114c to second end surface 114d of second housing 114). In one embodiment, length "L4" is about 15 mm, width "W4" is about 16 mm, and height "H4" is about 5 mm.

Referring still to FIGS. 15, 16, and 17, third housing 140 of vibration dampening device 110 is of a length "L5" (measured from first side surface 140e to second side surface 140*f*), is of a width "W5" (measured from outer surface 140*a* to outer surface 140*b*), and a height "H5" (measured from first end surface 140*c* to second end surface 140*c*). In one embodiment, length "L5" is about 11 mm, width "W5" is about 6 mm, and the height "H5" is about 4 mm. The difference between the height "H4" of the first and second housings 112, 114 and the height "H5" of the third housing 140 is indicated in FIG. 17 as the height "H6". In one embodiment, the height "H6" is about 1 mm. In one embodiment, the height of flange 140*h'* is about 1 mm.

The central aperture 142*b* is of a length "L6" and a width "W6", where the length "L6" is measured between second and third portions 112*b'* of first housing 112; and the width "W6" is measured between inner surface 112*b* of first housing 112 and inner surface 114*b* of second housing 114. In one embodiment, length "L6" is about 12 mm and width "W6" is about 7 mm. Because the length "L5" of third housing 140 is smaller than the length "L6" of central aperture 142*b*, the space 142*b'* between first and second side surfaces 140*e*, 140*f* and first and second portions 112*b'* is of a length "L7". In one embodiment, the length "L7" is about 1 mm. Additionally, because the width "W5" of third housing 140 is smaller than the width "W6" of central aperture 142*b*, the space 142*b'* between outer surface 140*a* and outer surface 140*b* of third housing 140 and inner surfaces 112*b*, 114*b*, respectively, of first and second housings is of a width "W7". In one embodiment, the width "W7" is about 1 mm. As is evident from FIGS. 16 and 17, the third housing 140 flares outwardly towards first end surface 140*c* and the first end surfaces 112*c*, 114*c* of first and second housings 112, 114 include a depression that is complementary to the flaring. This complementary flaring and depression is provided so that the space 142*b'* that circumscribes third housing 140 is not immediately evident when vibration dampening device 110 is viewed from above first end surfaces 112*c*, 140*c*, 114*c*. It should be noted that the space 142*b'* circumscribes the flared region of third housing 140 so that there is no physical contact between the first, second, and third housings 112, 114, 140 other than through the isolator assemblies 116, 118. The space 142*b'* which circumscribes third housing 140 is substantially constant in size from proximate first end surface 140*c* to proximate second end surface 140*d*.

Figure 19:
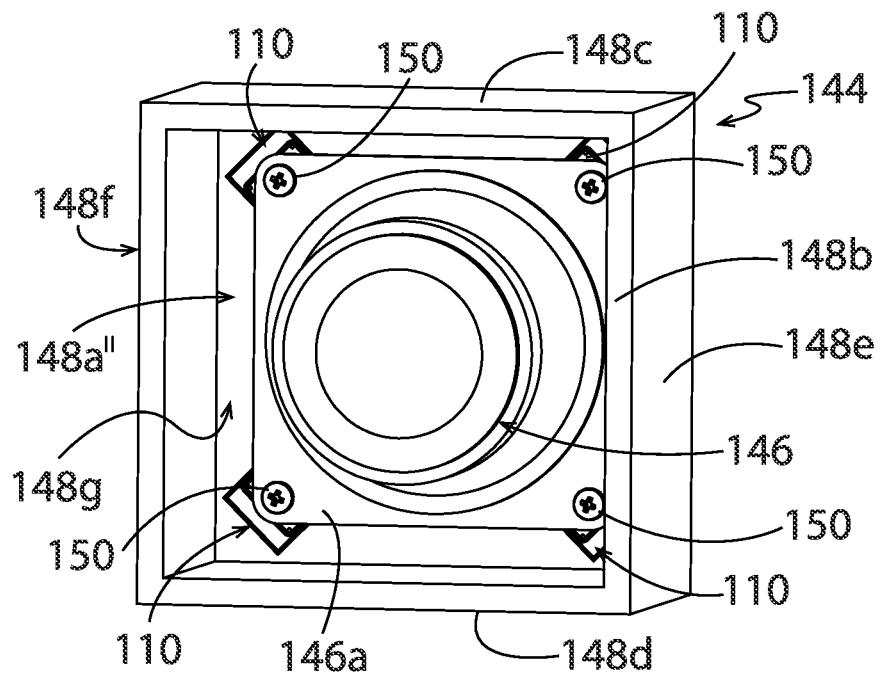
FIG. 19 is a rear, left side perspective view of the speaker of FIG. 18 showing a plurality of vibration dampening devices utilized therein.
Figure 20:
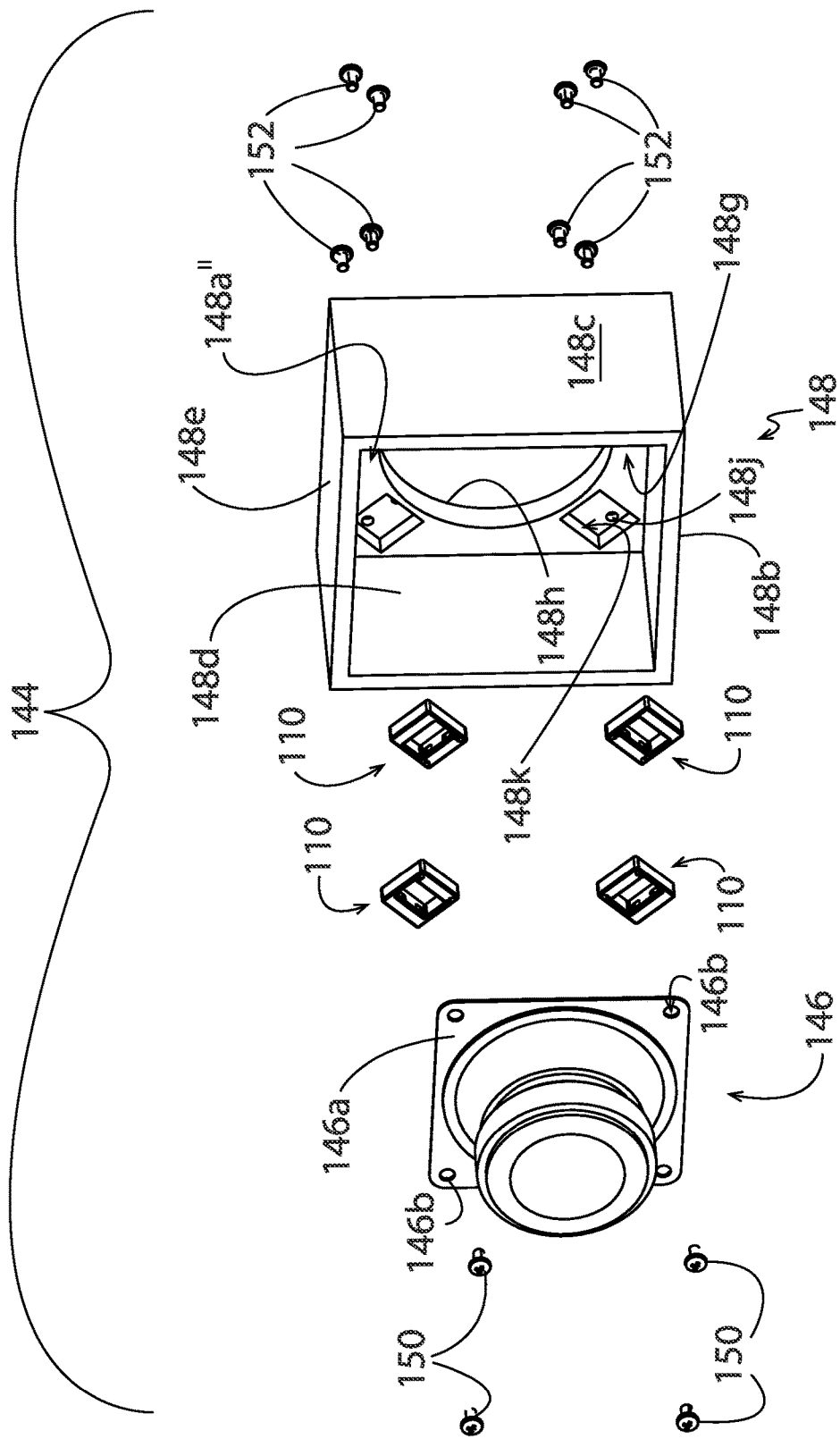
FIG. 20 is an exploded rear, left side perspective view of the speaker of FIG. 18.
Figure 21:
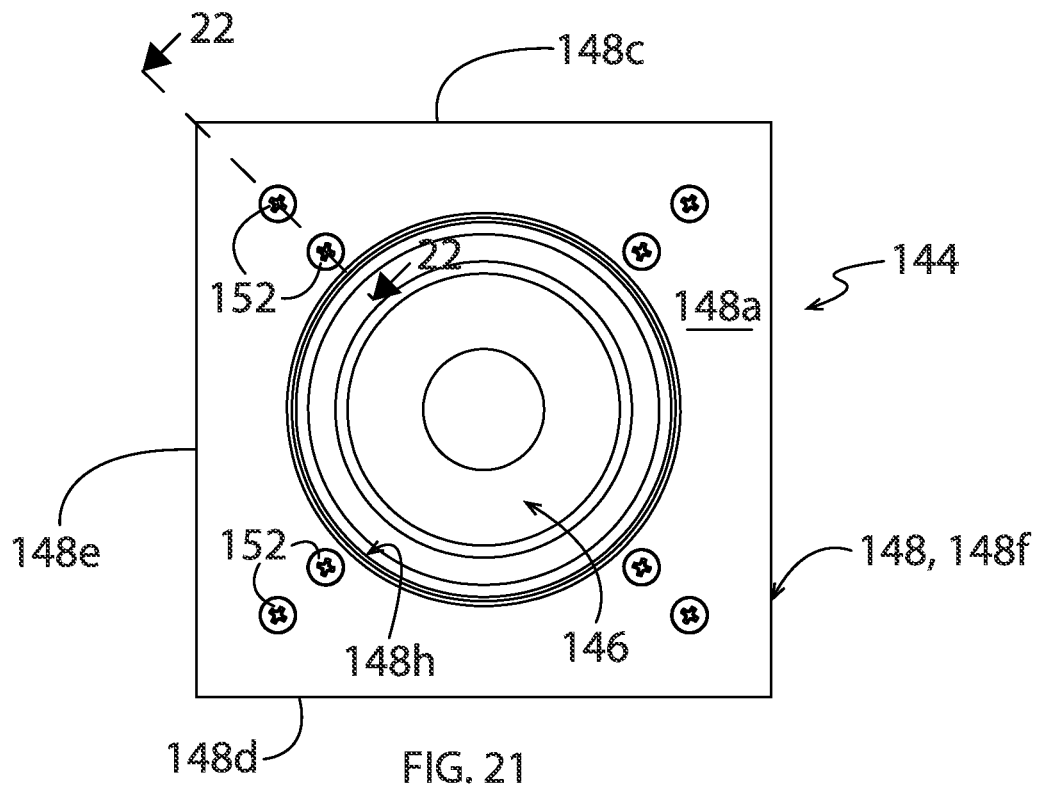
FIG. 21 is a front plan view of the speaker of FIG. 18.
Figure 22:
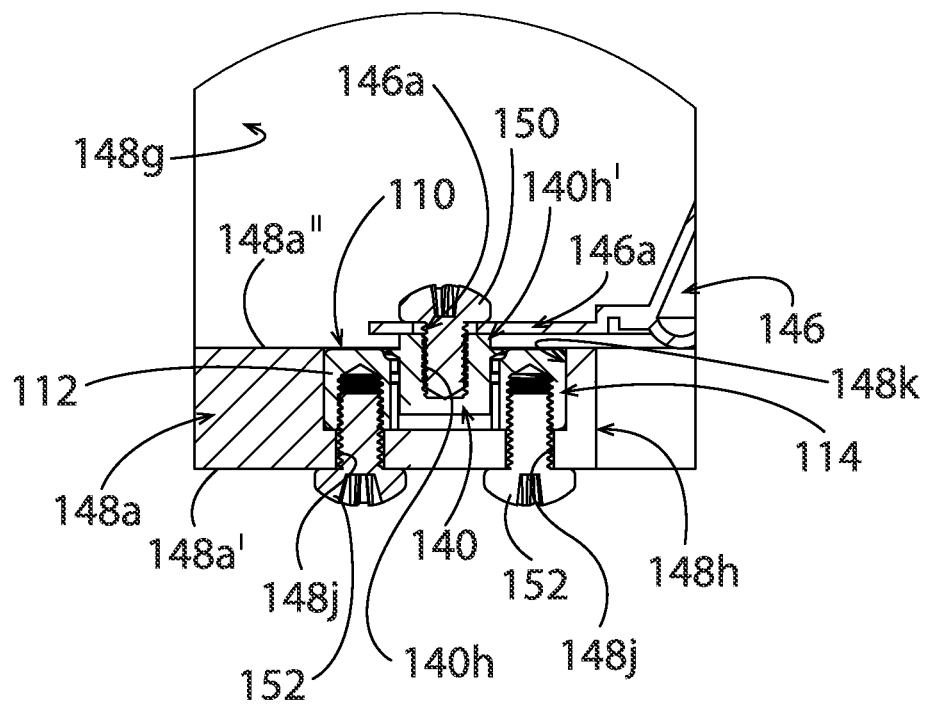
FIG. 22 is a cross-section through a single vibration dampening device utilized in the speaker, with the cross-section taken along line 22-22 of FIG. 21.

Referring now to FIGS. 18 through 22, an exemplary application of vibration dampening device 110 is illustrated. In these figures there is illustrated an audio speaker assembly 144 comprising a speaker 146 and a speaker housing 148. Speaker housing 146 as illustrated is essentially a box having a front 148*a*, a back 148*b* (only a portion of which is illustrated in FIG. 19), a top 148*c*, a bottom 148*d*, a left side 148*e*, and a right side 148*f*. The front, back, top, bottom, left side, and right side, 148*a* through 148*f*, bound and define an interior chamber 148*g*. An opening 148*h* to the interior chamber 148*g* is defined in front 148*a*. As best seen in FIGS. 20 and 22, front 148*a* includes an outer surface 148*a'* and an inner surface 148*a"*. Opening 148*h* extends between outer surface 148*a'* and inner surface 148*a"*. A plurality of apertures 148*j* is defined in front 148*a*, with each aperture 148*j* extending between outer surface 148*a'* and inner surface 148*a"*. The apertures 148*j* are located within a recessed region 148*k* defined in an interior surface of front 148*a* (as best seen in FIG. 20). In the audio speaker assembly 144 illustrated in FIGS. 18 through 22, front 148*a* of housing 148 defines eight apertures 148*j* therein. The apertures 148*j* are arranged at various intervals about the circumference of opening 148*h* and spaced radially outwardly therefrom.

As best seen in FIG. 20, speaker 146 is a self-contained unit that includes a mounting plate 146*a*. In PRIOR ART audio systems the mounting plate 146*a* would be secured directly to the inner surface 148*a"* of housing 148 by inserting fasteners through the holes 146*b* defined in mounting plate 146 and subsequently through aligned apertures 148*j* defined in front 148*a* of housing 148. In the exemplary application of the vibration dampening device 110 disclosed herein, a plurality of vibration dampening devices 110 are interposed between mounting plate 146*a* of speaker 146 and front 148*a* of housing 148.

FIG. 20 shows that four vibration dampening devices 110 are interposed between speaker 146 and housing 148. Each vibration dampening device 110 is oriented such that the speaker 146 is engaged with the third housing 140 of each vibration dampening device 110. This is best seen in FIG. 22. During installation, each of the four vibration dampening devices 110 may either be engaged with speaker 146 first or with housing 148 first, the order of engagement is irrelevant. For example, a first fastener 150 is inserted through one of the holes 146*b* defined in mounting plate 146 and is then threadedly engaged in the hole 140*h* (FIGS. 11 and 22) defined in third housing 140. This action fixedly engages vibration dampening device 110 to speaker 146. All four vibration dampening devices 110 are engaged with speaker 146 in like manner. Speaker 146 may then be inserted into the interior chamber 148*g* defined by housing 148. Speaker 146 is inserted into interior chamber 148*g* with isolating assemblies 110 leading the way. When isolating assemblies 110 contact inner surface 148*a"*, the user will manipulate speaker 146 to bring the holes 112*h* and 114*h* into alignment with a pair of the apertures 148*j* defined in front 148*a* of housing 148. Second fasteners 152 are then inserted through the aligned apertures 148*j* and holes 112*h*, 114*h*, and are threaded engaged therewith. This action fixedly secures vibration dampening devices 110 and thereby speaker 146 into fixed operative engagement with housing 148.

When audio speaker assembly 144 is used, vibrations in the speaker 146 from the generated sound will be dampened by the four isolating assemblies 110 and will not be transmitted to the housing 148. Furthermore, any vibrations in the housing 148 will be dampened by the four isolating assemblies 110 and will not be transmitted to the speaker 146. Because of this the sound quality emitted by the speaker 146 will be greatly improved. It should be noted that in vibration dampening device 110, the isolation components, i.e., third housing 140 must not come in contact with the base component i.e., first housing 112 and second housing 114, or the supporting structure (such as speaker housing 148) in normal operation or vibrations will still be able to transmit to or from the vibration-sensitive component, i.e., speaker 146. The configuration of vibration dampening device 110 is such that there is no contact between the base component and the isolated component. The first housing 112 and second housing 114 of vibration dampening device 110 effectively comprise a complete and self-contained unit that surrounds the isolator assemblies 116, 118 and the third housing 140. The third housing 140 is held in place by multiple isolator inserts 118 that are connected with resilient isolators 116 on at least two sides of the third housing 140.

It will be understood that in other embodiments, one or both legs 112B, 112C of first housing 112 may define one or more recesses therein (similar to recesses 112*g*) and the opposing first and second sides 140*e*, 140*f* of third housing 140 may also defined a complementary number of recesses 140*g* therein. Additional isolator assemblies 116, 118 may be engaged in these additional recesses 112*g*, 140*g* to further isolate third housing 140.

It will be understood that while the illustrated exemplary profiled regions are substantially identical to one another (and are arranged as mirror images of one another), in other embodiments the profiled region on the first leg 112B may differ from the profiled region on the second leg 112C. The advantage of having the profiled regions identical but reversed is that the first and second side surfaces of the second housing 114 will then be complementary to each of the profiled regions on the first housing 112. This means that the orientation of second housing 114 when being engaged with first housing 112 is not of particular relevance. In other embodiments that have different profiled regions on the first leg 112B and second leg 11C, the orientation of second housing 114 has to be more particularly oriented to match the correct profile on the first side surface 114e of the second housing 114 with the profiled region on the first leg 112B of the first housing 112.

Referring now to FIGS. 23-29, there is shown a mounting assembly 254 which includes a third embodiment of a vibration dampening device 210 (FIG. 24) in accordance with an aspect of the present disclosure. Vibration dampening device 210, like vibration dampening device 110 comprises a first housing 212 and a second housing 214 that together form a first member or base member of the device 210 that is configured to rest upon or be operatively engaged with a support surface. Vibration dampening device 210 further comprises a second member or isolated member in the form of the third housing 240. At least one isolator assembly is interposed between the third housing 240 and the first housing 212 and at least one additional isolator assembly that is interposed between the third housing 240 and the second housing 214. The isolator assemblies effectively decouple the third housing 240 from each of the first housing 212 and second housing 214.

One or more vibration dampening devices 210 are utilized in a mounting assembly 254 that supports a vibration sensitive component. The mounting assembly 254 includes a mounting plate 256 and a faceplate 258. Mounting plate 256 is capable of being secured to any support surface, such as a wall 260 shown in FIG. 29. Mounting assembly 254 is useful for supporting an article on the support surface 260. FIG. 29 shows an exemplary article in the form of an audio speaker 262 being secured by mounting assembly 254 to wall 260.

It should be understood that mounting assembly 254 may also be used to support the article (e.g. audio speaker 262) on a horizontal surface such as a ceiling in such a way that the audio speaker 262 hangs downwardly from the ceiling. Still further, mounting assembly 254 may be secured to an inclined surface and thereby retain the audio speaker 262 in such a way that the speaker extends outwardly from the inclined surface. Furthermore, in other instances, mounting assembly 254 does not need to be fixedly secured to the support surface but may simply rest thereupon. For example, if it is desired to support the article 262 on a horizontal shelf of a cabinet and dampen vibrations from the article 262, the mounting assembly 254 may simply rest upon the shelf (i.e., is not secured thereto) and will retain the article 262 in an orientation where the article extends upwardly from the shelf.

Figure 25A:
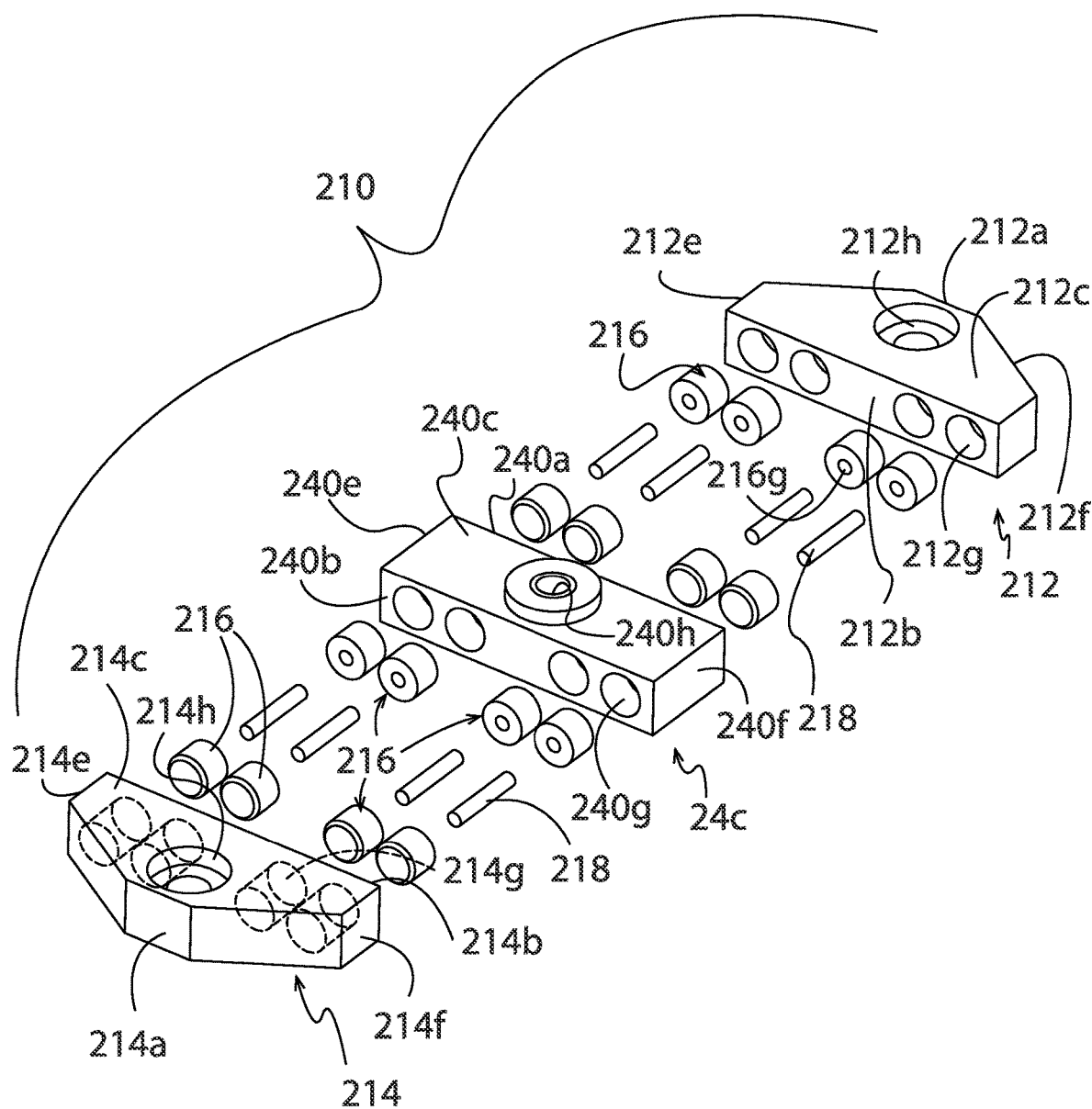
FIG. 25A is an exploded top perspective view of the vibration dampening device of FIG. 24 shown in isolation.
Figure 25B:
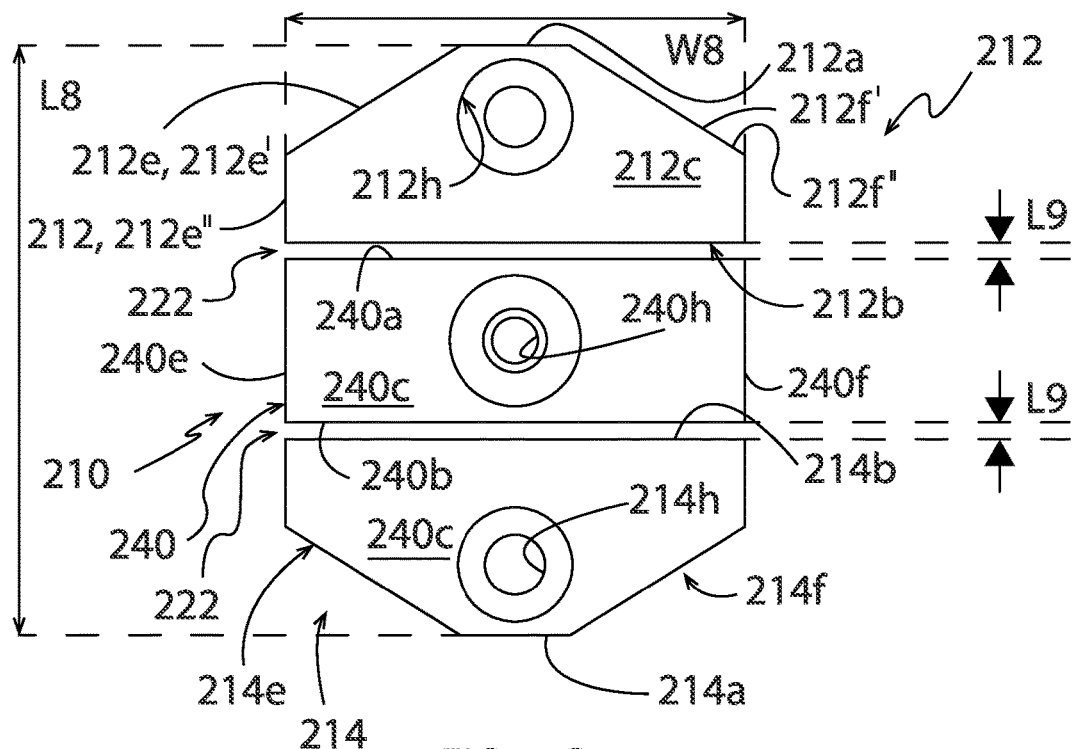
FIG. 25B is a front elevation view of the vibration dampening device of FIG. 25A with the isolators and isolator inserts removed for clarity of illustration.
Figure 25C:
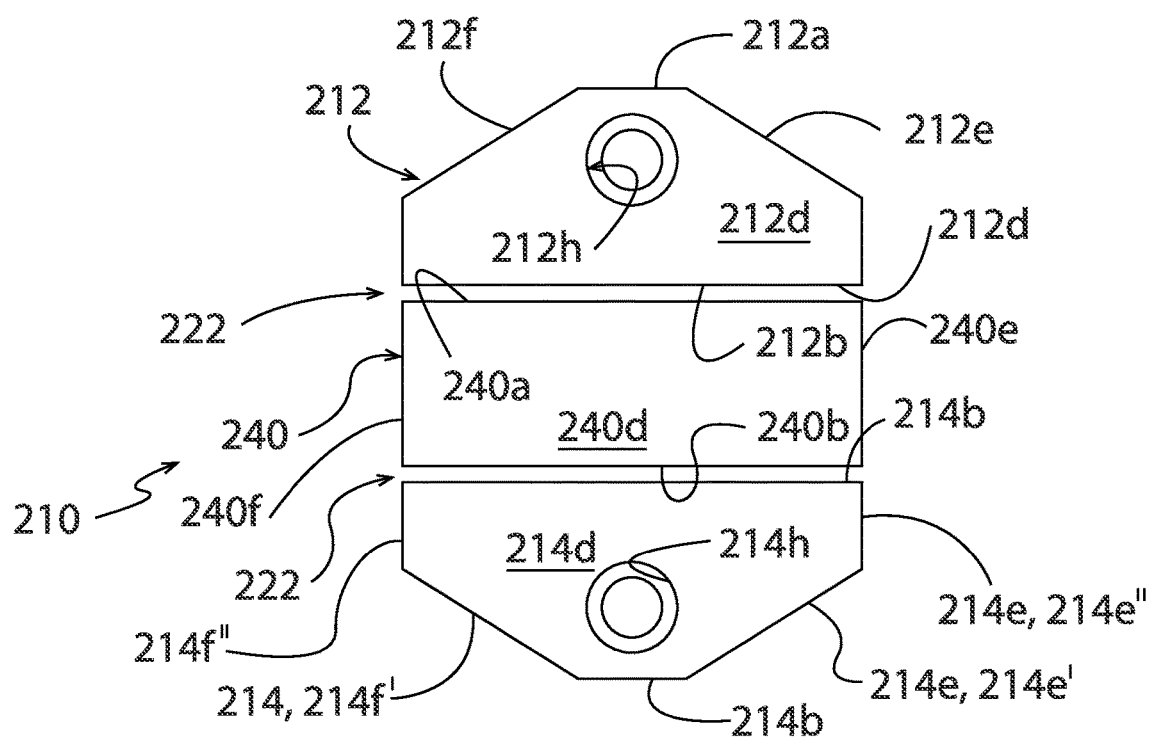
FIG. 25C is a rear elevation view of the vibration dampening device of FIG. 25A with the isolators and isolator inserts removed for clarity of illustration.

Vibration dampening device 210 is shown in isolation in FIGS. 25A through 25C. Vibration dampening device 210 comprises a first housing 212, a second housing 214, and a third 240 interposed between the first housing 212 and second housing 214. Vibration dampening device 210 also comprises at least four isolators 216 and at least two isolating inserts 218.

First housing 212 and second housing 214 are substantially identical to one another and are arranged on opposing sides of third housing 240. First housing 212 includes an outer surface 212a, an inner surface 212b, a first end surface 212c, a second end surface 212d, a first side surface 212e, and a second side surface 212f. First housing 212 is a substantially solid component wherein the outer surface 212a and inner surface 212b are oriented parallel to one another. The outer surface 212a is of a shorter length than the inner surface 212b (where the length is measured between first side surface 212e and second side surface 212f). The first end surface 212c and second end surface are oriented generally parallel to one another and are substantially identical in configuration. Each of the first side surface 212e and second side surface 212f is comprised of a first section and a second section. For example, as indicated in FIG. 25B, first side surface 212e includes a first section 212e' and a second section 212e". First section 212e' originates at one end of outer surface 212a and extends outwardly away therefrom at an obtuse angle. Second section 212e" originates at an opposing end of first section 212e' and terminates at one end of inner surface 212b. Second section 212e" is oriented orthogonally to inner surface 212b and at an obtuse angle relative to first section 212e'. First section 212e' of first side surface 212e is of a greater length than second section 212e" thereof. Second side surface 212f is substantially identical to first side surface 212e but is arranged as a mirror image of first side surface 212e relative to inner surface 212b of first housing 212.

It will be understood that in other embodiments the shape of first housing 212 may be of a wide variety of other configurations and the illustrated and described shape should not unnecessarily be considered to limit the configuration of the first housing 212.

As best seen in FIG. 25A, first housing 212 defines one or more recesses 212g therein. Each recess 212g originates in an opening defined in inner surface 212b and each recess 212g extends inwardly for a distance towards outer surface 212a, terminating a distance inwardly therefrom. First housing 212 defines four recesses 212g therein that are arranged in a single row. The recesses 212g in the row are horizontally aligned with one another and are laterally spaced apart from one another. Each recess 212g is generally cylindrical in shape and is oriented generally parallel to first end surface 212c and at right angles to inner surface 212b. Recesses 212g are separated from adjacent recesses 212g by solid sections of the material from which first housing 212 is fabricated. While recesses 212 have been described and illustrated herein as being generally cylindrical in shape, it will be understood that the recess may be differently configured. For example, the recess may be generally a rectangular cuboid in shape.

While the first housing 212 is illustrated as having four recesses 212g defined therein, it will be understood that in other embodiments (not illustrated herein), only one recess 212g may be defined in first housing 212, or two recesses, three recesses, or more than four recesses may be defined therein. Additionally, the arrangement of the location of the various recesses 212g in first housing 212 may be different from what is illustrated in the attached figures and described herein. It will be understood that any suitable pattern of recesses 212g may be utilized in first housing 212.

First housing 212 further defines an opening 212h therein that extends from an opening in first end surface 212c through to an opening in second end surface 212d. In particular, the opening 212h includes a countersunk entrance in at least first end surface 212c. As will be described later herein, opening 212h is configured in this manner such that when a first fastener 264 (FIG. 23) in inserted therethrough, that the head of that first fastener 264 will be retained below the plane of the first end surface 212c. This can be seen in FIG. 23.

Second housing 214 includes an outer surface 214a, an inner surface 214b, a first end surface 214c, a second end surface 214d, a first side surface 214e, and a second side surface 214f. Second housing 214 is a substantially solid component wherein the outer surface 214a and inner surface 214b are oriented parallel to one another. The outer surface 214a is of a shorter length than the inner surface 214b (where the length is measured between first side surface 214e and second side surface 214f). The first end surface 214c and second end surface are oriented generally parallel to one another and are substantially identical in configuration. Each of the first side surface 214e and second side surface 214f is comprised of a first section and a second section. For example, as indicated in FIG. 25C, first side surface 214e includes a first section 214e' and a second section 214e". First section 214e' originates at one end of outer surface 214a and extends outwardly away therefrom at an obtuse angle. Second section 214e" originates at an opposing end of first section 214e' and terminates at one end of inner surface 214b. Second section 214e" is oriented orthogonally to inner surface 214b and at an obtuse angle relative to first section 214e'. First section 214e' of first side surface 214e is of a greater length than second section 214e" thereof. Second side surface 214f is substantially identical to first side surface 214e but is arranged as a mirror image of first side surface 214e relative to inner surface 214b of second housing 214.

It will be understood that in other embodiments the shape of second housing 214 may be of a wide variety of other configurations and the illustrated and described shape should not unnecessarily be considered to limit the configuration of the second housing 214. It will further be understood that while first housing 212 and second housing 214 are described and illustrated herein as being of substantially identical configurations, in other embodiments the first housing and second housing may be configured differently from one another as is desired by a designer or as required for a particular application in the real world.

Second housing 214 defines one or more recesses 214g therein. Each recess 214g originates in an opening defined in inner surface 214b and each recess 214g extends inwardly for a distance towards outer surface 214a, terminating a distance inwardly therefrom. Second housing 214 defines four recesses 214g therein that are arranged in a single row. The recesses 214g in the row are horizontally aligned with one another and are laterally spaced apart from one another. Each recess 214g is generally a rectangular cuboid in shape and is oriented generally parallel to first end surface 214c and at right angles to inner surface 214b. Recesses 214g are separated from adjacent recesses 214g by solid sections of the material from which second housing 214 is fabricated. While recesses 214 have been described and illustrated herein as being generally a rectangular cuboid in shape, it will be understood that the recess may be differently configured. For example, the recess may be generally cylindrical in shape While the second housing 214 is illustrated as having four recesses 214g defined therein, it will be understood that in other embodiments (not illustrated herein), only one recess 214g may be defined in second housing 214, or two recesses, three recesses, or more than four recesses may be defined therein. Additionally, the arrangement of the location of the various recesses 214g in second housing 214 may be different from what is illustrated in the attached figures and described herein. It will be understood that any suitable pattern of recesses 214g may be utilized in second housing 214.

Second housing 214 further defines an opening 214h therein that extends from an opening in first end surface 214c through to an opening in second end surface 214d. In particular, the opening 214h includes a countersunk entrance in at least first end surface 214c. As will be described later herein, opening 214h is configured in this manner such that when a first fastener 264 (FIG. 23) in inserted therethrough, that the head of that first fastener 264 will be retained below the plane of the first end surface 214c. This can be seen in FIG. 23.

As indicated earlier herein, a third housing 240 is provided as part of vibration dampening device 210. Referring to FIGS. 25A through 25C, third housing 240 is generally a rectangular cuboid in shape and has a first outer surface 240a, a second outer surface 240b, a first end surface 240c, a second end surface 240d, a first side surface 240e, and a second side surface 240f. Each of the first outer surface 240a and second outer surface 240b defines a pair of laterally spaced-apart recesses 240g therein. The recesses 240g defined in first outer surface 240a are horizontally aligned with the recesses 240g defined in second outer surface 240b. Recesses 240g in first outer surface 240a and recesses 240g in second outer surface 240b are laterally aligned with one another and are laterally spaced-apart from one another. The recesses 240g are configured to be alignable with one or the other of the recesses 212g of first housing 212 or with the recesses 214g of second housing 214.

A hole 240h is defined in first end surface 240c of third housing 240. Hole 240h is configured to receive a complementary fastener therein, as will be described later herein. Hole 240h originates in an opening defined in first end surface 240c, extends for a distance inwardly towards second end surface 240d, and terminates a distance inwardly away from second end surface 240d. Hole 240h is located between the two adjacent recesses 240g defined in first outer surface 240a and second outer surface 240b. Hole 240h is separated from each of the four recesses 240g by a section of solid material. Effectively the hole 240h is located generally in the center of first end surface 240c and extends inwardly therefrom. The purpose of hole 240h will be described later herein. An annular reinforcing flange 240h' is provided on first end surface 240c. Annular flange 240h' circumscribes the hole 240h and extends outwardly for a distance beyond first end surface 240c.

As indicated above, a plurality of isolators 216 and plurality of isolator inserts 218 comprise part of vibration dampening device 210. Each isolator 216 is fabricated from material that is one or more of resilient, shock absorbing, and vibration dampening. Suitable materials for use in the fabrication of isolator 216 include rubber-like materials such as natural rubber and synthetic viscoelastic urethane polymers. Each isolator 216 is complementary in shape and size to one of the recesses 212g, 214g, or 240g defined in first housing 212, second housing 214, and third housing 240, respectively. Vibration dampening device 110, as illustrated, includes eight substantially identical isolators 216. Each isolator 216 may be generally a rectangular cuboid in shape as has previously been described herein or may be generally cylindrical in exterior shape (or any other desired shape). The isolators 216 perform the same function as isolators 16 and 116 and therefore will not be described in further detail herein other than to identify a recess 116g (FIG. 25A)

therein for receiving an end of one of the isolator inserts 118 therein. The recess 216g originates in an opening defined in an inner wall (not numbered) of the isolator 216 and extends for a distance into the interior of isolator 216.

Vibration dampening device 110 also include four isolator inserts 218 which are arranged to be engaged in opposing pairs of isolators 216. As such, the isolator inserts 218 will extend between an isolator 216 engaged in first housing 212 and an isolator 216 engaged in third housing 240 or between an isolator 216 engaged in second housing 214 and an isolator 216 engaged in third housing 240. Isolator inserts 218 are configured to be complementary to the configuration of the recess 216g defined in isolator 216. As illustrated in FIG. 25A each recess 216 is generally cylindrical and therefore each isolator 218 is generally cylindrical. It will be understood that any desired number of isolators 216 and isolator inserts 218 may be utilized in vibration dampening device 210 and the recesses in the first, second, and third housings 212, 214, 240, and in the isolators 216 will be complementary to accommodate the selected shape and size of the other components. In some applications, one suitable material for the fabrication of isolator inserts 218 is metal. In other applications, one suitable material for the fabrication of isolator inserts 218 is plastic. Isolator inserts 218 are substantially rigid components that may be substantially solid in nature, i.e., free of any interior voids. (It will be understood that in other applications, the isolator inserts 218 may be hollow.

Vibration dampening device 210 is assembled by engaging the isolators 216 in the recesses 212g, 214g, and 240g of first housing 212, second housing 214, and third housing 240. Isolator inserts 218 are then inserted into opposed pairs of isolators 216 in the first housing 212 and third housing 240, and in the second housing 214 and third housing 240. The first and second housings 212, 214 are pushed inwardly towards the centrally located third housing 240 until the length of the isolator inserts 218 halts further inward movement. At this point, vibration dampening device 210 is fully assembled. In one embodiment, when fully assembled, vibration dampening device 210 is of a length "L8" that is about 54mm, of a width "W8" that is about 42mm. A gap 222 is defined between inner surface 212b of first housing 212 and first outer surface 240a of third housing 240. A gap 222 is also defined between inner surface 214b of second housing 212 and second outer surface 240b of third housing 240. The gap 222 prevents third housing 240 from directly contacting either of first housing 212 and second housing 214. In one embodiment, the gap 222 is about 1 mm.

Figure 23:
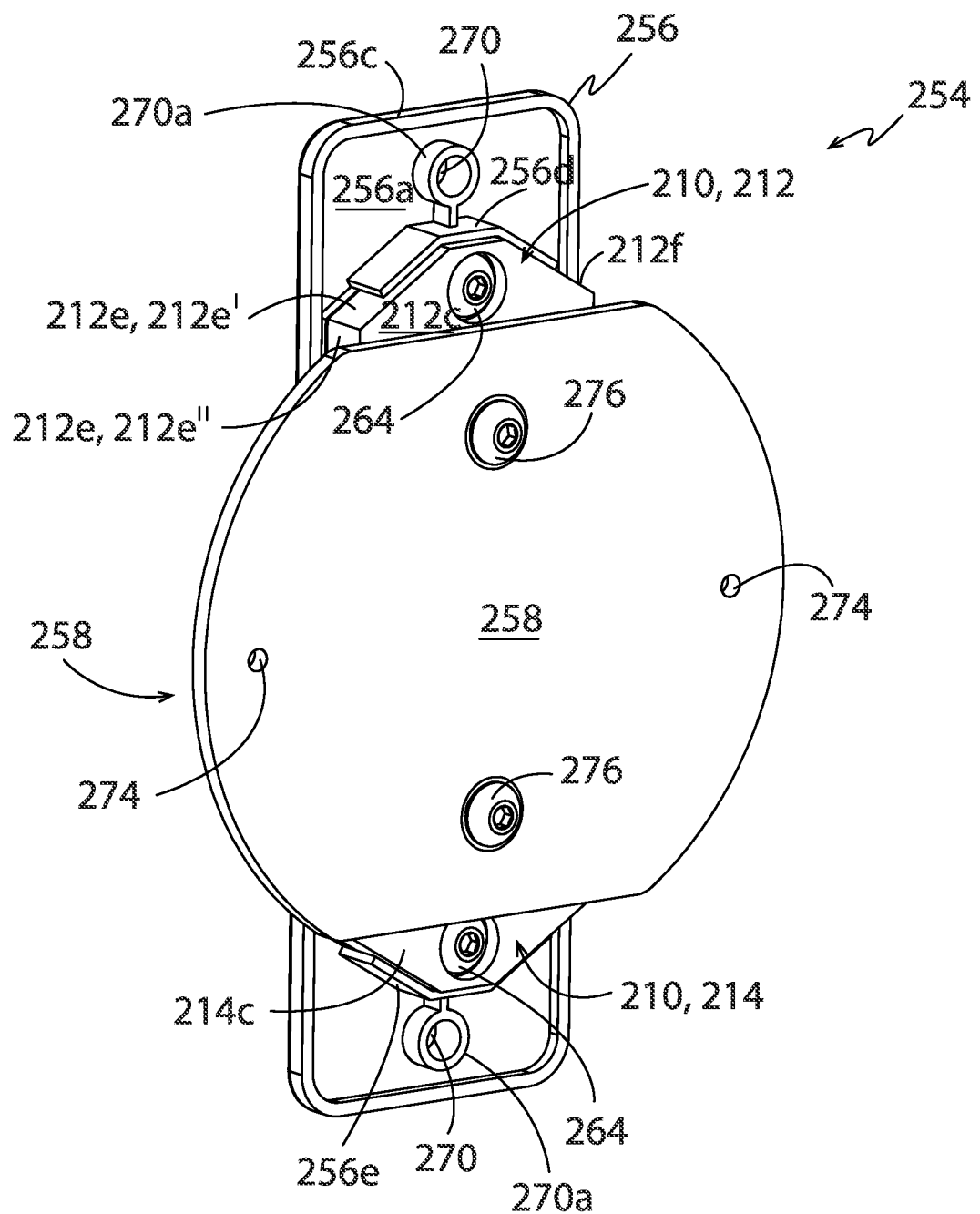
FIG. 23 is a top, front, left side perspective view of a mounting assembly which includes a third embodiment of a vibration dampening device in accordance with an aspect of the present disclosure.
Figure 24:
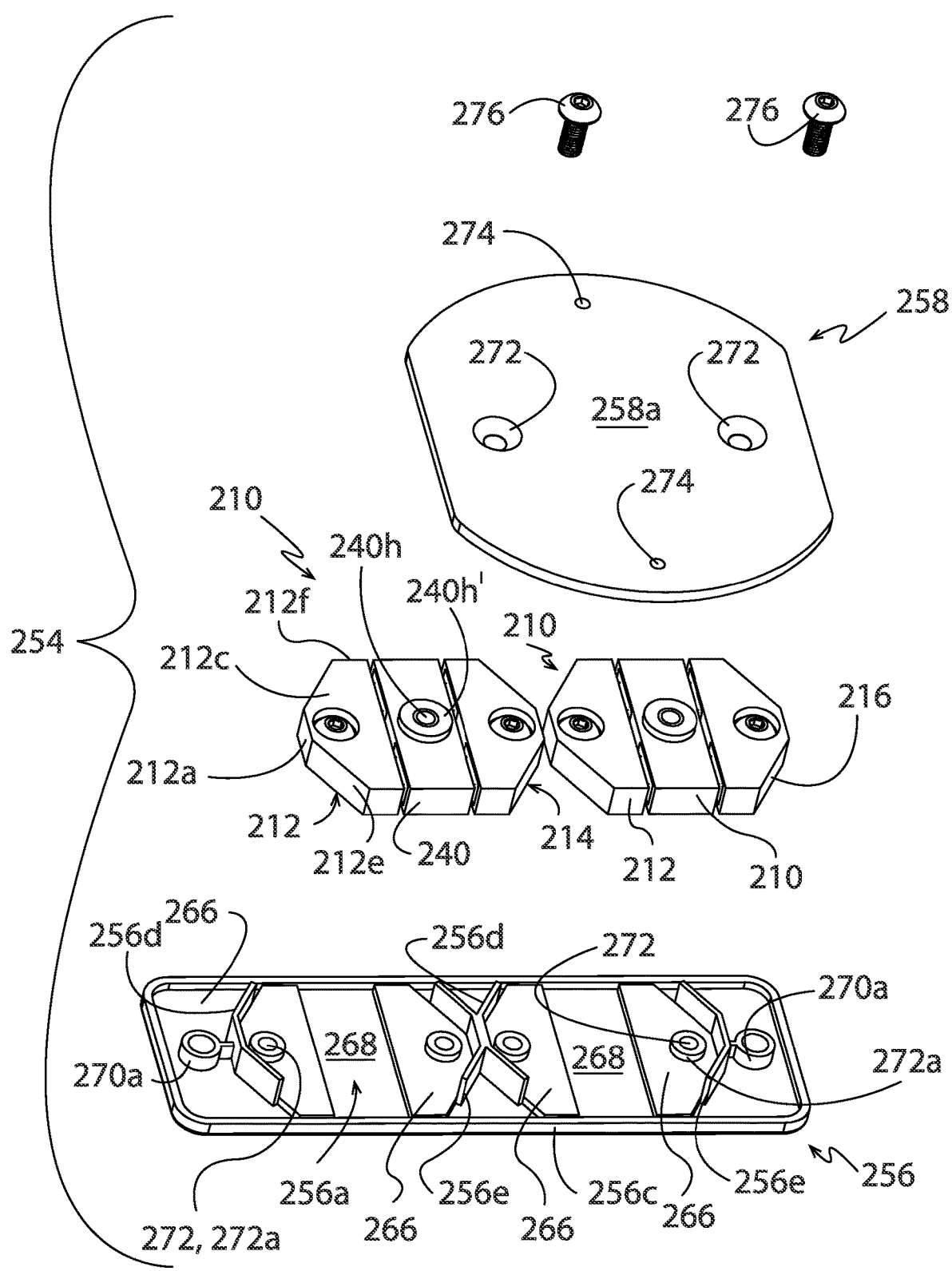
FIG. 24 is an exploded top, front, left side perspective view of the mounting assembly of FIG. 23 showing the third embodiment of the vibration dampening device in accordance with an aspect of the present disclosure.
Figure 26:
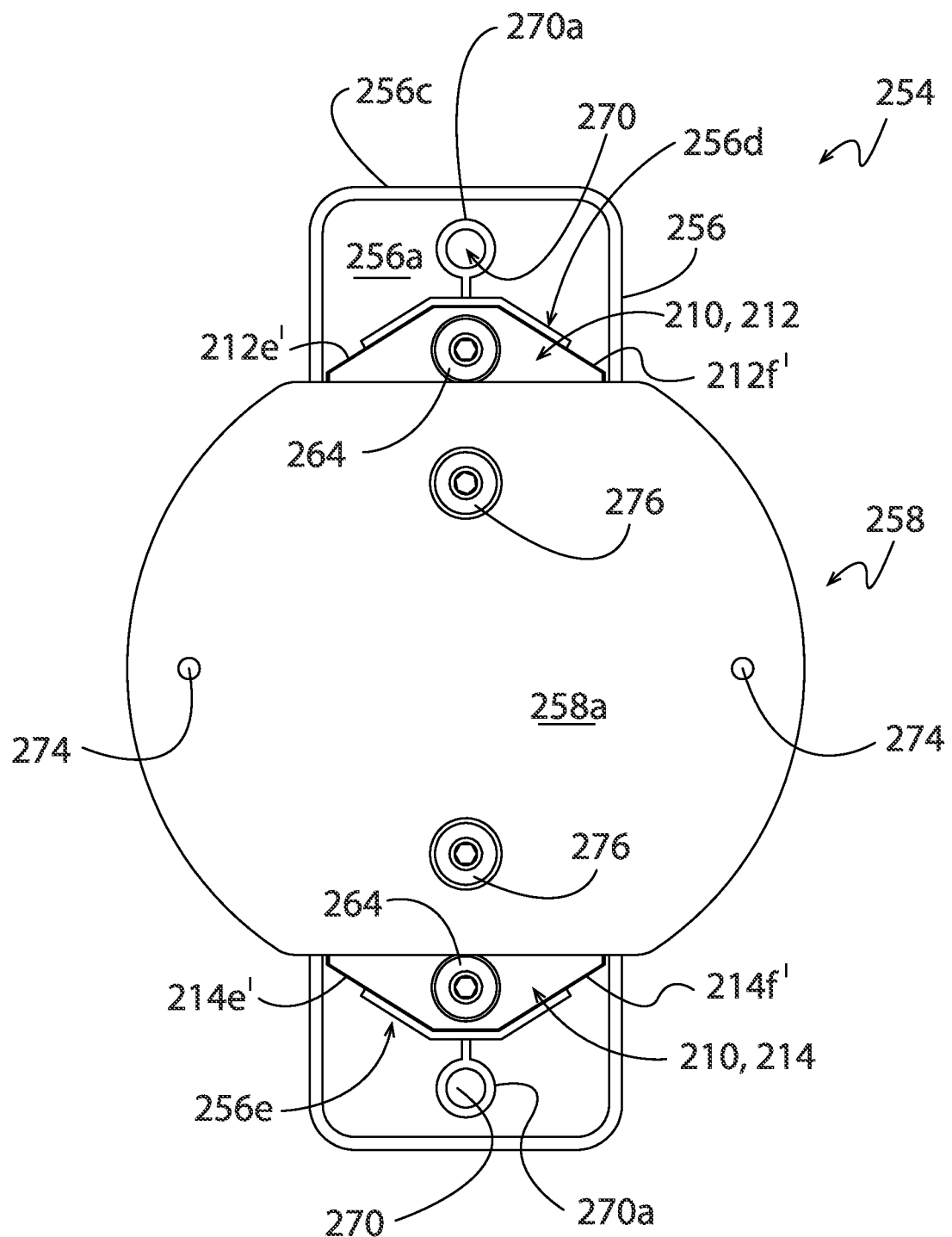
FIG. 26 is a front elevation view of the mounting assembly of FIG. 23.
Figure 27:
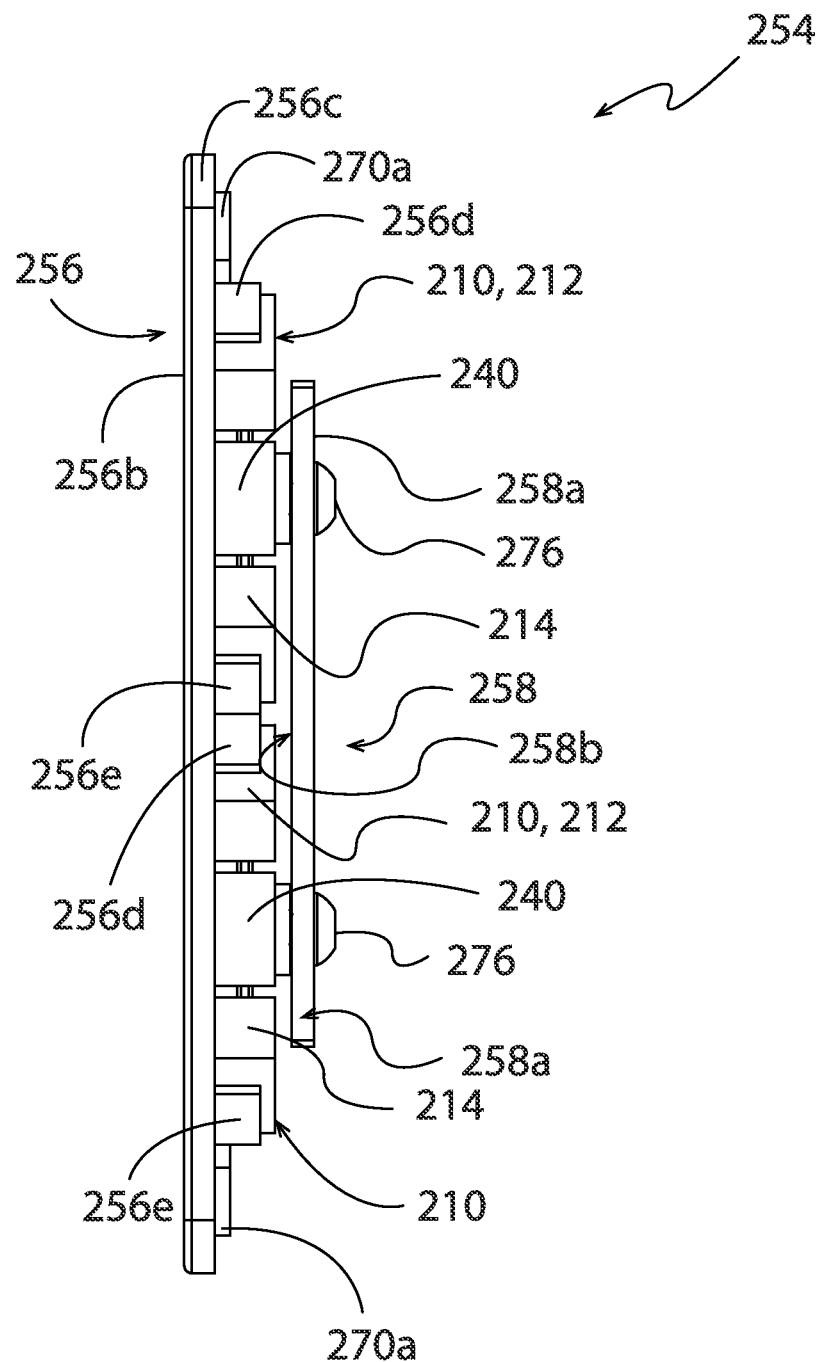
FIG. 27 is a left side elevation view thereof.

Referring now FIGS. 23 and 24, mounting plate 256 is provided to receive a pair of vibration dampening devices 210. Mounting plate 256 is illustrated as being a generally rectangularly-shaped plate when viewed from the front as in FIG. 24. Mounting plate 256 has a front surface 256a and a rear surface 256b (FIG. 28), and a raised outer perimeter 256c. Since mounting plate 256 is configured to receive two vibration dampening devices 210 therein, four truncated V-shaped walls are provided. The V-shaped walls are arranged in longitudinally spaced-apart pairs that each include a first wall 256d that is an inverted truncated V-shape and a second wall 256e that is a truncated V-shape. The first walls 256d and second walls 256e extend outwardly from front surface 256a of mounting plate 256 and at right angles thereto. The two pairs are arranged vertically one above the other. In generally a center of front surface 256a, the uppermost second wall 256e and the lowermost first wall 256d are arranged back-to-back and generally form an X-shape. The configuration of the first walls 256e and 256d is complementary to the peripheral shape of a portion of the first housing 212 and a portion of the second housing 214. For example, the first wall 256d is complementary to at least part of the first section 212e' of first side surface 212e of first housing 212, the outer surface 212a, and at least a part of a first section 212f' of second side surface 212f. This is best seen in FIG. 26. The second wall 256e is complementary to at least part of the first section 214e' of first side surface 214e of second housing 214, the outer surface 214a, and at least a part of a second first section 214f' of second side surface 214f. As best seen in FIG. 27, first wall 256d and second wall 256e extend outwardly from first surface 256a of mounting plate 256 for a greater distance than does perimeter edge 256c. FIG. 27 shows that vibration dampening devices 210 extend even further outwardly from front surface 256a than do first wall 256d and second wall 256e.

It should be noted that the distance between an inner surface of first wall 256d and second wall 256e is such that a single vibration dampening device 210 will be tightly retained therebetween by friction. First wall 256d and second wall 256e are provided to help prevent vibration dampening devices 210 from twisting, i.e., the walls 256d, 256e are provided to reduce torsion in vibration dampening devices 210. While first wall 256d and second wall 256e are illustrated herein as being truncated V-shapes, it will be understood that this configuration is selected to be complementary to the configuration of the vibration dampening devices 210 that are received therebetween. The distance between first wall 256d and second wall 256e is slightly smaller than the dimensions of the vibration dampening device 210 to be received therebetween as it is desirable that the vibration dampening device 210 is tightly retained therebetween instead of being loosely retained therebetween. It will be understood that vibration dampening device 210 may be configured in any desired manner and are then constrained against twisting by complementary wall(s). The shape of vibration dampening device 210 and the complementary wall(s) in which the device is retained will be selected based on the application in which the vibration dampening device 210 is utilized.

FIG. 24 shows that a plurality of spacer plates 266 are provided on front surface 256a of mounting plate 256. Each spacer plate 266 is of a shape complementary to the shape of the second end surface 212d of first housing 212 and the second end surface 214d of second housing 214. Each spacer plate 266 is positioned on front surface 256a proximate one or the other of first wall 256d and second wall 256e. As such a region of front surface 256a extends between the two spacer plates 266. The region of front surface 256a that is free of spacer plates 266 is indicated by the reference character 268 in FIG. 24. The region 268 that is free of spacer plates is recessed relative to the outer surface of each spacer plate 266 that will abut one or the other of the first housing 212 and second housing 214.

Figure 28:
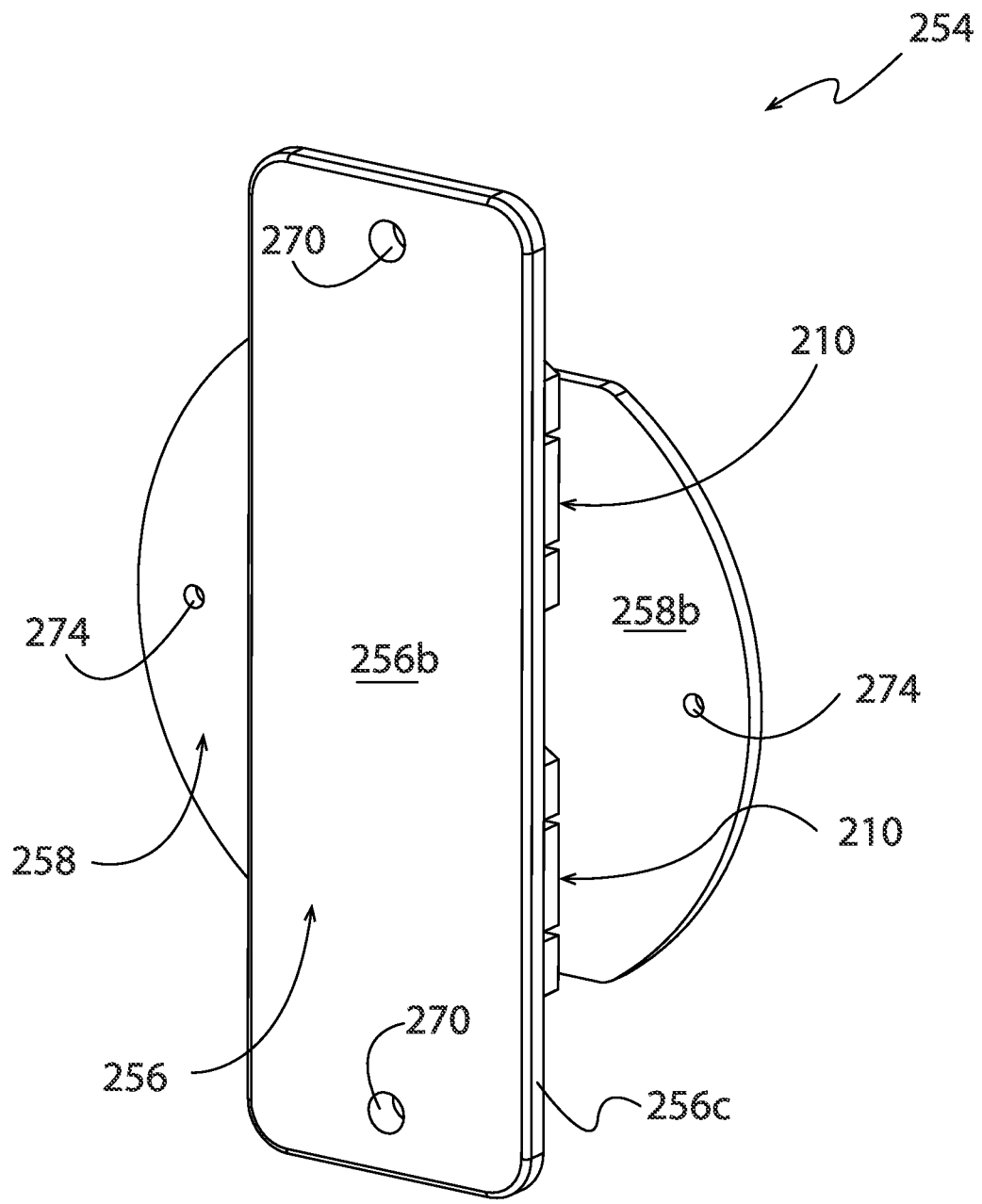
FIG. 28 is a top, rear, left side perspective view thereof.
Figure 29:
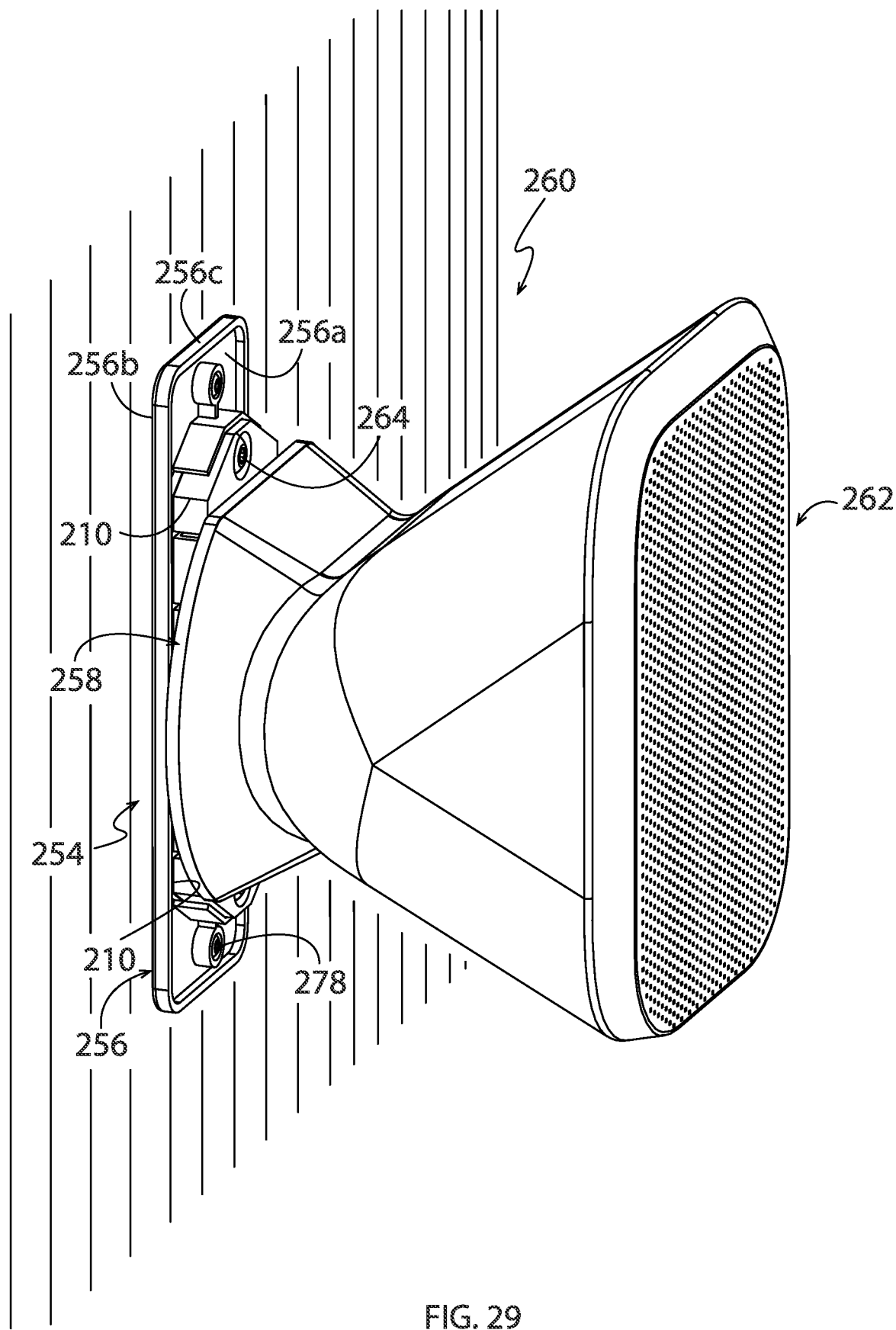
FIG. 29 is a top, front, left side perspective view of the mounting assembly of FIG. 23 shown mounting a speaker to a vertically-oriented support surface.

FIGS. 23, 26, and 28 shows that two through-holes 270 are defined in spacer plate 266 that are circumscribed by an annular ring 270a. The holes 270 extend from front surface 256a through to rear surface 256b of mounting plate 256. Each of the spacer plates 266 provided on front surface 256a defines a threaded hole 272 therein that extends from a front surface to a rear surface of the spacer plate 266. An annular reinforcing flange 272a circumscribes each hole 272.

When vibration dampening devices 210 are engaged with mounting plate 256, each vibration dampening device 210 is inserted into the gap defined between one of the pairs of first walls 256d and second walls 256e. The first housing 212 of each vibration dampening device 210 is placed on the spacer plate 266 adjacent first wall 256d and the second housing 214 is placed on the spacer plate 266 adjacent second wall 256e. (Obviously, since the vibration dampening device 210 is symmetrical, the second housing 214 may be placed adjacent first wall 256d and first housing 212 may be placed adjacent second wall 256e.) Care must be taken to ensure that the hole 240h in third housing 240 faces outwardly away from front surface 256a of mounting plate 256. Additionally, when vibration dampening devices 210 are engaged with mounting plate 256, the openings 212h and 214h are brought into alignment with the threaded holes 270 defined in the spacer plates 266. Threaded first fasteners 264 are then inserted through the aligned openings 212h, 214h and holes 270 and are rotated so as to secure isolating assembly 210 to mounting plate 256.

A faceplate 258 for an article to be engaged with the vibration dampening devices 210 is then engaged with the same. Faceplate 258 may be of any desired shape or size and includes a front surface 258a and a rear surface 258b (FIG. 28). A first pair of apertures 272 (FIG. 24) IS defined in faceplate 258. Each of these apertures 272 extends between the front surface 258a and rear surface 258b and is located so as to be able to be aligned with the hole 240h defined in one of the two vibration dampening devices 210. Each aperture 272 is countersunk into front surface 258a of faceplate 258. A second plurality of openings 274 is defined in faceplate with each opening 274 extending between front surface 258a and rear surface 258b. The attached figures show two such openings 274 but more may be provided if required. As is evident from FIG. 28, regions of faceplate 258 extend outwardly beyond the perimeter edge 256c of mounting plate 256. The openings 274 are defined in these regions of faceplate 258.

Faceplate 258 is secured to vibration dampening devices 210 by aligning the apertures 272 with the holes 240h defined in the two isolating assemblies 210. Second fasteners 276 are then inserted through the aligned apertures 272 and holes 240h. Holes 240h may be threaded and threads on the second fasteners 276 may engage the same to secure faceplate 258 to vibration dampening devices 210.

Mounting plate 256 may be fixedly secured to a support surface by inserting additional fasteners 278 (FIG. 29) into the two through-holes 270 and then into the desired support surface such as the wall 260 illustrated in FIG. 29. (It will be understood that in some applications it may be desirable to include a foam layer on rear surface 256b of mounting plate 256 to ensure wall 260 is not damaged thereby.) An article to be support by the mounting assembly 254 can then be secured to the faceplate 258. FIG. 29 shows a speaker 262 engaged with the faceplate 258. Fasteners (not shown) can be inserted through the openings moving in a direction from rear surface 258b through to front surface 258a and into the back of the speaker 262.

When speaker 262 is engaged with mounting assembly 254, the speaker 262 itself is not secured directly to the support surface 260. Instead, the speaker 262 is operatively engaged with the two third housings 240 of the vibration dampening devices 210. These third housings 240 are operatively engaged with the associated first and second housings 212, 214 of the respective vibration dampening devices 210 via the isolator inserts 218 and isolators 216. Any vibrations generated by speaker 262 will be attenuated by the resilient, vibration dampening isolators 216 and will not tend to be transferred to the support surface 260. The third housings 240 are spaced from the first and second housings 212, 214 by the gaps 222 (FIG. 25B) and are spaced from the front surface of the mounting plate 256 because they are located over the recessed regions 268 between the spacer plates 266. Additionally, the height of the annular flange 240h' that circumscribes the hole 240h defined in the third housing 240 keeps the rear surface 258b of the faceplate 258 a distance away from the first end surfaces 212c and 214c of the first and second housings 212, 214, respectively. The faceplate 258 and thereby the speaker 262 therefore "float" relative to the mounting plate 256. Any vibrations emanating from the support surface 260 are attenuated by the resilient vibration-dampening isolators 216 and are therefore not passed on to the faceplate 258 and thereby to the speaker 262. This arrangement helps to ensure that the quality of sound emitted by the speakers is greatly improved relative to the sound that would be emitted if the vibration dampening devices 210 were not interposed between the speaker 262 and the support surface 260.

In summary, an audio speaker 262 (loudspeaker) which is normally affixed to a surface or ceiling can be affixed to a faceplate, such as faceplate 258, that has a number of vibration dampening devices 210 attached to the faceplate's back side. A mounting plate, such as mounting plate 256, is affixed to the isolation component (i.e., third housing 240) of these vibration dampening devices 210 (which may also be referred to as vibration dampening units). When the mounting plate is affixed to the surface or ceiling, the isolation component (third housing 240) is directly connected to the mounting plate and to the base components, i.e., first and second housings 212, 214. The connection is made via the numerous isolator assemblies 116, 118 which are directly connected to the faceplate 258 on which the loudspeaker 262 is attached. The vibrations created by the loudspeaker 262 are conducted through the faceplate 258 and the vibration dampening units 210 attenuate and reduce vibrations traveling through the resilient material, i.e., isolators 216 and isolator inserts 118, and continuing on to the mounting plate 256 and surface or ceiling.

The base component i.e., first and second housings 212, 214 may be directly connected to the speaker mounting structure and the isolation component, i.e., the third housing 240, will be connected directly to the speaker or to a fastening system that is connected to the speaker. The speaker, with or without a fastening system, is directly connected to the isolation component, third housing 240, which maintains the speaker's position while attenuating the transfer of vibrations to the speaker's mounting structure and the associated supporting surface.

Referring now to FIGS. 30 to 35, there is shown an alternative mounting assembly for an article to be supported on a surface, generally indicated at 378. The mounting assembly 378 utilizes one or more vibration dampening devices therein. In particular, mounting assembly 378 as illustrated and described herein includes four vibration dampening devices that are substantially identical to vibration dampening devices 210 described above and illustrated in FIG. 25A. Because of this, the vibration dampening device used in mounting assembly 378 are also identified by the reference number 210 in the description below and in the attached figures.

Figure 32A:
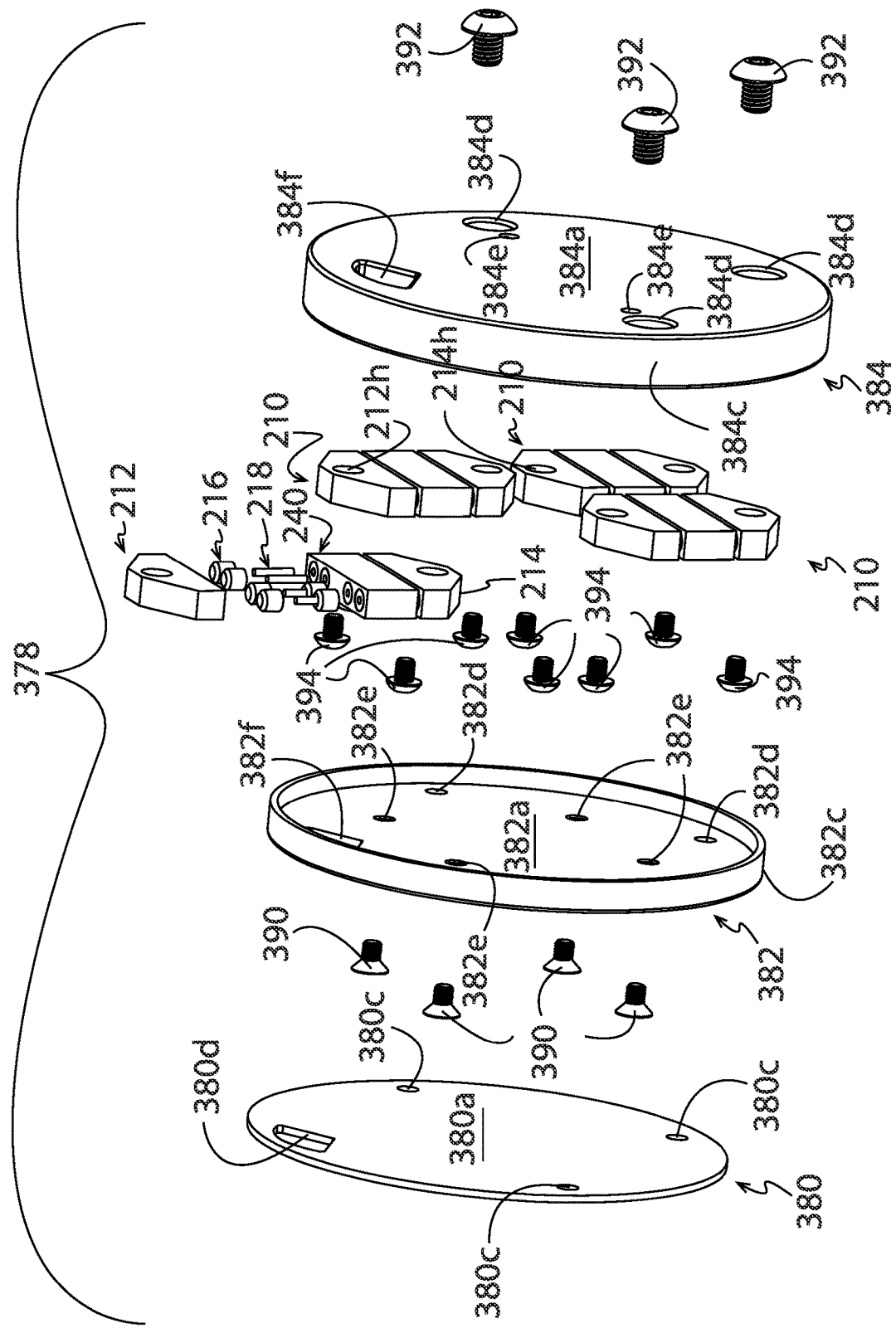
FIG. 32A is an exploded top, front, left side perspective view of the mounting assembly which incorporates the third embodiment of the vibration dampening device.

As best seen in FIG. 32A, mounting assembly 378 comprises an inner housing 382, a plurality of vibration dampening devices 210, and an outer housing 384. FIG. 32A also illustrates a foam layer 380 that is optionally selectively engageable with inner housing 382. Mounting assembly 378 is capable of being secured to any suitable support surface, such as a wall 386 shown in FIG. 36 and is useful for securing an article on support surface 386. FIG. 37 shows an exemplary article in the form of an audio speaker 388 being secured by mounting assembly 378 to wall 386.

It should be understood that mounting assembly 378 may also be used to support the article (e.g. audio speaker 388) on a horizontally-oriented surface such as a ceiling. In this instance, the audio speaker 388 will hang downwardly from the ceiling. Still further, mounting assembly 378 may be secured to an inclined surface and thereby retain the audio speaker 388 in such a way that the speaker extends outwardly from the inclined surface. Furthermore, in other instances, mounting assembly 378 does not need to be fixedly secured to the support surface but may simply rest thereupon. For example, if it is desired to support the article 388 on a horizontal shelf of a cabinet and dampen vibrations to or from the article 388, the mounting assembly 378 may simply rest upon the shelf (i.e., is not secured thereto) and will retain the article 388 in an orientation where the article 388 extends vertically upwardly from the shelf.

Since mounting assembly 378 includes a plurality of vibration dampening devices 210 which have been discussed in detail above, no further description of said vibration dampening devices will be provided hereafter, except to state that in the illustrated mounting assembly 378 four vibration dampening devices 210 are utilized. It will be understood that in other applications, fewer than or more than four vibration dampening devices 210 may be incorporated into mounting assembly 378.

Referring to FIG. 32A, foam layer 380 of mounting assembly 378 includes a front surface 380*a* and a rear surface 380*b* (FIG. 36). In the illustrated embodiment, mounting assembly 378 is generally circular when viewed from the front (as in FIG. 30) and as shown in FIG. 32A, the foam layer 380 is also generally circular when viewed from the front. While mounting assembly 378 and foam layer 380 are illustrated herein as being generally circular in shape, it will be understood that the configuration of the various components of mounting assembly 378 is selected to be complementary to the speaker which is being mounted to the surface by mounting assembly 378. It should therefore be understood that if the speaker is generally square in shape (or of any other configuration) then the mounting assembly and the foam layer would be generally square (or of any other complementary configuration to the speaker).

Foam layer 380 is configured to be secured to a rear surface of inner housing 382 in any suitable manner such as through application of an adhesive. Foam layer 380 defines a plurality of apertures 380*c* therein that extend from front surface 380*a* through to rear surface 380*b*. In the figures, three such apertures 380*c* are illustrated but it will be understood that fewer than three apertures 380*c* or more than three apertures 380*c* may be defined in foam layer 380. Apertures 380*c* are provided so that fasteners (not shown) used to install mounting assembly 378 on support surface 386 are able to pass through foam layer 380 and into the support surface 386 (as will be described later herein). Foam layer 380 further defines an opening 380*d* therein that extends between front surface 380*a* and rear surface 380*b*. Opening 380*d* is shaped similar to a pie-shaped wedge (i.e., generally triangular) but it will be understood that the opening may be of any other desired shape. The purpose of opening 380*d* will be discussed later herein.

Figure 33:
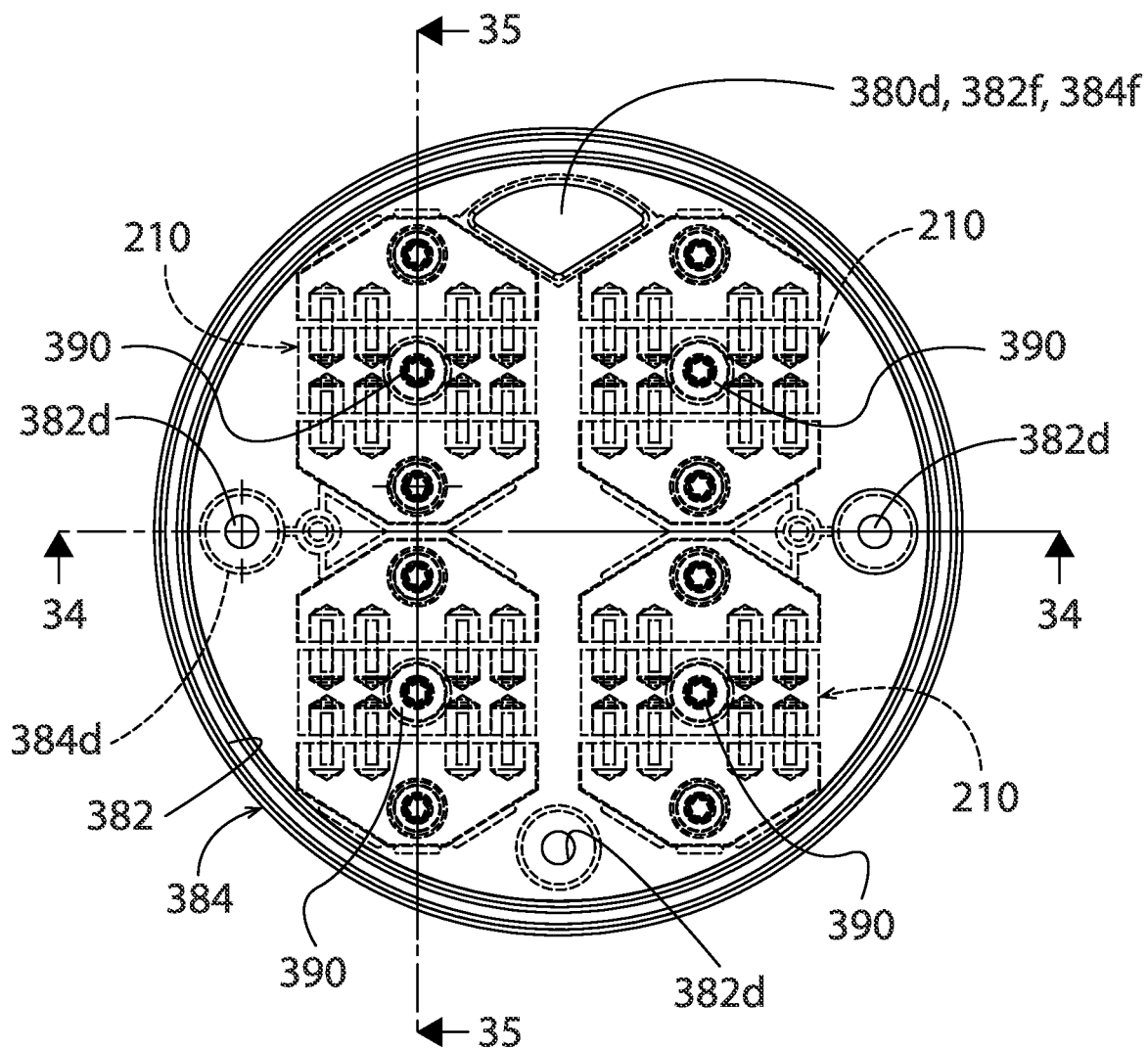
FIG. 33 is a cross-section of the alternative mounting assembly taken along line 33-33 of FIG. 31.
Figure 34:
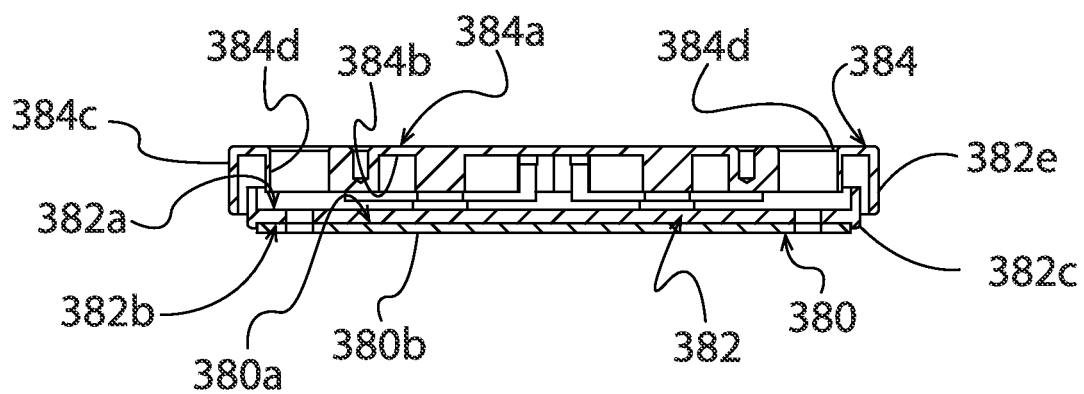
FIG. 34 is a cross-section of the alternative mounting assembly taken along line 34-34 of FIG. 33.

Referring to FIG. 32A, inner housing 382 is generally circular in shape when viewed from the front (see FIG. 33). As indicated above, in other embodiments where a different shape audio speaker is being mounted to the support surface, the inner housing will be configured to be complementary to the differently configured audio speaker. Inner housing 382 includes a bottom wall having a front surface 382*a* and a rear surface 382*b* (FIG. 35). An annular side wall 382*c* extends upwardly and outwardly away from an outer circumference of the bottom wall. Foam layer 380, if utilized, is applied to rear surface 382*b* of inner housing 382. A plurality of apertures 382*d*, holes 382*e*, and an opening 382*f* are defined in the bottom wall, extending between the front surface 382*a* and rear surface 382*b* of inner housing 382. Apertures 382*d* are located so as to be selectively aligned with the apertures 380*c* of foam layer 380 when the bottom wall of inner housing 382 is placed on the front surface 380*a* of foam layer 380. A complementary number of apertures 380*c*, 382*d* are provided in foam layer 380 and the bottom wall of inner housing 382. Holes 382*e* are located inwardly from the apertures 382*d* and the spacing and placement of holes 382*e* is selected based on where the four vibration dampening devices 210 are to be secured to the bottom wall of inner housing 382, as will be discussed hereafter. The openings 380*d*, 382*f* are complementary is shape, size, and placement. Opening 380*d* defined in foam layer 380 is positioned to be alignable with opening 382*f* in bottom wall of inner housing 382.

The four vibration dampening devices 210 are engaged with inner housing 382 by placing each vibration dampening device 210 upon front surface 382*a* of the bottom wall. In particular, the flange 280*h'* (see FIG. 24) of the third housing 240 abuts the front surface 382*a* and the threaded hole 240*h* (FIG. 25B) aligns with one of the holes 382*a* defined in the inner housing's bottom wall. A first fastener 390 is inserted through each hole 382*e* and is engaged in the hole 240*h* of each vibration dampening device 210. (The first fastener 390 may be threadedly engaged in the hole 240*h*.)

Outer housing 384 includes a front wall having a front surface 384*a*, a rear surface 384*b* (FIG. 35), and an annular side wall 384*c* that extends inwardly away from a circumference of the front wall. As is best seen in FIG. 35, outer housing 384 is slightly larger in circumference than inner housing 382, which in turn is slightly larger in circumference than foam layer 380. This configuration helps to enable outer housing 384 to be positioned around the exterior surface of the inner housing 382, and for the inner housing 382 to effectively hide the foam layer 380 from view.

Outer housing 384 defines a plurality of apertures 384*d* that extend between front surface 384*a*, and rear surface 384*b* of the front wall thereof. Apertures 384*d* are located so as to be selectively alignable with the apertures 382*d* defined in the bottom wall of inner housing 382 and with the apertures 380*c* defined in the foam layer 380. The number of apertures 384*d* defined in the front wall of outer housing 384 is complementary to the number of apertures 384*d* defined in inner housing 382. In the illustrated embodiment, there are three apertures 384*d* defined in outer housing 384. Each of the apertures 384*d* defined in outer housing 384 is of a substantially greater diameter than the apertures 382*d* defined in inner housing 382. This can be seen in FIG. 30. When the outer housing 384 is operably engaged with the inner housing 382, a second fastener 392 is inserted through each aperture 384*d* and through the aligned aperture 382*d* in inner housing. However, because of the greater diameter of the apertures 384*d*, the heads of the second fasteners 392 pass right through the aperture 384*d* but cannot pass through the associated aperture 382*d* defined in inner housing 382. The shaft of each fastener 392 passes through the associated aperture 382*d* and the aperture 380*c* defined in foam layer 380. The shaft of each fastener 392 is subsequently threadedly engaged with the support surface 386 to secure the inner housing 382 thereto.

Figure 30:
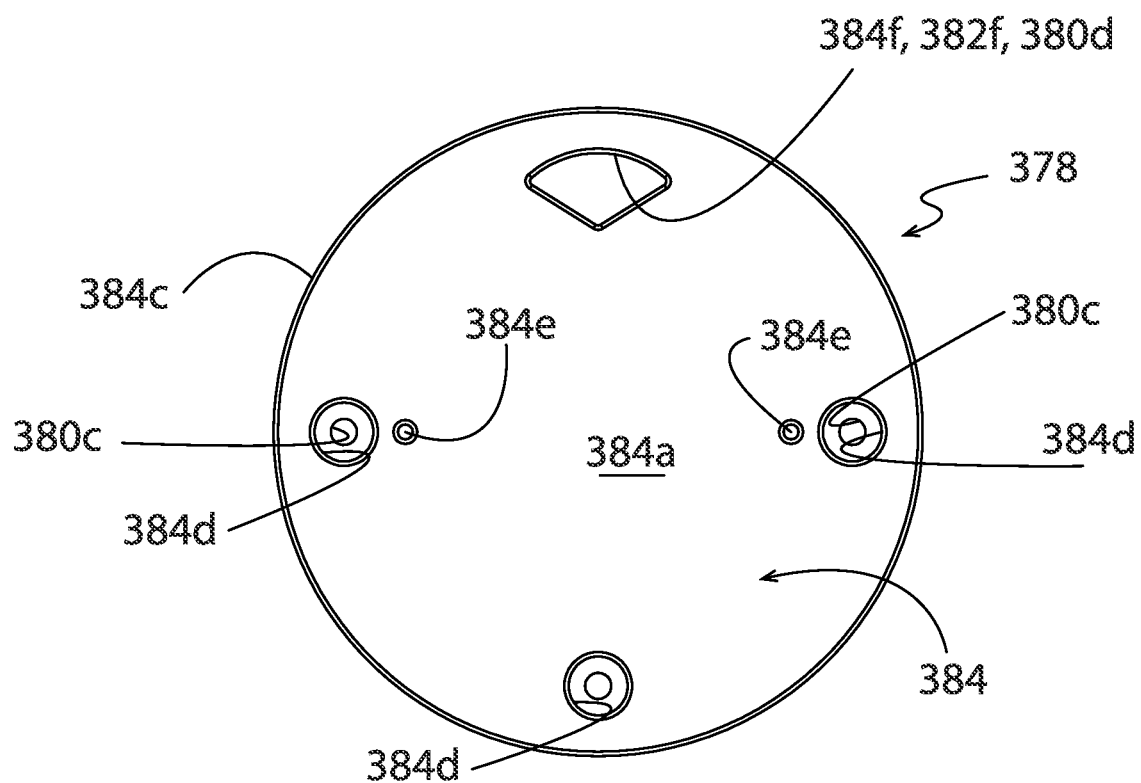
Figure 31:
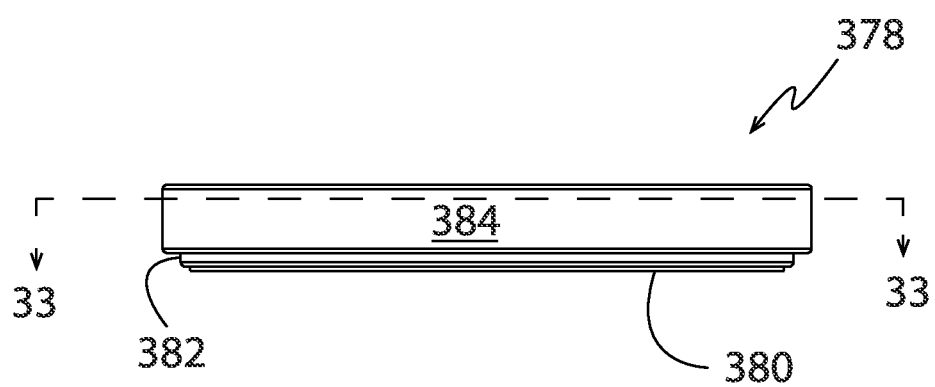
FIG. 31 is a side elevation view of the alternative mounting assembly shown in FIG. 30.

Outer housing 384 further defines a plurality of holes 384e that extend between front surface 384a, and rear surface 384b. As shown in FIG. 30, outer housing 384 includes two laterally spaced-apart holes 384e that are located a distance laterally inwardly from two of the apertures 384d that are laterally spaced apart from one another. The front wall of outer housing 384 further defines an opening 384f therein that is complementary to the opening 382f defined in inner housing 382 and opening 380d defined in foam layer 380. The opening 348f will be aligned with openings 382f and opening 380 when the mounting assembly 378 is assembled. These components will be further described later herein.

Figure 32B:
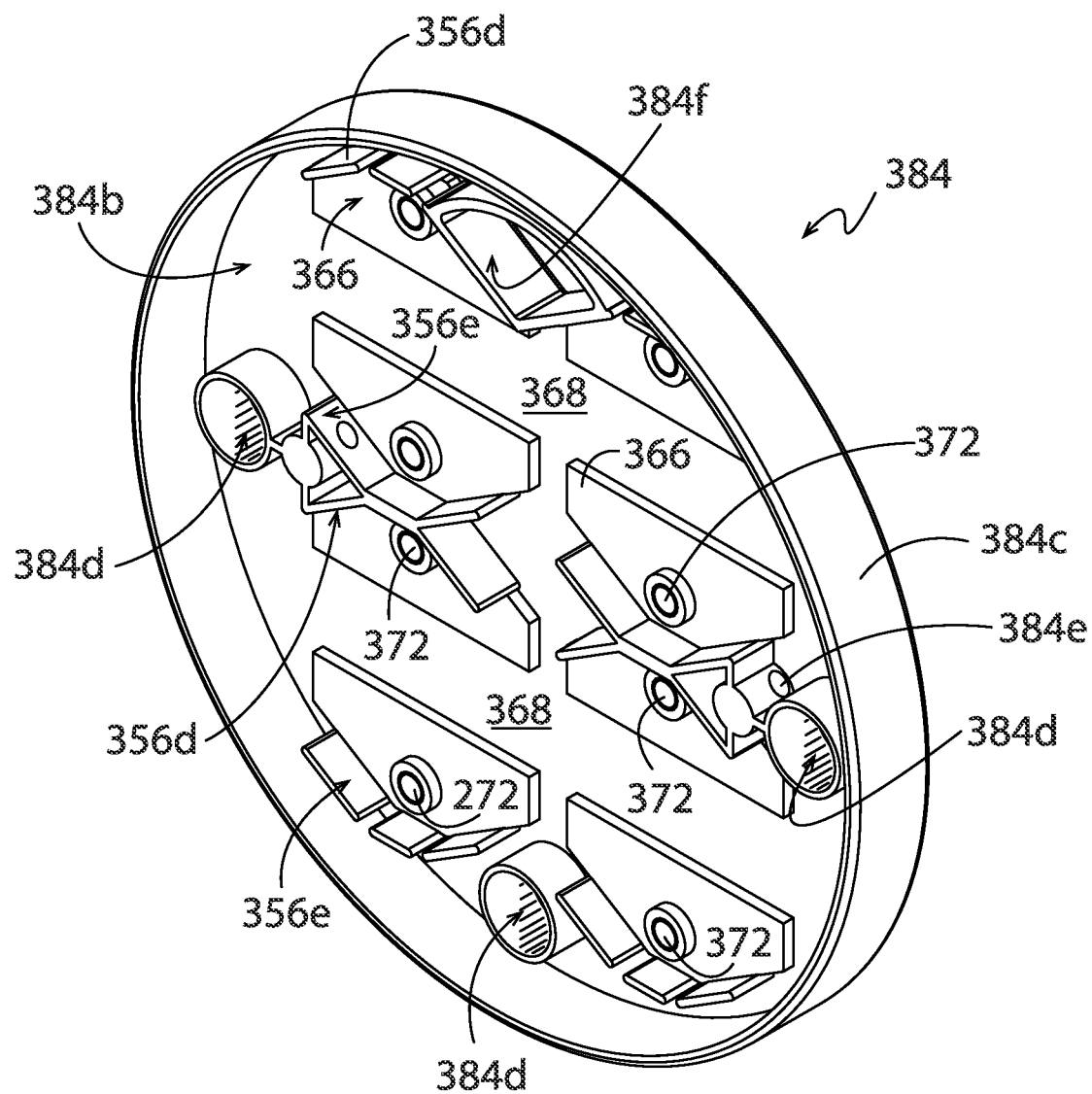
FIG. 32B is a rear elevation view of the outer housing of the alternative mounting assembly of FIG. 30

Referring to FIG. 32B, since mounting assembly 378 is configured to receive four vibration dampening devices 210 therein, eight truncated V-shaped walls are provided on rear surface 384b of outer housing 384. In particular, the V-shaped walls include four first walls 356d, and four second walls 356e arranged in opposing pairs. The truncated V-shaped first wall 356d is substantially identical in structure and function to the first wall 256d discussed earlier herein with reference to mounting assembly 254 and illustrated in FIG. 24. Similarly, the second walls 356e are each substantially identical in structure and function to the second wall 256e of mounting assembly 254. As such, the pairs of V-shaped walls 356d, 356e will not be described further herein. It should be noted that the distance between an inner surface of first wall 356d and the inner surface of second wall 356e is such that a single vibration dampening device 210 will be retained therebetween by friction.

FIG. 32B shows that a plurality of spacer plates 366 are provided on rear surface 384b of the front wall of outer housing 384. Each spacer plate 366 is substantially similar in structure and function to the spacer plates 266 of mounting assembly 254 described earlier herein and illustrated in FIG. 24. Each spacer plate 366 is positioned on rear surface 384b of outer housing 384 proximate one or the other of first wall 356d or second wall 356e. As such a region of rear surface 384a, extends between the two spacer plates 366. The region of rear surface 384b that is free of spacer plates 366 is indicated by the reference character 368 in FIG. 32B. The region 368 that is free of spacer plates is recessed relative to the outer surface of each spacer plate 366 that will abut one or the other of the first housing 212 and second housing 214 of the vibration dampening device 210. Each of the spacer plates 366 defines a threaded hole 372 therein that extends from a front surface to a rear surface of the spacer plate 366. An annular reinforcing flange (not numbered) circumscribes each hole 372.

Referring to FIGS. 32A and 32B, when mounting assembly 378 is assembled, third fasteners 394 are inserted through one or the other of the openings 212h, 214h of vibration dampening device 210 and into the threaded hole 372 defined in the associated spacer plate 366. Each vibration dampening device 210 is secured by two third fasteners 394 to outer housing 384. It should be noted that when the vibration dampening devices 210 are received between the truncated V-shaped walls 356d and 356e provided on outer housing 384 and are secured in place by third fasteners 394, third housing 240 of each vibration dampening device 210 is positioned above the associated region 368 that is free of spacer plates 366.

Outer housing 384 with engaged vibration dampening devices 210 is placed over inner housing 382. Each second fastener 390 is inserted through one of the apertures 382e in the bottom wall of inner housing 382 and into the aligned opening 240h defined in third housing 240 of the associated vibration dampening device 210. This may be done before or after foam layer 380, if utilized, is adhered to the bottom wall of inner housing 382. Outer housing 384 is therefore isolated from inner housing 382 because outer housing 384 is engaged with the first and second housings 212, 214 of vibration dampening devices 210, inner housing 382 is engaged with third housing 240 of vibration dampening devices 210, and the third housing 240 is isolated from first and second housings 512, 514 by the isolator assemblies 516, 518.

When the mounting assembly 378 is assembled as described above, wires or cables (not shown) for providing power to article 388 extending outwardly from a hole 386a (FIG. 36) defined in wall 386. The wires or cables are passed through the aligned openings 380d, 382f, and 384f and extend outwardly beyond the front surface 384a, of outer housing 384. Second fasteners 392 are then inserted through the enlarged holes 384d in outer housing 384, through the holes 382d defined in inner housing 382, through holes 380c defined in foam layer 380, and then into the support surface 386. As discussed earlier herein, because of the difference in diameter between the holes 384d and 382d, only the inner housing 382 is secured to the wall 386. The outer housing 384 is isolated from the wall 386 by the vibration dampening devices 210 installed between inner housing 382 and outer housing 384.

The vibration sensitive article 388, i.e., the audio speaker, is engaged with the mounting assembly 378 in any suitable manner. Although not illustrated herein, the wiring or cables are suitably connected to the article 388. By way of example only posts 388a (FIG. 36) extending outwardly from article 388 may be inserted through the holes 384e (FIG. 32A) defined in outer housing 384. The posts 388a may threaded and may be secured to by a nut or other fastening or clamping device (not shown). In other instances, not shown, rivet nuts may be secured to or be integrally formed with the inner surface of outer housing 384 adjacent holes 384e and fasteners extending outwardly from article 388 may be threadedly engaged therewith.

When article 388 is mounted on wall 386 by mounting assembly 378, vibrations from article 388 or from wall 386 will be attenuated by mounting assembly 378. In particular, vibrations will be attenuated by the only points of contact between the inner and outer housings 382, 384, namely, by the isolator assemblies 116, 118. As a result, the quality of the sound from artcle 388 will be greatly enhanced by the use of the mounting assembly 378.

Figure 43:
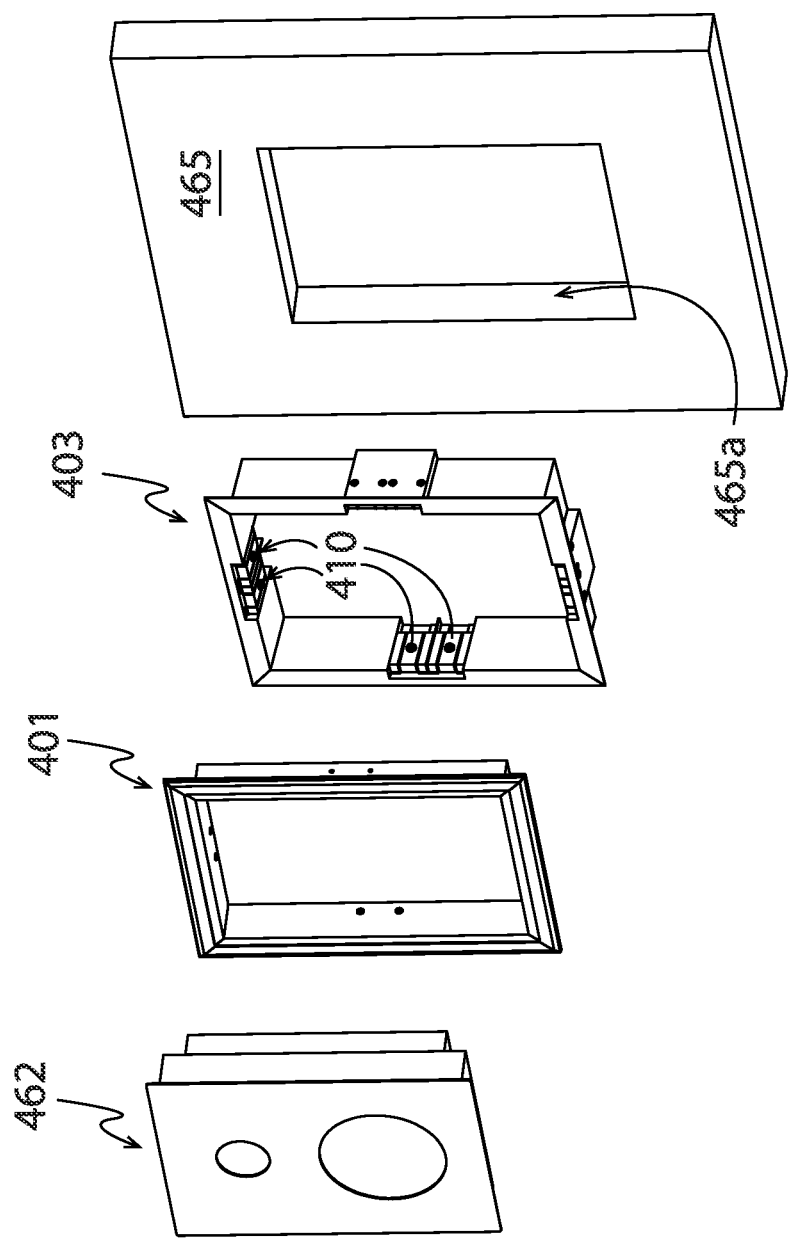
FIG. 43 is an exploded front perspective view of an audio speaker and the in-wall mounting assembly illustrated in FIG. 38.
Figure 44:
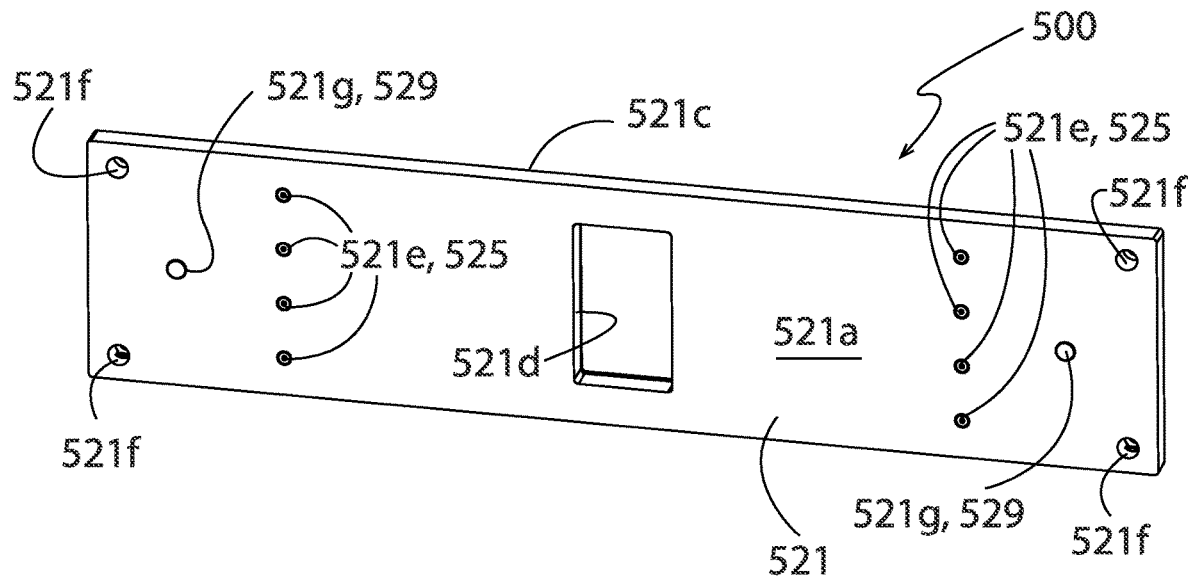
FIG. 44 is a front perspective view of an alternative mounting assembly which includes vibration dampening devices in accordance with the present disclosure.
Figure 45:
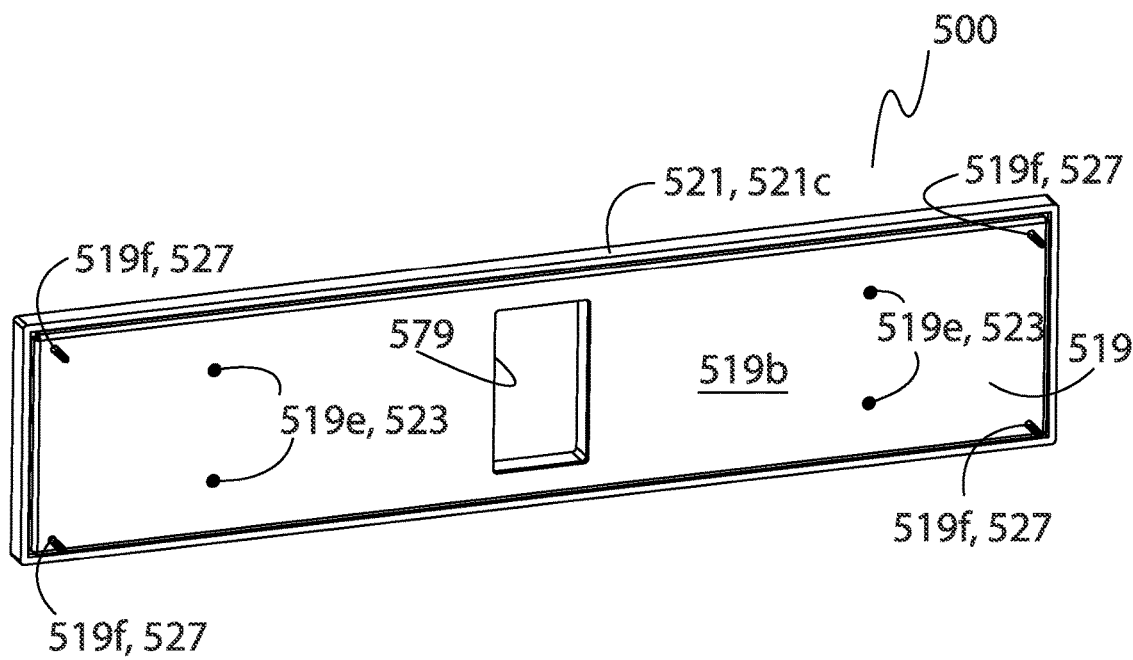
FIG. 45 is a rear perspective view of the alternative mounting assembly of FIG. 44.

Another exemplary application where the vibration dampening devices or vibration dampening units disclosed herein may be utilized is illustrated in FIGS. 38 through 43. These figures illustrate an "in-wall" speaker mounting assembly, generally indicated at 400. Mounting assembly 400 is configured to enable a speaker 462 (FIG. 43) be securely mounted in a support surface such as a wall 465. A region of a wall 465 is illustrated in FIG. 43 and the figure shows a hole 465a that has been cut into the wall 465 in order to receive mounting assembly 400. The mounting assembly 400 includes an inner frame member 401, an outer frame member 403, and a plurality of vibration dampening devices 410 in accordance with the present disclosure. In this particular application the vibration dampening devices 410 are utilized in pairs. When mounting assembly 400 is engaged into the hole 465a defined in wall 465, the outer frame member 403 and inner frame member 401 are engaged with one another and are inserted into the hole 465a and are secured in place as will be described later herein. A vibration sensitive component such as speaker 462 is engaged with mounting assembly 400 and is thereby securely mounted within wall 465.

Figure 39:
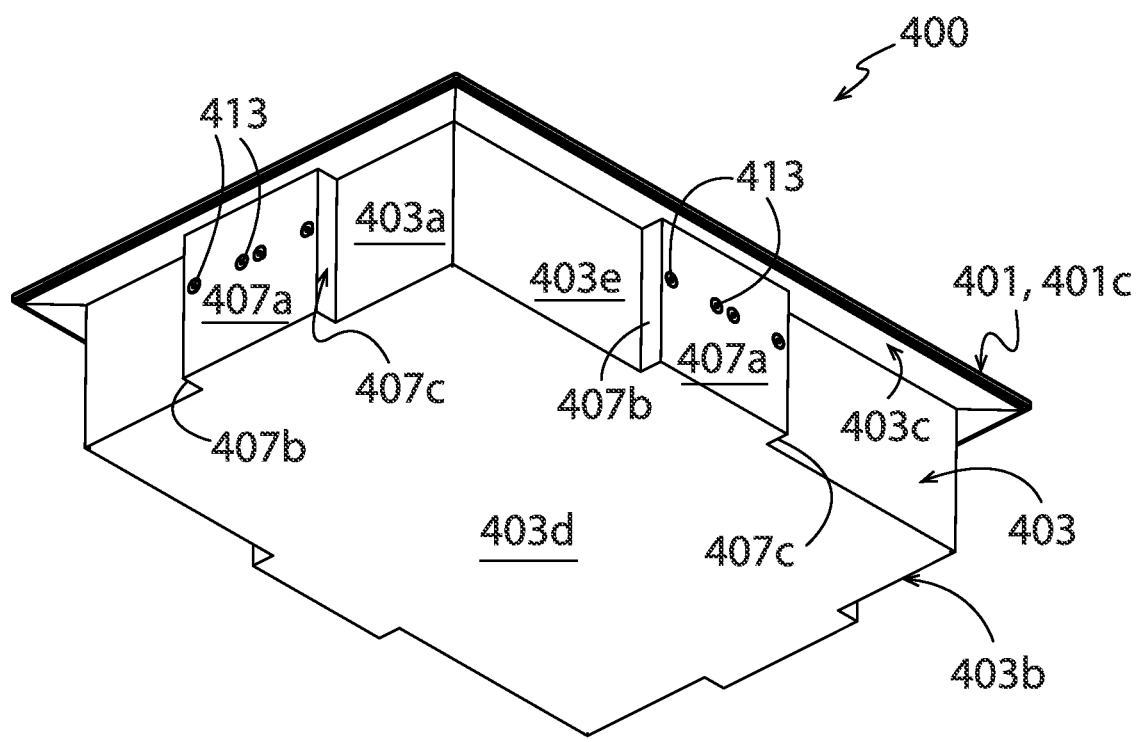
FIG. 39 is a bottom, front, right side perspective view of the in-wall mounting assembly of FIG. 38.
Figure 40:
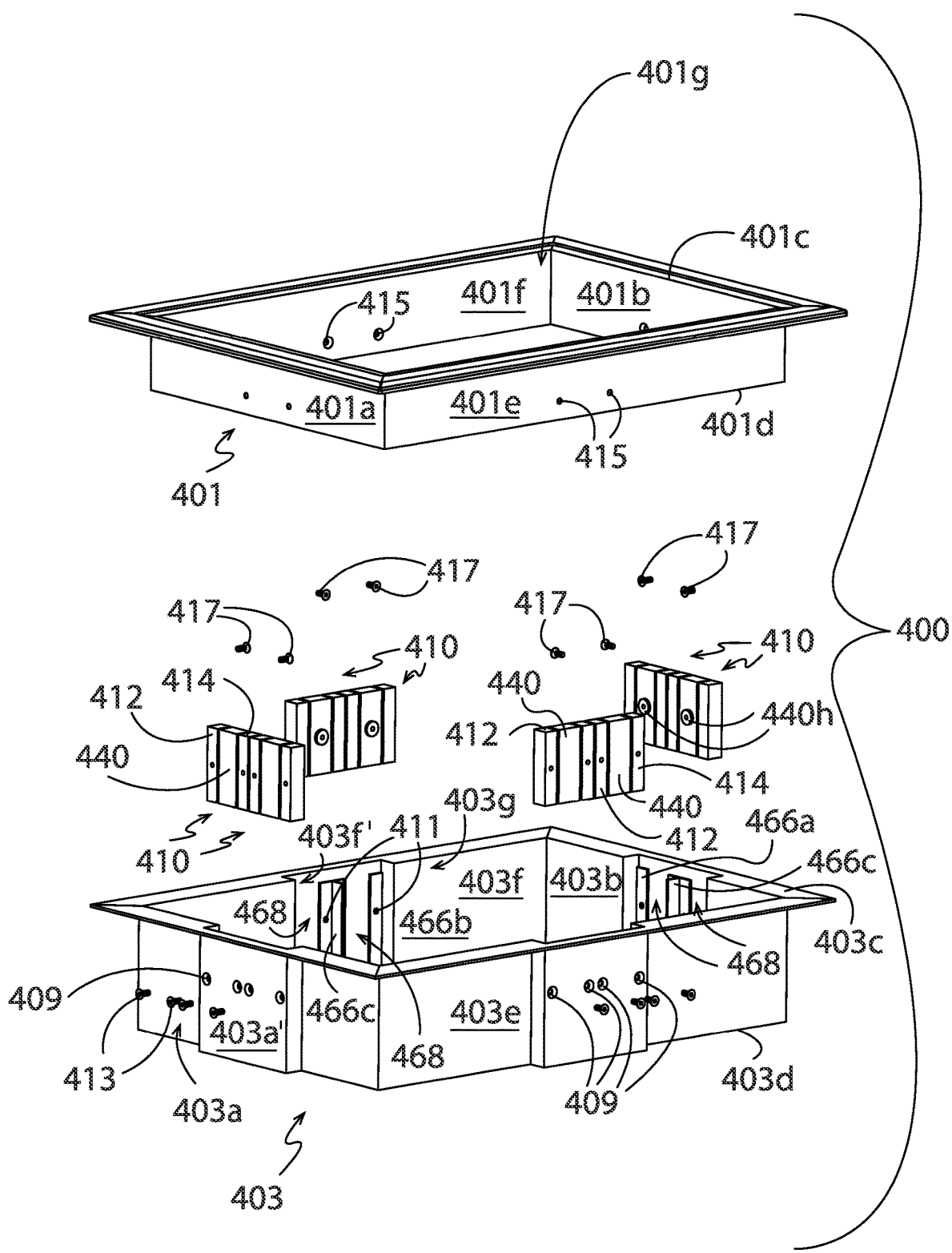
FIG. 40 is an exploded top, front, right side perspective view of the in-wall mounting assembly of FIG. 38.
Figure 41:
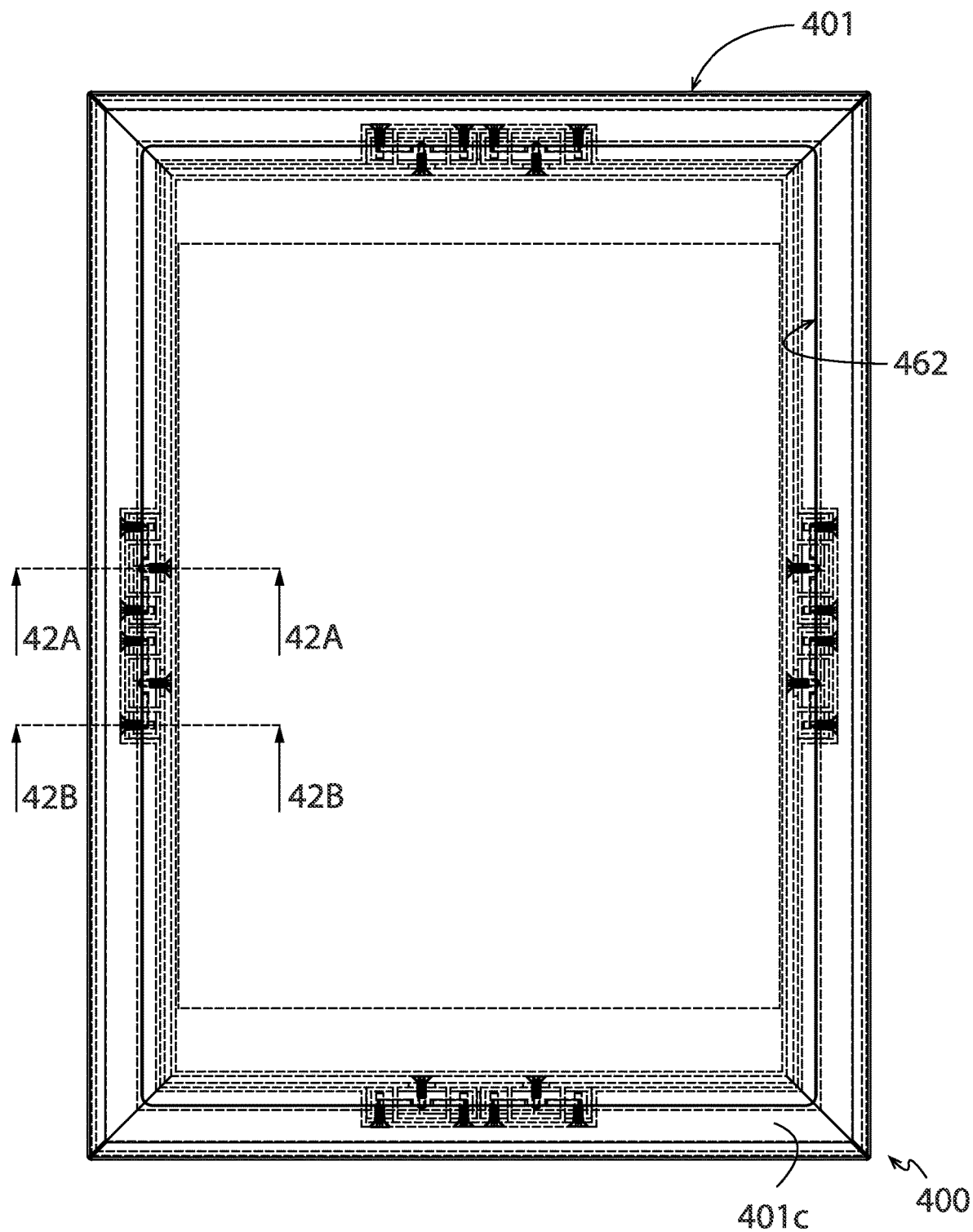
FIG. 41 is a top plan view of the in-wall mounting assembly in an assembled condition.
Figure 42A:
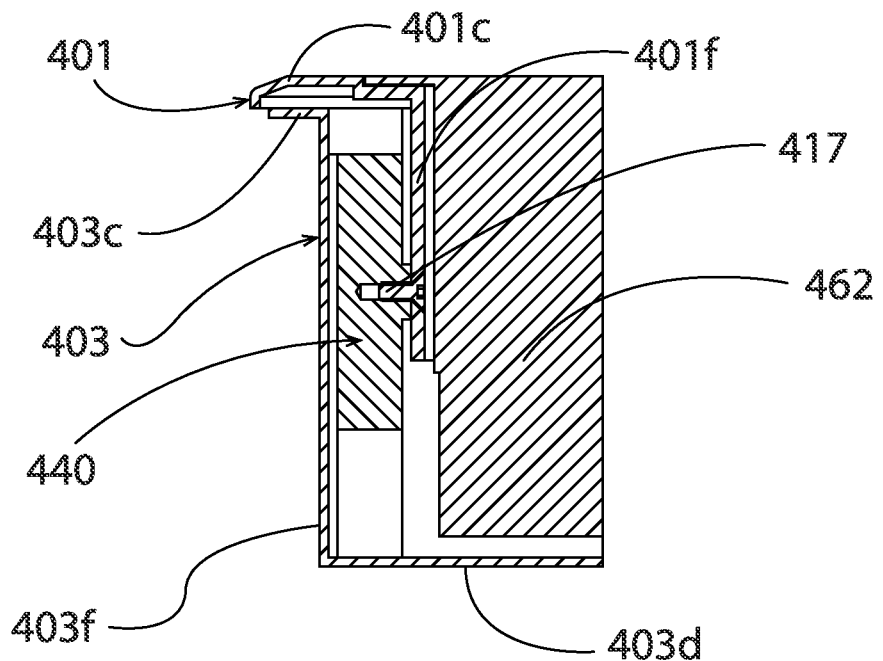
FIG. 42A is a cross-section of the vibration dampening devices interposed between an interior frame and an exterior frame of the in-wall mounting assembly taken along line 42A-42A of FIG. 41.
Figure 42B:
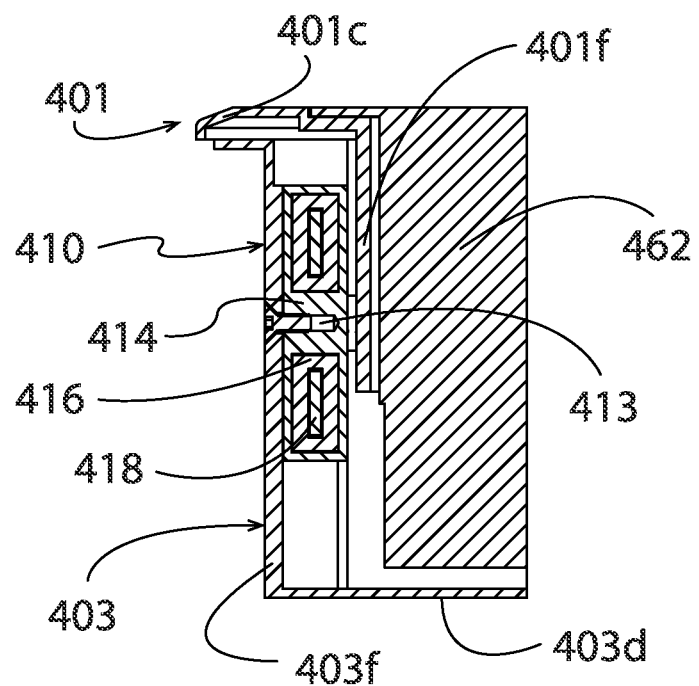
FIG. 42B is a cross-section of the vibration dampening devices interposed between the interior frame and the exterior frame of the in-wall mounting assembly taken along line 42B-42B of FIG. 41.

Referring to FIG. 40, outer frame member 403 is illustrated essentially as a box-like structure that has a front wall 403a, a rear wall 403b, a top wall 403c, a bottom wall 403d (FIG. 39), a first side wall 403e, and a second side wall 403f. Front, rear, top, bottom, first side, and second side walls 403athrough 403fbound and define an interior cavity 403g. It will be understood that in other instances, outer frame member 403 may be circular, hexagonal, triangular, irregular, or any other desired shape. The box-like structure should be understood to be exemplary only. As indicated previously herein, outer frame member 403 is configured to be mounted within wall 465 (or any other supporting structure). Hole 465acut into wall 465 is sized so that the outer perimeter of the outer frame member 403 fits in hole 465aand the top wall 403cof outer frame 403 rests upon an exterior surface of wall 465 that bounds hole 465a.

Each of front wall 403a, rear wall 403b, first side wall 403e, and second side wall 403fdefines a recessed region therein. The recess is relative to an interior surface of the respective all that bounds and defines the interior cavity 403g. The recess projects for a distance outwardly beyond an exterior surface of the rest of the associated wall. For example, front wall 403aincludes a recessed region relative to the inner surface of the front wall 403aand this recessed region forms a projection 403a' that extends outwardly beyond the outer surface of the rest of front wall 403a. FIG. 40 also shows a recessed region 403f defined in second wall 403f.

As shown in FIG. 39, in accordance with an aspect of the present disclosure, each recessed region is defined by a generally U-shaped wall that has a central wall 407a and two opposed end walls 407b, 407c. An interior surface of the central wall 407a is oriented generally parallel to a rest of the associated wall from which the recessed region projects. Three spacer plates are arranged in this recessed region, all being engaged with the central wall 407a thereof. A first spacer plate 466a is located proximate the first end wall 407b, a second spacer plate 466b is located proximate the second end wall 407c, and a T-shaped third spacer plate 466c is located intermediate the first and second spacer plates 466a, 466b. Regions of the central wall 407a between first spacer plate 466a and third spacer plate 466c and between third spacer plate 466c and second spacer plate 466b are free of any spacers and are indicated by the reference character 468.

FIG. 40 shows that four holes 409 are defined in each recessed region with the holes 409 extending between an interior and exterior surface of the associated wall. The holes 409 are aligned with complementary holes 411 defined in each of the spacer plates 466a, 466b, and 466c. The purpose of holes 409, 411 will be described later herein.

A first vibration dampening device 410 is received between the third spacer plate 466c and the first end wall 407b. A second vibration dampening device is received between the third spacer plate 466c and the second end wall 407c. Each of the first and second vibration dampening devices 410 is substantially identical in structure and function to the vibration dampening devices 210 except for one feature. That one feature is that the first housing 412 and the second housing 414 of the vibration dampening device 410 are rectangular cuboids in configuration instead of having one side being shaped as a truncated V-shaped surface.

Two vibration dampening devices 410 are inserted into the recessed region 403f defined in the second side wall 403f; within each vibration dampening device 410 being located on opposite sides of the T-shaped third spacer 466c. Similarly, two vibration dampening devices 410 are inserted into the recessed region 403a' of front wall 403, and into appropriate locations within the recessed regions of rear wall 403band first side wall 403e. Fasteners 413 are inserted into the holes 409 in the central wall 407a and into the aligned holes 411 defined in the associated spacer plates 466a, 466b, 466c. The fasteners 413 are further received into holes defined in the one of the first housing 412 or second housing 414 located proximate the spacers 466a, 466b and 466c. A middle leg of the T-shaped third spacer 466c is located between the first housing 412 of one of the two vibration dampening devices 410 and the second housing 414 of the other of the two vibration dampening devices 410. When vibration dampening devices 410 are received within the recessed regions of outer frame 401, the vibration dampening devices 410 are retained therein under tension and there is no twisting moment in the component. In particular the vertically extending central rib provided on third spacer 466c and the end walls that define the recessed region keep the vibration dampening devices 410 clamped therebetween and thereby keep the devices 410 from twisting within the recessed region.

Because of the configuration of the vibration dampening devices 410, the third housing 440 thereof is not in direct contact with any part of the outer frame member 403 other than through the first and second housings 412, 414 via the isolator assemblies. The isolator assemblies are substantially identical to any of the isolator assemblies 16, 18; 116, 118; and 216, 218 disclosed herein.

The mounting assembly, as discussed earlier herein, includes an inner frame member 401 that is complementary to at least a portion of outer frame member 403 and is configured to nest therewith. The inner frame member 401 includes a front wall 401a, a rear wall 401b, a top wall 401c, a bottom wall 401d, a first side wall 401e, and a second side wall 401f. Front, rear, first side, and second side wall 401a, 401b, 401e, 401fbound and define a central cavity 401g that extends from an opening bounded and defined by top wall 401c through to an opening bounded and defined by bottom wall 401d.

The dimensions of inner frame member 401 are such that the front, rear, first side, and second side walls 401a, 401b, 401e, and 401f are able to nest proximate the interior surfaces of the front, rear, first side, and second side walls 403a, 403b, 403e, and 403fof the outer frame member 403. Top wall 401c is configured to rest upon and extend radially outwardly beyond top wall 403c.

In accordance with an aspect of the present disclosure, the front, rear, first side, and second side walls 401a, 401b, 401e, and 401f of inner frame member 401 are shorter in height than are front, rear, first side, and second side 403a, 403b, 403e, and 403fof outer frame member 403. The height is the distance between top wall 403cand bottom wall 403d (or top wall 401c and bottom wall 401d).

A pair of apertures 415 is defined in each of the front, rear, first side, and second side walls 401a, 401b, 401e, and 401f. Apertures 415 in each of these walls are laterally spaced from one another and are configured to align with one of the openings 440h defined in each vibration dampening device 410. In particular, the apertures 415 are positioned and configured to be brought into alignment with the openings 440h on the third housing 440 of one of the vibration dampening devices 410. When vibration dampening devices 410 are installed within the various recessed regions of the outer frame member 403, the inner frame member 401 is brought into nesting engagement with the outer frame member 403. Openings 415 in inner frame member 401 are brought into alignment with openings 440 defined in the associated third housings 440 of the vibration dampening devices 410. Fasteners 417 are then inserted through the aligned openings 415, 440h to secure the inner frame member 401 into the third housings of the vibration dampening devices 410.

Referring to FIG. 43, during use, outer frame member 403 is inserted into hole 465a formed in wall 465 (or other support structure) and is secured in place by any suitable means, such as wall screws or tabs or any other fastener device(not shown). Top wall 403c of outer frame member 403 forms a lip which circumscribes the hole 465a in the wall 465 and this lip lays in abutting contact with the outer surface of the wall 465. Inner frame member 401 is inserted into interior cavity 403g of outer frame member 403 and is secured to third housings 440 of the vibration dampening devices 410 as described above. The only part of the mounting assembly 400 which will be visible to an observer, is the top wall 401c of the inner frame member 401. The top wall 401c may be fabricated to be aesthetically pleasing and may resemble a picture frame.

It will be understood that in another embodiment (not shown), instead of the outer frame member being fastened into a drywall opening and being fastened with a lip to keep it in place, the outer frame member may alternatively be installed in the wall framing and fixed in place before the drywall is installed. This could occur, for example, if an audio system is being installed with new construction or in a renovation As illustrated in FIG. 43, a vibration sensitive component, such as the audio speaker 462, is secured within wall 465 by mounting assembly 400. The configuration of the audio speaker 462 fabricated by a speaker manufacturer will dictate the specific configuration of the mounting assembly 400 needed to install that speaker 462 in wall 465. Additionally, the manner of engaging the mounting assembly 400 in the wall 465 and the manner of securing the speaker 462 to the mounting assembly 400 will be dictated by the speaker manufacturer's specifications. Audio speaker 462 may be positioned within the interior cavity 401g of inner frame member 401. When audio speaker 462 is engaged with mounting assembly 400 any wiring for the speaker 462 is introduced into mounting assembly through the opening bounded and defined by top wall 401c of inner frame member 401. The audio speaker 462 is secured to the inner frame member in any suitable manner. It will be understood that mounting assembly 400 is configured to be engaged with the audio speaker 462 using the speaker manufacturer's specific attachment members, clamping members, tabs, screws, or other specific fasteners provided for this purpose. It will further be understood that the specific configuration of mounting assembly 400 and the number, type, and placement of fasteners for securing audio speaker 462 thereto is exemplary only and should not be considered as narrowing the possible configuration for mounting an audio speaker in a wall.

In accordance with the present disclosure, the inner frame member 401 is only engaged with the third housings 440 of the vibration dampening devices 410. Consequently, any vibrations to or from the vibration sensitive component will be attenuated by the isolator assemblies provided in the vibration dampening devices 410. It should be understood that the number of recessed regions, such as region 403a' or 403f' that are provided in any of the front, rear, first side, and second side walls of the outer frame member 403 may be one, two, or more. The number selected may be based on the weight of the vibration sensitive component that is to be secured within the mounting assembly 400 and in accordance with any specific manufacturer's specifications. Additionally, the number of vibration sensitive assemblies 410 provided in each recessed region may be one, two, three, or more. The number selected may, again, be based on the weight of the vibration sensitive component to be mounted into mounting assembly 400. The vibration dampening devices 410 are mounted in series within the recessed regions, i.e., laterally adjacent one another instead of vertically one above the other. It will be understood that additional vibration dampening devices 410 may be vertically mounted within the various recessed regions. The mounting assembly 400 may be configured differently to accommodate different vibration sensitive components of different shapes, sizes, and weights by varying the components described above.

Referring now to FIGS. 44 through 52, there is illustrated a differently shaped mounting assembly 500. Mounting assembly 500 may be used as an "on-wall" mounting assembly instead of an "in-wall" mounting assembly. As the name implies, the "on-wall" mounting assembly 500 is mounted on an exterior surface of a wall or other support structure, and is useful for mounting a vibration-sensitive component on that wall.

Figure 52:
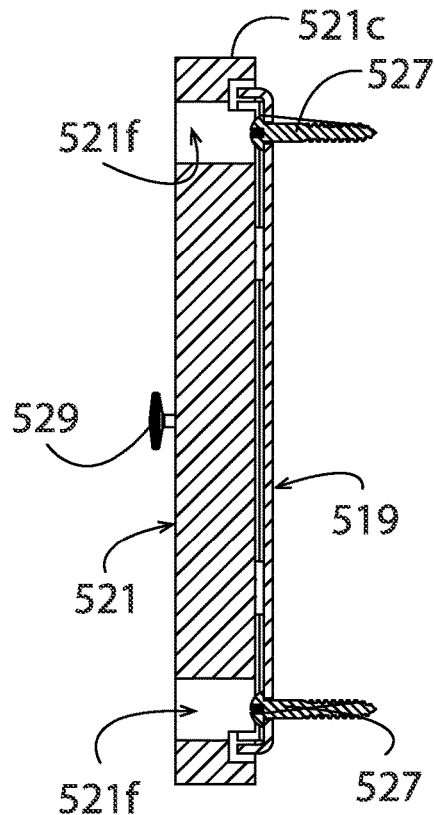
FIG. 52 is a vertical cross-section of the alternative mounting assembly taken along line 52-52 of FIG. 50.

Mounting assembly 500 uses many of the same principles as mounting assembly 378 (FIG. 32A), except for a few features that will be mentioned hereafter. As best seen in FIG. 52, mounting assembly 500 includes a mounting plate 519 and an outer housing 521. Mounting plate is a generally rectangular plate that has a front surface 519a, a rear surface 519b (FIG. 45) and a peripheral wall 519c that extends outwardly from a perimeter of the front surface 519a. An aperture 519d is formed in the mounting plate 519 and extends between the front and rear surfaces 519a, 519b thereof. While aperture 519d is illustrated as being generally rectangular in shape and is centrally located on mounting plate 519, it will be understood that aperture 519d may be of any shape or location on mounting plate.

Mounting plate 519 further includes a plurality of holes 519e and 519f, therein. Each hole 519e, 519f extends between front and rear surfaces 519a, 519b. Two holes 519e are located laterally midway between aperture 519d and each opposing side of the peripheral wall 519c. Each hole 519f is located proximate one of the corners of mounting plate 519. The purposes of these holes 519f will be described later herein.

Figure 48:
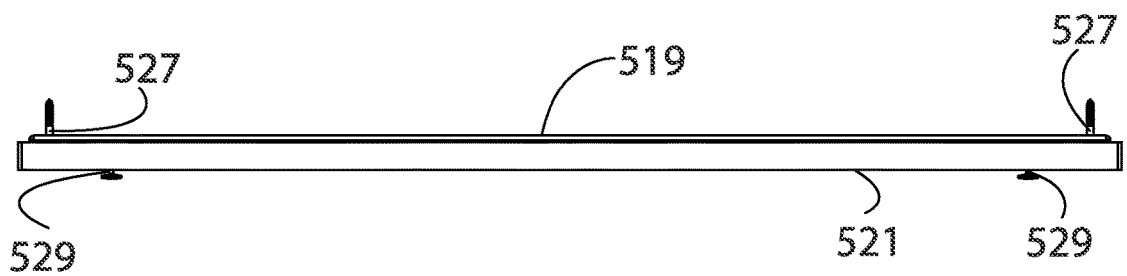
FIG. 48 is a top plan view of the alternative mounting assembly of FIG. 44.
Figure 49:
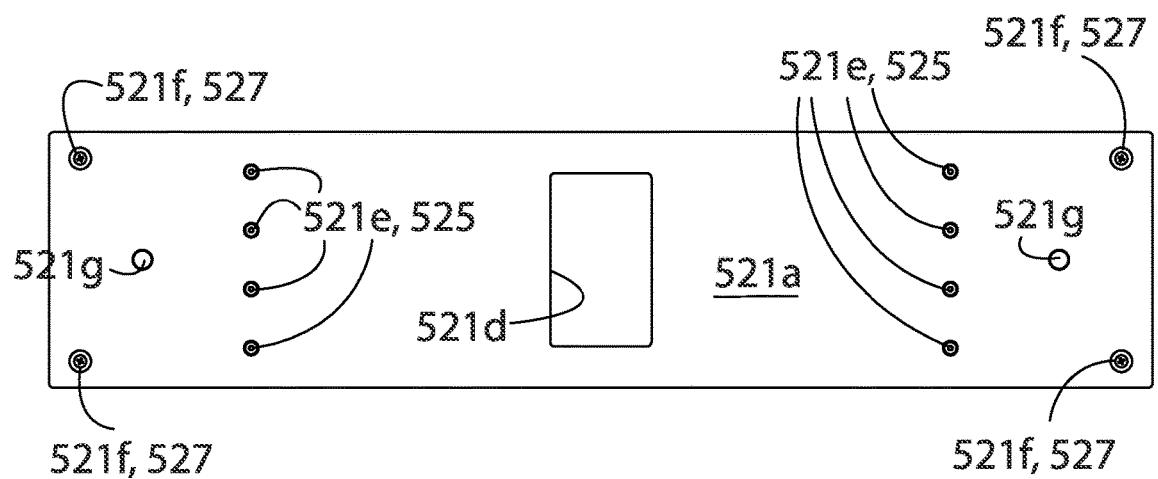
FIG. 49 is a rear elevation view of the alternative mounting assembly of FIG. 44.
Figure 50:
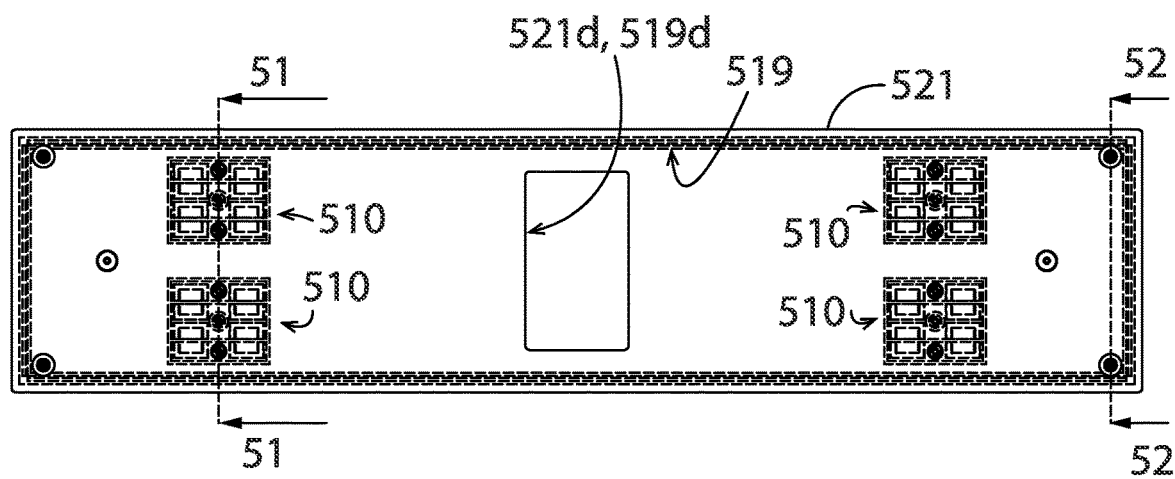
FIG. 50 is a front elevation view of the alternative mounting assembly of FIG. 44 with the front wall of the outer housing removed.
Figure 51:
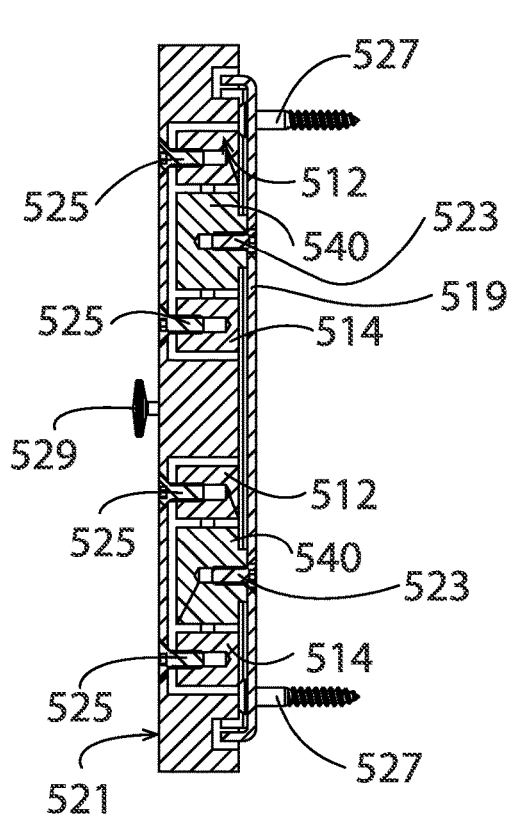
FIG. 51 is a vertical cross-section of the alternative mounting assembly taken along line 51-51 of FIG. 50.

Outer housing 521 is similar in configuration to mounting plate 519 and is generally complementary in shape and size. In particular, outer housing 521 is configured to be received over and substantially completely cover front surface 519a and peripheral wall 519c of mounting plate 519. This is best seen in FIG. 48.

Outer housing 521 includes a front wall having a front surface 521 a and a rear surface 521 b. A peripheral wall 521c extends outwardly away from rear surface 521 b and bounds a perimeter of rear surface 521 b. An aperture 521d is formed in the outer housing 521 and extends between the front and rear surfaces 521 a, 521 b thereof. The aperture 521d, as illustrated, is generally rectangular and is centrally located on outer housing 521 and is configured to align with aperture 519d in mounting plate 519 when outer housing 521 is engaged with mounting plate 519. While aperture 521d is shown as being generally rectangular, it will be understood that the aperture 521d may be of any desired shape and placement. When outer housing 521 and mounting plate 519 are engaged with one another, the apertures 519*d* and 521*d* may be aligned. Apertures 519*d*, 521*d* may be provided to enable wiring or cables from the vibration sensitive component engaged with mounting assembly 500 to be passed through the aligned apertures 519*d*, 521*d* and into a hole in the support surface upon which the mounting assembly 500 is engaged. Those wires and cables may then be connected to a remote power source.

Outer housing 521 defines first holes 521*e*, second holes 521*f*, and third holes 521*g* therein. Each of the holes 521*e*, 521*f*, and 521*g* extends between front surface 521*a* and rear surface 521*b* of the front wall of outer housing 521. The first holes 521*e* are located generally laterally midway between central aperture 521*d* and the peripheral edge 521*c*. First holes 521*e* may be vertically aligned with first holes 519*e* on mounting plate 519 but are not horizontally aligned in such a way that a fastener can pass through aligned first holes 521*e* and first holes 519*e*. Instead, first holes 521*e* are horizontally offset from first holes 519*e*.

Second holes 521*f* are located proximate the four corners of the front wall of outer housing 521. In the exemplary embodiment illustrated in the attached figures the third holes 521*g* are located between first holes 521*e* and second holes 521*f*. The specific number, shape, and/or placement of the various holes and openings in outer housing 521 is selected based upon the configuration of the audio equipment that is to be engaged therewith.

Figure 46:
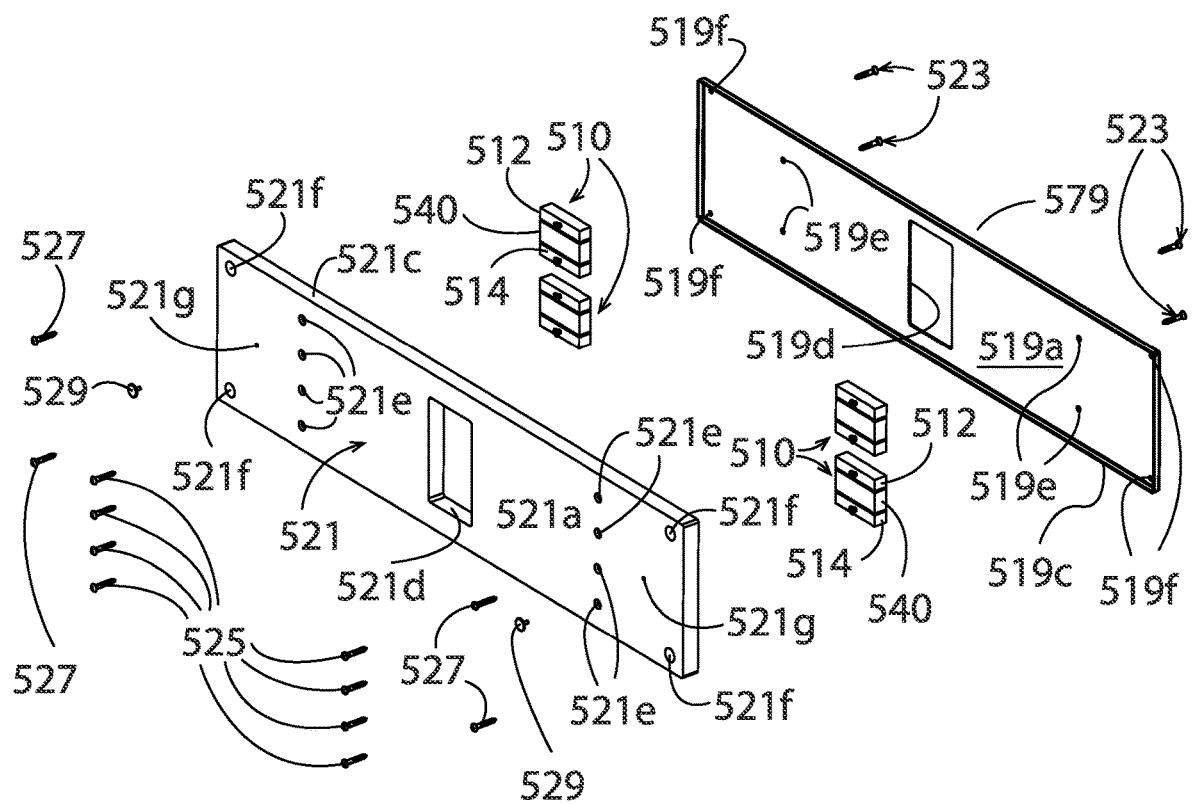
FIG. 46 is an exploded top, front right side perspective view of the alternative mounting assembly of FIG. 44.
Figure 47:
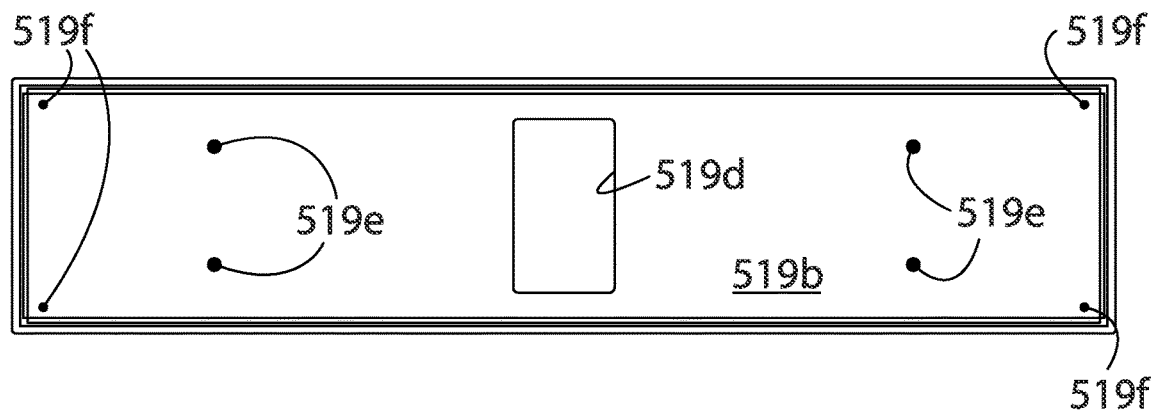
FIG. 47 is a front elevation of the alternative mounting assembly of FIG. 44.

As is evident from FIG. 46, a plurality of vibration dampening devices 510 are provided in mounting assembly 500. It will be understood that the vibration dampening devices 510 are sized according to the size of the vibration sensitive component that will be suspended from the mounting assembly 500. In particular, the possible cantilever action of the vibration sensitive component has to be taken into consideration when selecting the number and size of vibration dampening devices 510 for use in mounting assembly 500. The vibration dampening devices 510 are substantially similar in structure and function to all of the other vibration dampening devices described herein. However, unlike some of the previous embodiments of the vibration dampening devices described herein, vibration dampening devices 510 do not need any spacers to be used in conjunction therewith. (The vibration dampening devices 210 and 410, for example, are used in conjunction with spacer plates or spacers.) The reason that spacers are not required is because of the special configuration and relationship between the first housing 512, second housing 514, and third housing 540 of the vibration dampening devices 510.

Referring to FIGS. 52 to 55, vibration dampening devices 510 are illustrated in greater detail and will be discussed hereafter. Similar to vibration dampening devices 210 and 410, vibration dampening devices 510 comprise a first housing 512, a second housing 514, isolating assemblies comprises of isolators 516, and isolator inserts 518, and a third housing 540. First housing 512 is substantially identical in basic structure and function to any of the first housings 12, 112, 212, and 412 described herein. An inner surface (not numbered) of first housing 512 defines a pair of apertures 512*g* therein that are provided to each receive a complementary resilient isolator 516 therein. (It will be understood that, alternatively, only a single aperture 512*g* may be defined in the inner surface of first housing 512 or more than two apertures 512*g* may be defined in the inner surface.)

The isolators 516 are substantially identical in basic structure and function to any of the isolators 16, 116, 216, 416 described herein. An inner surface (not numbered) of each isolator 516 defines an aperture 516*g* therein that is provided to receive one end of an isolator insert 518 therein. The number of isolators 516 provided in vibration dampening device 510 is complementary to the number of apertures 512*g* provided in first housing 512. Isolator inserts 518 are substantially identical in basic structure and function to any of the isolator inserts 18, 118, 218, 418 described herein.

Second housing 514 is substantially identical in basic structure and function to any of the second housings 14, 114, 214, 414 described herein. An inner surface of second housing 512 defines a pair of apertures 514*g* (FIG. 54) therein that are provided to each receive a complementary resilient isolator 516 therein. (It will be understood that, alternatively, only a single aperture 514*g* may be defined in the inner surface of second housing 514 or more than two apertures 514*g* may be defined in the inner surface.)

Figure 55:
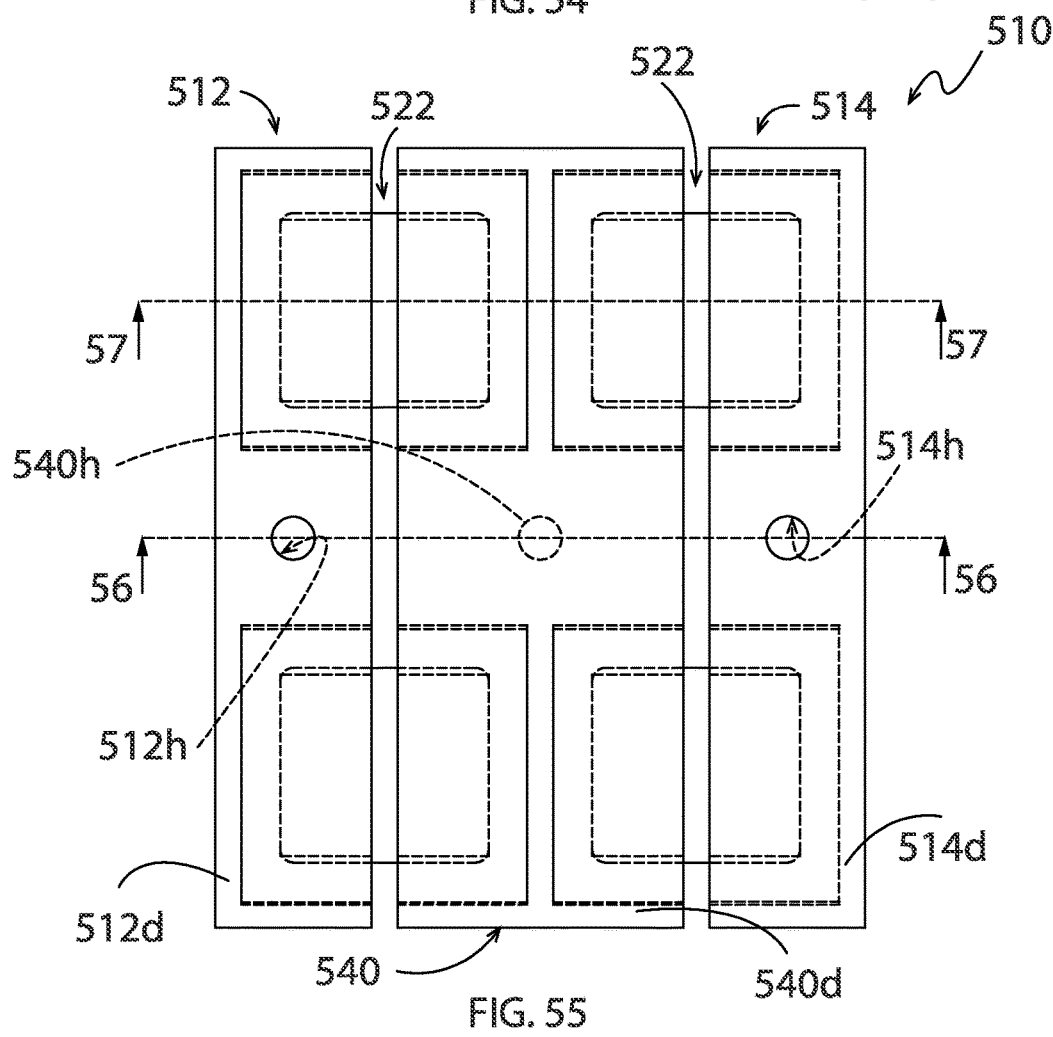
FIG. 55 is a top plan view of the vibration dampening device of FIG. 54.

Third housing 540 is substantially identical in basic structure and function to any third housing 140, 240, or 440 described previously herein. Each of the inner and outer surfaces (not numbered) of third housing 540 that will be located opposite the inner surfaces of first housing 512 and second housing 514, respectively, defines one or more apertures 540*g* therein. The number of apertures 540*g* is complementary to the number of apertures 512*g* and 514*g* in the first and second housings 512, 514, respectively. Complementary isolators 516 (with associated apertures 516*g* defined therein) are received in each aperture 540*g* of third housing 540. The other end of each isolator insert 518 is received in the recess 516*g* defined in one of the isolators 516 engaged with the third housing 540. Isolator inserts 518 are long enough that when first, second, and third housings 512, 514, 540 are engaged with one another via the isolator assemblies 516, 518, a gap 522 is defined between adjacent housings. The gaps 522 are shown in FIG. 55, for example. The result of this is that third housing 540 is effectively vibrationally isolated from first housing 512 and second housing 514.

Figure 53:
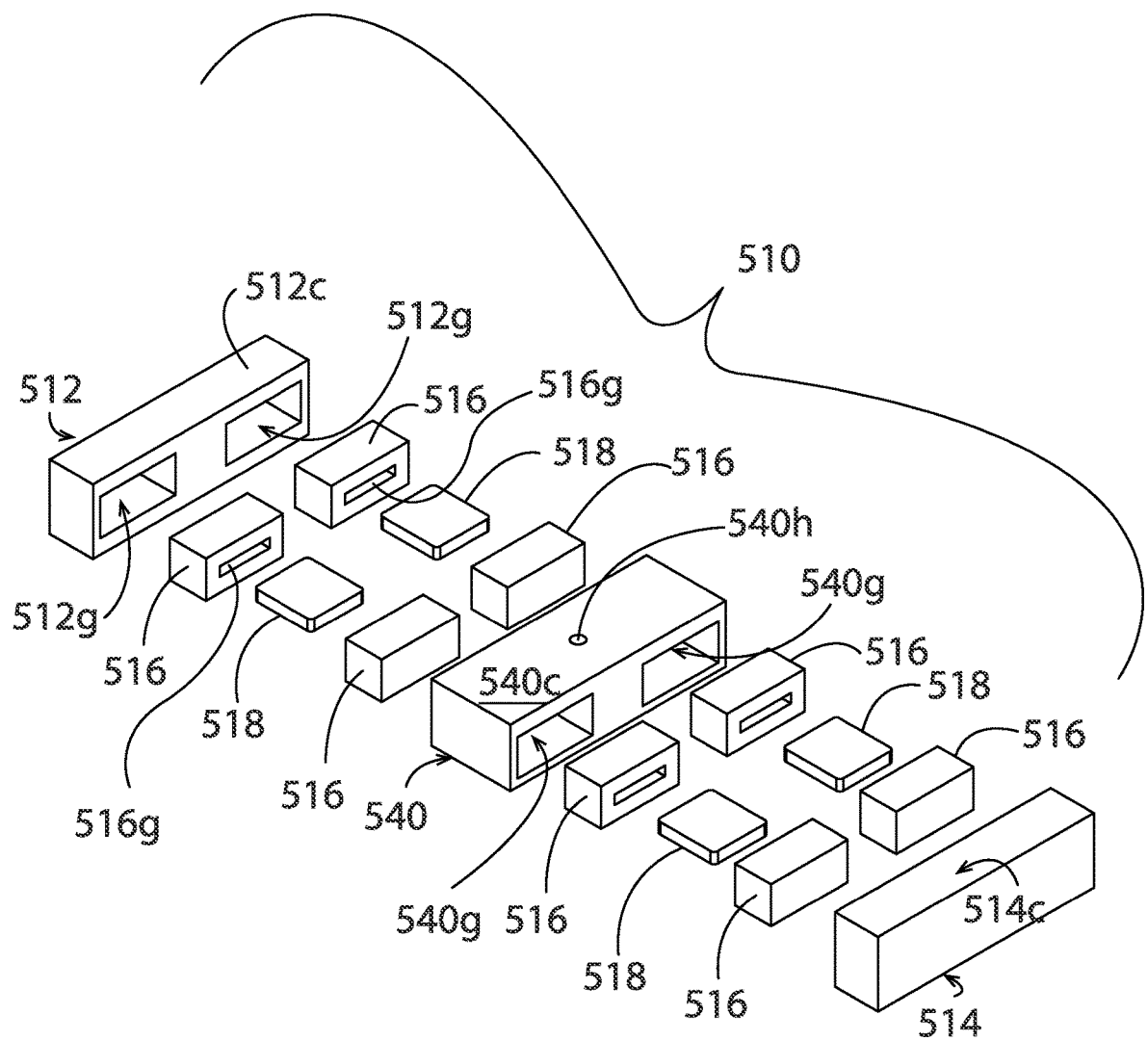
FIG. 53 is an exploded top, front, right side perspective view of an exemplary vibration dampening device utilized in the alternative mounting assembly of FIG. 44.
Figure 54:
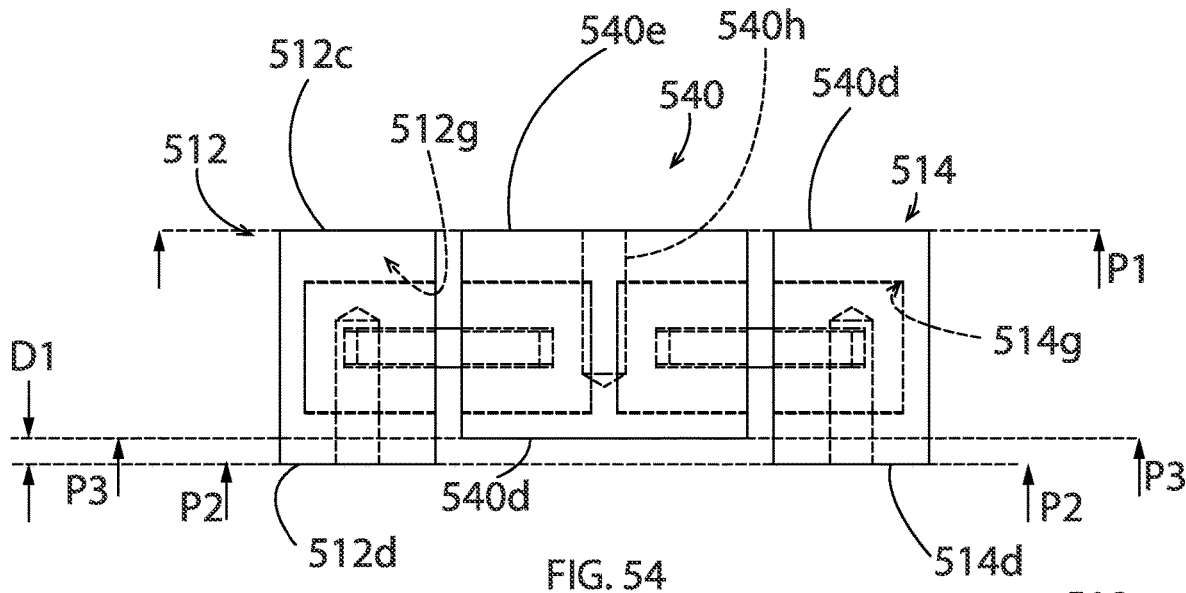
FIG. 54 is a front elevation view of the vibration dampening device of FIG. 53 in an assembled condition.

As best seen in FIG. 55, the first housing 512 and the second housing 514 each define a threaded aperture 512*h*, 514*h*, respectively, therein. The first housing 512 and second housing 514 are arranged so that the threaded apertures 512*h*, 514*h* are defined in the same one of the top surface or the bottom surface of the associated housing 512, 514. Third housing 540 also defined a threaded aperture 540*h* (FIG. 53). The threaded aperture 540*h* provided on third housing 540, is however, provided on the other of the top surface and the bottom surface of the housing 540 relative to first and second housings 512, 514. This is shown in FIG. 53 where the threaded aperture 540*h* is provided on the top surface of the third housing but the top surfaces of the first housing 512 and second housing 514 are free of any threaded apertures 512*h*, 514*h*. (Instead, the threaded apertures 512*h* and 514*h* are provided on the bottom surface of the associated housing 512, 514.)

In accordance with an aspect of the present disclosure, the top surface 512*c* of the first housing 512, the top surface 514*c* of second housing 514, and the top surface 540*c* of third housing 516 are all aligned with one another along a same first plane "P1". This can be seen in FIG. 54. The bottom surface 512*d* of first housing 512 and the bottom surface 514*d* of second housing 514 are aligned with one another along a same second plane "P2". However, the bottom surface 540*d* of third housing 512 is not in the same plane as the bottom surfaces 512*d*, 514*d*. Instead, bottom surface 540 is aligned along a different third plane "P3". Third plane "P3" is located between first plane "P1" and second plane "P2". There is therefore a height difference "D1" between third plane "P3" and second plane "P2".

When mounting assembly 510 is assembled, each vibration dampening device 510 is engaged with mounting plate 519 by inserting a first fastener 523 through each aperture 519e and into the opening 540h defined in third housing 540 of one of the vibration dampening devices 510. Outer housing 521 is placed over mounting plate 519 and a second fastener 525 is inserted through each hole 521e and into the associated opening 512h or 514h of the first housing 512 or second housing 514 with which that particular hole 521e is aligned. The height difference "D1" between the bottom surface 540d of third housing 540 and the bottom surfaces 512d and 514d of the first and third housings 512, 514 helps to ensure that third housing 540 does not and cannot contact the outer housing 521. The only contact between first housing 512, second housing 514 and third housing 540 is via the isolator assemblies 516, 518.

Third fasteners 527 are inserted through the enlarged holes 521 f defined in outer housing 521, are inserted through the smaller holes 519f defined in mounting plate 519, and subsequently into a wall or other support surface (not shown). Outer housing 521 is not secured to mounting plate 519 by third fasteners 527. The only contact between outer housing 521 and mounting plate 519 is via the vibration dampening devices 510.

Fourth fasteners 529 are used to secure a vibration sensitive component (not shown) to outer housing 521. In particular, fourth fasteners 529 extend outwardly through the holes 521 g defined in outer housing 521. A vibration sensitive component, such as an audio speaker may then be suspended from the mounting assembly 500 by way of the fourth fasteners 529. Any vibrations from the vibration sensitive component or from the support surface (engaged by mounting plate 519) will be attenuated by the vibration dampening devices 510 located between outer housing 521 and mounting plate 519.

It will be understood that the dimensions of the various parts of the vibration dampening devices disclosed herein and the durometer of the resilient materials used for the isolators may be modified based on weight and the anticipated forces in any particular system into which the vibration dampening devices are contemplated to be incorporated. The dimensions and the durometer of the resilient materials will be selected to attenuate vibrations moving to and from the second member (i.e., the isolated component engaged with the vibration-sensitive component and the first member (i.e., the base component) and any supporting structure engaged by the first member, while maintaining stability and position.

It will further be understood that the configurations of the various embodiments of vibration dampening devices disclosed herein are exemplary only. The specific configuration of the vibration dampening device is selected based on the application in which the vibration dampening device is to be utilized. In the embodiments disclosed herein the vibration dampening devices have include two or three housings that are engaged with one another via isolator assemblies. It should be understood however, that more than three housings may be incorporated into a vibration dampening device in accordance with the present disclosure. For example, a generally square housing may have four other housings that are located proximate the sides of the square housing and effectively circumscribe the square housing. Each of the four other housings may be operatively engaged with the square housing via isolator assemblies. In yet another example, a central housing may be circumscribed by a generally circularly-shaped ring housing that is connected to the central housing by a plurality of radially-oriented isolator assemblies. Any configuration and number of housings may be utilized to form a vibration dampening device in accordance with the present disclosure.

While the disclosed embodiments of vibration dampening device have been discussed and illustrated herein in relation to use of these devices in audio equipment or electronic equipment to dampen vibration, it will be understood that there are many other possible applications for these devices. The reader will understand that the principles of the vibration dampening device disclosed herein could be applied to automotive equipment, factory conveying systems, mixing systems, household equipment such as washing machines, etc. The dimensions of the various component parts of the disclosed vibration dampening devices, the materials utilized for the component parts and the durometer and strength of the components of the isolator assemblies will be selected based on the particular selected use. In some of these other applications, the vibration dampening devices could simply reduce noise produced by the equipment in which the vibration dampening devices are employed or reduce vibrations in the surface upon which such equipment rests or to which the equipment is secured.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately"

may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A vibration dampening device comprising:
   a first member comprising a first housing and a second housing; wherein the first housing is laterally spaced from the second housing and both the first housing and the second housing are adapted to rest upon or be operatively engaged with a support surface;
   a second member comprising a third housing which is interposed between the first housing and the second housing, wherein the third housing is adapted to be operatively engaged with a vibration-sensitive component;
   at least one isolator assembly comprising a first isolator assembly interposed between the first housing and the third housing, and a second isolator assembly interposed between the second housing and the third housing;
   wherein the first member and second member are decoupled from one another by the first isolator assembly and the second isolator assembly;
   wherein each isolator assembly comprises:
   a first isolator operatively engaged with one of the first housing and the second housing of the first member;
   a second isolator operatively engaged with the third housing of the second member; and
   an isolator insert extending between the first isolator and the second isolator.

2. The vibration dampening device according to claim 1, wherein the one of the first housing and the second housing of the first member defines a first recess into which the first isolator is received; and wherein the third housing of the second member defines a second recess into which the second isolator is received.

3. The vibration dampening device according to claim 2 wherein the isolator insert extends between the first isolator in the first recess and the second isolator in the second recess.

4. The vibration dampening device according to claim 2, wherein the first isolator defines an opening therein and a first end of the isolator insert is received in the opening; and wherein the second isolator defines an opening therein and a second end of the isolator insert is received in the opening defined in the second isolator.

5. The vibration dampening device according to claim 4, wherein the isolator insert is of a length measured between the first end and the second end; and wherein the length of the isolator insert is longer than a combined length of the opening in the first isolator and the opening in the second isolator.

6. The vibration dampening device according to claim 5, wherein a gap is defined between a first surface of the one of the first housing and the second housing and a first surface of the third housing, and the first recess is defined in the first surface of the one of the first housing and the second housing, and the second recess is defined in the first surface of the third housing.

7. The vibration dampening device according to claim 1, wherein the third housing of the second member includes a flange extending outwardly from an exterior surface thereof, and the flange is configured to abut the vibration-sensitive component, and the flange causes a space to be defined between the vibration-sensitive component and the exterior surface of the second member.

8. The vibration dampening device according to claim 7, further comprising a hole defined in the third housing of the second member, said hole being adapted to receive a fastener therein to secure the second member to the vibration-sensitive component.

9. The vibration dampening device according to claim 1, further comprising a first gap defined between the first housing and the third housing; and a second gap defined between the second housing and the third housing; wherein each of the first gap and the second gap is formed by the provision of the first isolator assembly and second isolator assembly, respectively.

10. The vibration dampening device according to claim 1, wherein the first housing is generally U-shaped and includes a base and a first leg and a second leg that extend outwardly from the base in a same direction, and wherein the third housing is received in an aperture defined between the first leg and the second leg.

11. The vibration dampening device according to claim 10, wherein a free end of each of the first leg and the second leg includes a profiled region, and wherein the second housing includes two opposing profiles that are complementary to the profiled region of the first leg and the second leg; and wherein the second housing snap-fittingly engages the first and second legs of the first housing.

12. In combination:
   a mounting assembly including a first region and a second region, wherein the first region is adapted to rest upon or be operatively engaged with a support surface; and wherein the second region is adapted to be operatively engaged with a vibration-sensitive component; and
   a vibration dampening device operatively engaged with the mounting assembly; wherein the vibration dampening device comprising:
   a first member comprising a first housing and a second housing; wherein the first housing is laterally spaced from the second housing and both the first housing and the second housing are adapted to rest upon or be operatively engaged with a support surface;

a second member comprising a third housing which is interposed between the first housing and the second housing, wherein the third housing is adapted to be operatively engaged with a vibration-sensitive component;

at least one isolator assembly comprising a first isolator assembly interposed between the first housing and the third housing, and a second isolator assembly interposed between the second housing and the third housing;

wherein the first member and second member are decoupled from one another by the first isolator assembly and the second isolator assembly;

wherein each isolator assembly comprises:

a first isolator operatively engaged with one of the first housing and the second housing of the first member;

a second isolator operatively engaged with the third housing of the second member; and an isolator insert extending between the first isolator and the second isolator.

13. The method according to claim 12 and, wherein the decoupling of the vibration-sensitive component from the support surface includes decoupling the first member and the second member from one another.

14. A method of dampening vibration in a vibration-sensitive component comprising:

providing a vibration dampening device that includes a first member comprising a first housing laterally spaced from a second housing, and a second member comprising a third housing interposed between the first housing and the second housing interposing a first isolator assembly between the first housing and the third housing, and interposing a second isolator assembly between the second housing and the third housing;

wherein the interposing of the first isolator assembly and the second isolator assembly includes:

embedding a portion of a first isolator in one of the first housing and the second housing of the first member;

embedding a portion of a second isolator in the third housing of the second member; and extending an isolator insert between the first isolator and the second isolator;

resting the first housing and the second housing of the first member of the vibration dampening device on a support surface or operatively engaging the first housing and the second housing of the first member with the support surface;

operatively engaging the third housing of the second member of the vibration dampening device with the vibration-sensitive component;

decoupling the vibration-sensitive component from the support surface with the vibration dampening device via the first isolator assembly and the second isolator assembly; and dampening vibrations to or from the vibration-sensitive component with the vibration dampening device.

15. The method according to claim 14, further comprising:

defining a gap between a first surface of the one of the first housing and the second housing which includes the embedded portion of the first isolator and a first surface of the third housing that includes the embedded portion of the second isolator.

16. The vibration dampening device according to claim 1, further comprising a mounting plate adapted to be fixedly secured to the support surface; and wherein the first housing and the second housing of the first member are fixedly secured to the mounting plate.

17. The vibration dampening device according to claim 16, further comprising a faceplate adapted to be fixedly secured to the vibration sensitive component; and wherein the third housing of the second member is fixedly secured to the faceplate.

* * * * *